US012765636B2

(12) United States Patent
McKenzie et al.

(10) Patent No.: US 12,765,636 B2

(45) Date of Patent: Oct. 20, 2026

(54) ARTICLE OF FOOTWEAR HAVING A FRAME AND METHOD OF MANUFACTURING A MIDSOLE MEMBER OF AN ARTICLE OF FOOTWEAR

(71) Applicant: PUMA SE, Herzogenaurach (DE)

(72) Inventors: Carly McKenzie, Herzogenaurach (DE); Sidney Fauconnier, Nuremberg (DE); Romain Girard, Lauf an der Pegnitz (DE); Patrick Donovan, Fuerth (DE); Heiko Frank Desens, Berlin (DE); Daniel Simon Taylor, Tokyo (JP)

(73) Assignee: PUMA SE, Herzogenaurach (DE)

( * ) Notice: Subject to any disclaimer, the term of this patent is extended or adjusted under 35 U.S.C. 154(b) by 0 days.

(21) Appl. No.: 18/583,210

(22) Filed: Feb. 21, 2024

(65) Prior Publication Data

US 2024/0188678 A1 Jun. 13, 2024

Related U.S. Application Data

(63) Continuation-in-part of application No. 18/099,098, filed on Jan. 19, 2023, now Pat. No. 12,507,759.

(Continued)

(51) Int. Cl.

| | |
|---|---|
| *A43B 3/24* | (2006.01) |
| *A43B 13/12* | (2006.01) |
| *A43B 13/14* | (2006.01) |
| *A43B 13/36* | (2006.01) |
| *B29D 35/12* | (2010.01) |

(52) U.S. Cl.

CPC .............. *A43B 13/14* (2013.01); *A43B 3/246* (2013.01); *A43B 13/122* (2013.01); *A43B 13/125* (2013.01); *A43B 13/36* (2013.01); *B29D 35/122* (2013.01)

(58) Field of Classification Search

CPC .. A43B 3/16; A43B 3/18; A43B 3/244; A43B 3/246; A43B 13/122; A43B 13/125; A43B 13/36

See application file for complete search history.

(56) References Cited

U.S. PATENT DOCUMENTS 5,367,791 A * 11/1994 Gross .................... A43B 13/26 36/31

6,023,859 A * 2/2000 Burke .................... A43B 13/36 36/105

(Continued)

OTHER PUBLICATIONS

Extended European Search Report of European Application 25156831.7, mailed Jun. 26, 2025 (8 pages).

*Primary Examiner* — Sharon M Prange

(74) *Attorney, Agent, or Firm* — Quarles & Brady, LLP

(57) ABSTRACT

An article of footwear includes an upper and a sole structure attached to the upper. The sole structure includes a frame attached to the upper with frame exterior and interior surfaces defining a frame internal cavity. The sole structure further includes a midsole member disposed within the frame internal cavity and that is formed via a supercritical foaming process. A lattice-work structure of the frame is formed by a plurality of apertures extending through the frame exterior and interior surfaces such that at least some portions of the upper and the midsole member adjacent the frame interior surface are exposed through the plurality of apertures.

20 Claims, 33 Drawing Sheets

Related U.S. Application Data

(60) Provisional application No. 63/300,934, filed on Jan. 19, 2022.

(56) References Cited

U.S. PATENT DOCUMENTS

| | | | | |
|---|---|---|---|---|
| 6,128,835 | A | 10/2000 | Ritter | |
| 6,915,596 | B2 * | 7/2005 | Grove | A43B 13/223 36/15 |
| 7,140,129 | B2 * | 11/2006 | Newson | A43B 3/244 36/3 R |
| 7,966,748 | B2 * | 6/2011 | Votolato | A43C 15/02 36/15 |
| 8,225,532 | B2 | 7/2012 | Chen | |
| 9,060,567 | B2 | 6/2015 | Elder | |
| 9,144,263 | B2 | 9/2015 | Elder | |
| 9,775,406 | B2 | 10/2017 | Connell | |
| 11,206,898 | B2 | 12/2021 | Cobb | |
| 11,224,263 | B2 * | 1/2022 | Darby | A43B 19/00 |
| 12,070,096 | B2 * | 8/2024 | Bidal | A43B 13/125 |
| 2004/0148803 | A1 * | 8/2004 | Grove | A43B 23/0245 36/31 |
| 2005/0188562 | A1 * | 9/2005 | Clarke | A43B 3/244 36/3 R |
| 2009/0071041 | A1 * | 3/2009 | Hooper | A43C 11/14 36/25 R |
| 2009/0183392 | A1 * | 7/2009 | Shane | A43B 3/244 12/114.2 |
| 2011/0010964 | A1 * | 1/2011 | Hardy | A43B 7/1464 36/103 |
| 2011/0203137 | A1 | 8/2011 | Long | |
| 2014/0259779 | A1 * | 9/2014 | Hashish | A43B 7/1445 12/142 R |
| 2016/0044988 | A1 | 2/2016 | Delgorgue | |
| 2017/0231319 | A1 | 8/2017 | Bohnsack | |
| 2019/0116925 | A1 * | 4/2019 | Darby | A43B 7/1405 |
| 2023/0225449 | A1 | 7/2023 | McKenzie | |
| 2023/0292877 | A1 * | 9/2023 | Galasso | A43B 3/244 36/15 |

* cited by examiner

ARTICLE OF FOOTWEAR HAVING A FRAME AND METHOD OF MANUFACTURING A MIDSOLE MEMBER OF AN ARTICLE OF FOOTWEAR

CROSS REFERENCE TO RELATED APPLICATIONS

The present application is a continuation-in-part of U.S. application Ser. No. 18/099,098, filed on Jan. 19, 2023, which claims the benefit of priority from U.S. Provisional Application No. 63/300,934, filed Jan. 19, 2022, which are each incorporated herein by reference in their entirety.

REFERENCE REGARDING FEDERALLY SPONSORED RESEARCH OR DEVELOPMENT

Not applicable

SEQUENCE LISTING

Not applicable

BACKGROUND

1. Field of the Invention

The present disclosure relates generally to an article of footwear having a sole structure including one or more midsole members and a frame that surrounds the one or more midsole members, and further to a method of manufacturing one or more midsole members of a sole structure of an article of footwear having a frame.

2. Description of the Background

Many conventional shoes or other articles of footwear generally comprise an upper and a sole structure attached to a lower end of the upper. Conventional shoes further include an internal space, i.e., a void or cavity, which is created by interior surfaces of the upper and sole structure, that receives a foot of a user before securing the shoe to the foot. The sole structure is attached to a lower surface or boundary of the upper and is positioned between the upper and a ground surface. As a result, the sole structure typically provides stability and cushioning to the user when the shoe is being worn. In some instances, the sole structure may include multiple components, such as an outsole, a midsole, and a top portion. The outsole may provide traction to a bottom surface of the sole structure, and the midsole may be attached to an inner surface of the outsole and may provide cushioning or added stability to the sole structure. For example, a sole structure may include a particular foam material that may increase stability at one or more desired locations along the sole structure, or a foam material that may reduce stress or impact energy on the foot or leg when a user is running, walking, or engaged in another activity. The sole structure may also include additional components, such as plates, embedded with the sole structure to increase the overall stiffness of the sole structure and reduce energy loss during use.

The upper generally extends upward from the sole structure and defines an interior cavity that completely or partially encases a foot. In most cases, the upper extends over the instep and toc regions of the foot, and across medial and lateral sides thereof. Many articles of footwear may also include a tongue that extends across the instep region to bridge a gap between edges of lateral and medial sides of the upper, which collectively define an opening into the cavity. The tongue may also be disposed below a lacing system and between lateral and medial sides of the upper, to allow for adjustment of shoe tightness. The tongue may further be manipulatable by a user to permit entry or exit of a foot from the internal space or cavity. In addition, the lacing system may allow a user to adjust certain dimensions of the upper or the sole, thereby allowing the upper to accommodate a wide variety of foot types having varying sizes and shapes.

The upper of many shoes may comprise a wide variety of materials, which may be utilized to form the upper and chosen for use based on one or more intended uses of the shoe. The upper may also include portions comprising varying materials specific to a particular area of the upper. For example, added stability may be desirable at a front of the upper or adjacent a heel region so as to provide a higher degree of resistance or rigidity. In contrast, other portions of a shoe may include a soft woven textile to provide an area with stretch-resistance, flexibility, air-permeability, or moisture-wicking properties.

Sole assemblies generally extend between a ground surface and the upper. In some examples, the sole assembly includes an outsole that provides abrasion-resistance and traction with the ground surface. The outsole may be formed from rubber or other materials that impart durability and wear-resistance, and enhance traction with the ground surface.

While many currently available shoes have varying features related to the above-noted properties, many shoes, including athletic shoes, and even more so running shoes, have sole structures in which the outsole may wear faster than the rest of the sole structure and/or the upper of the shoe. This results in users requiring replacement of entire sets of shoes even though the upper and the sole structure, other than the outsole, of such sets of shoes have not yet worn to a condition requiring replacement. Further, some physical activities have differing support requirements at different locations of the sole structure and/or upper of shoes, including athletic shoes, to benefit the user of the shoe during such physical activities. For example, increased support in the heel region of the shoe may be beneficial to a user of the shoe for traditional running activity, while increased support along the lateral and medial sides of the shoe may be beneficial to a user of the shoe for traditional cross training activity.

Therefore, articles of footwear having features permitting an outsole of a sole structure of an article of footwear to be replaced and/or that permit the sole structure to be customizable to a particular user's activities are desired. These and other deficiencies with the prior art are addressed by the following disclosure.

SUMMARY

An article of footwear, as described herein, may have various configurations. The article of footwear may have an upper and a sole structure connected to the upper.

In some aspects, the present disclosure provides an article of footwear that includes an upper and a sole structure attached to the upper. The sole structure includes a frame attached to the upper having a frame exterior surface and a frame interior surface, opposite the frame exterior surface, that defines a frame internal cavity, a midsole member that is formed via a supercritical foaming process and disposed within the frame internal cavity, and an outsole. The frame interior surface is adjacent portions of the upper and the midsole member. The frame has a lattice-work structure formed by a plurality of apertures extending through the frame exterior surface and the frame interior surface such that at least some of the portions of the upper and the midsole member adjacent the frame interior surface are exposed through the plurality of apertures.

In some embodiments, the midsole member is not compressed after the supercritical foaming process. In some embodiments, the midsole member is disposed at least partially within each of a forefoot region, a midfoot region, and a heel region of the article of footwear. In some embodiments, the midsole member extends between a distal end and a proximal end of the article of footwear. In some embodiments, the midsole member extends between a lateral side and a medial side of the article of footwear. In some embodiments, the midsole member is disposed within a heel region of the article of footwear. In some embodiments, the frame extends along at least a medial side and a lateral side of the article of footwear, and the lattice-work structure of the frame extends along at least the lateral side of the article of footwear. In some embodiments, the frame extends along a medial side, a lateral side, and a proximal end of the article of footwear, and the lattice-work structure of the frame extends along at least the lateral side and the proximal end of the article of footwear. In some embodiments, the lattice-work structure of the frame extends along a percentage in a range of about 5% to about 60% of an exterior surface of the upper. In some embodiments, a percentage in a range of about 30% to about 90% of the frame includes the lattice-work structure.

In some embodiments, when force is applied to the sole structure by a user's foot, at least portions of the midsole member are compressed and at least some of the portions of the midsole member exposed through the plurality of apertures of the frame expand outwardly from the frame internal cavity at least partially through the plurality of apertures. In some embodiments, the frame includes an outsole member that at least partially defines the outsole of the sole structure. In some embodiments, the frame includes an upper frame member attached to the upper and a lower frame member attached to the upper frame member, opposite the upper. In some embodiments, the lower frame member is removably attached to the upper frame member, and, when the lower frame member is removed from the upper frame member, the midsole member is configured to be removeable from or insertable into the frame internal cavity. In some embodiments, the lower frame member at least partially defines the outsole of the structure. In some embodiments, at least the lattice-work structure of the frame comprises an elastomeric material such that at least the lattice-work structure is configured to elastically deform under force exerted on the sole structure by a user's foot. In some embodiments, an upper surface of the midsole member at least partially defines an insole of the sole structure. In some embodiments, the sole structure further includes an insole disposed adjacent an upper surface of the midsole member. In some embodiments, the insole comprises a textile material or a plastic film.

In other aspects, the present disclosure provides a method of manufacturing a sole structure of an article of footwear that includes forming an initial midsole member having an initial density, and expanding the initial midsole member, via a supercritical foaming process, to form a final midsole member of the sole structure having a final density that is less than the initial density. The method further includes assembling the final midsole member having the final density within a frame internal cavity of a frame of the sole structure to form the sole structure. The frame has a lattice-work structure formed by a plurality of apertures extending through a frame exterior surface and a frame interior surface such that at least some portions of the midsole member within the frame internal cavity and adjacent the frame interior surface are exposed through the plurality of apertures.

In some embodiments, assembling the final midsole member with the frame internal cavity includes milling the final midsole member to a final shape, and inserting the final midsole member having the final shape into the frame internal cavity. In some embodiments, the supercritical foaming process includes inlaying the initial midsole member having the initial density into a vessel, introducing a supercritical gas to the initial midsole member, removing the supercritical gas from the initial midsole member to form the final midsole member having the final density, and removing the final midsole member from the vessel. In some embodiments, the supercritical foaming process includes pumping a solution of molten material and supercritical fluid into a vessel having a pressure to form the initial midsole member having the initial density, releasing the pressure from the vessel to form the final midsole member having the final density, and removing the final midsole member from the vessel. In some embodiments, the midsole member is disposed at least partially within each of a forefoot region, a midfoot region, and a heel region of the sole structure. In some embodiments, the midsole member extends between a distal end and a proximal end of the sole structure. In some embodiments, the midsole member extends between a lateral side and a medial side of the sole structure.

In some aspects, the present disclosure provides an article of footwear that includes an upper and a sole structure attached to the upper. The sole structure includes a frame having a frame exterior surface and a frame interior surface, opposite the frame exterior surface, that defines a frame internal cavity, and one or more midsole members disposed within the frame internal cavity. The frame includes an upper frame member attached to the upper and a lower frame member attached to the upper frame member, opposite the upper. The lower frame member at least partially defines an outsole of the sole structure, and the one or more midsole members at least partially define a midsole of the sole structure. The frame interior surface is adjacent portions of the upper and the one or more midsole members, and the frame has a lattice-work structure formed by a plurality of apertures extending through the frame exterior surface and the frame interior surface such that at least some of the portions of the upper and the midsole member adjacent the frame interior surface are exposed through the plurality of apertures. The one or more midsole members are formed via a supercritical foaming process.

In some embodiments, the lower frame member is removably attached to the upper frame member, and, when the lower frame member is removed from the upper frame member, the one or more midsole members are configured to be removable from or insertable into the frame internal cavity. In some embodiments, the one or more midsole members are not attached to the upper or the frame. In some embodiments, the one or midsole members define a substantial entirety of the midsole, and the lower frame member defines a substantial entirety of the outsole. In some embodiments, the one or more midsole members include at least a first midsole member that is arranged at least partially within a forefoot region of the article of footwear and a second midsole member that is arranged at least partially within a heel region of the article of footwear. In some embodiments, the first and second midsole members are not attached to the upper and the frame, and the first and second midsole members are not attached to one another. In some embodiments, the first midsole member has a first density, and the second midsole member has a second density that is different than the first density. In some embodiments, at least one of the first and second midsole members is exposed through the plurality of apertures of the frame.

Other aspects of the article of footwear and method of manufacturing a midsole member of an article of footwear, including features and advantages thereof, will become apparent to one of ordinary skill in the art upon examination of the figures and detailed description herein. Therefore, all such aspects of the article of footwear are intended to be included in the detailed description and this summary.

DETAILED DESCRIPTION OF THE DRAWINGS

Figure 1:
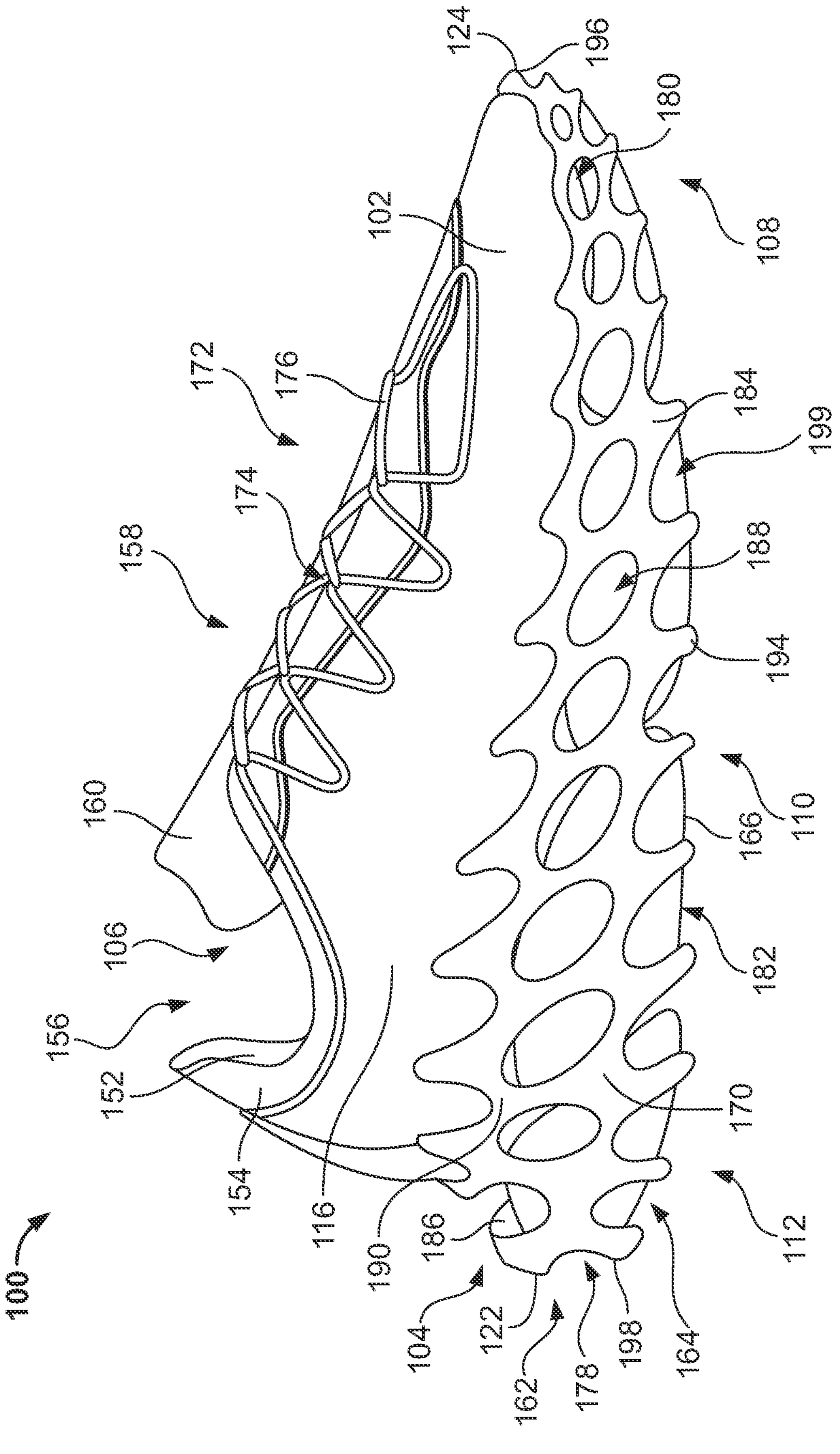
FIG. 1 is a lateral side view of an article of footwear configured as a right shoe that includes an upper, a sole structure, and a frame, according to an embodiment of the disclosure.

The following discussion and accompanying figures disclose various embodiments or configurations of a shoe and a sole structure. Although embodiments of a shoe or sole structure are disclosed with reference to a sports shoe, such as a running shoe, tennis shoe, basketball shoe, etc., concepts associated with embodiments of the shoe or the sole structure may be applied to a wide range of footwear and footwear styles, such as, e.g., cross-training shoes, football shoes, golf shoes, hiking shoes, hiking boots, ski and snowboard boots, soccer shoes and cleats, walking shoes, and track cleats, for example. Concepts of the shoe or the sole structure may also be applied to articles of footwear that are considered non-athletic, including dress shoes, sandals, loafers, slippers, and heels. In addition to footwear, particular concepts described herein may also be applied and incorporated in other types of apparel or other athletic equipment, such as, e.g., helmets, padding or protective pads, shin guards, and gloves. Even further, particular concepts described herein may be incorporated in other consumer or industrial products, such as, e.g., cushions, backpack straps, and golf clubs. Accordingly, concepts described herein may be utilized in a variety of products.

The terms "about" or "approximately," as used herein, refer to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Accordingly, throughout the disclosure, the terms "about" and "approximately" refer to a range of values ±5% of the numeric value that the term precedes, inclusive of the endpoints of the range. Similarly, the term "substantially equal" and the like, as used herein with respect to a reference value, refers to variations from the reference value of less than +10%, e.g., +8%, +5%, or +3%, inclusive. Where specified herein, the term "substantially" can indicate in particular a variation in one numerical direction relative to a reference value. For example, "substantially less" than a reference value, and the like, indicates a value that is reduced from the reference value by 10% or more, and "substantially more" than a reference value, and the like, indicates a value that is increased from the reference value by 10% or more.

As used herein, unless otherwise defined or limited, directional terms are used for convenience of reference for discussion of particular figures or examples. For example, references to "downward," "upward," or other directions, or "lower," "upper," or other positions, may be used to discuss aspects of a particular example or figure, but do not necessarily require similar orientation or geometry in all installations or configurations.

The terms "first," "second," "third," etc. may be used herein to describe various elements, components, regions, layers, and/or sections. These elements, components, regions, layers, and/or sections should not be limited by these terms. These terms may be only used to distinguish one element, component, region, layer, or section from another region, layer, or section. Terms such as "first," "second," and other numerical terms do not imply a sequence or order unless clearly indicated by the context. Thus, a first element, component, region, layer, or section discussed below could be termed a second element, component, region, layer, or section without departing from the teachings of the example configurations.

Further, the term "elastomeric," as used herein, refers to elastic or rubber-like properties of a material, e.g., a polymer. For example, reference to an "elastomeric material" is intended to refer to such material being configured to elastically deform when a load is applied to the material, or a component or portions thereof comprised of the material, and to regain its original shape when the load is removed from the material.

Some parts of the present disclosure herein describe a method or process for manufacturing, producing, or forming a component of an article of footwear, such as, e.g., a midsole, or, in particular, a midsole member of a sole structure of the footwear. As used herein, the term "initial" preceding a component name, e.g., an "initial midsole member," or a property of a component, e.g., an "initial density," refers to a particular state of such component, or a property thereof, preceding or subsequent to one or more initial or first steps, but subsequent to one or more intermediate or final steps, of a method or process for manufacturing such component. For example, an "initial midsole member" refers to a raw or otherwise unfinished midsole member, including one or more properties thereof, that is formed via one or more initial or first steps or processes and is later subjected to one or more intermediate or final steps or processes to form the midsole member that later forms the article of footwear.

Relatedly, as also used herein, the terms "final" or "production ready" preceding a component name, e.g., a "final midsole member" or a "production ready midsole member," or a property of a component, e.g., a "final size," refer to a particular state of such component, including one or more properties thereof, resulting from a final or third step or process—that is subsequent to an initial or first step or process and any other intermediary steps or processes thereafter—of a method or process for manufacturing such component. Further, the particular state of such component, including one or more properties thereof, resulting from the final or third step or process corresponds to a production ready or final state of such component, i.e., ready to be assembled to one or more other components to form a final article of footwear, including a final component of the footwear, e.g., a final sole structure of the footwear. For example, a "final midsole member" refers to a particular state of the midsole member, including one or more properties thereof, that has been previously subjected to one or more initial steps or processes, including any intermediate steps or processes thereafter, and is in a production ready or final state to be included in the final article of footwear without undergoing any subsequent steps or processes that materially affect one or more particularly beneficial properties of the final midsole member, such as, e.g., a final density.

Further, as used herein, the term "intermediate" preceding a component name, e.g., an "intermediate midsole member," or a property of a component, e.g., an "intermediate thickness," refers to a particular state of such component subsequent to one or more initial or first steps or processes, but prior to one or more subsequent final steps or processes, of a method or process for manufacturing such component. For example, an "intermediate midsole member" refers to a raw or otherwise unfinished midsole member, including one or more properties thereof, resulting from an intermediate or second step, that is subsequent to one or more initial or first steps or processes but precedes one or more final or third steps, of a method or process for manufacturing such component and that is not yet in, or has properties that are not yet present for, a production ready or final state of the component.

The present disclosure is directed to an article of footwear and/or specific components of the article of footwear, such as an upper and/or a sole or sole structure. The upper may comprise a knitted component, a woven textile, and/or a non-woven textile. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, and/or other suitable knitting operations. The knit textile may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double cloth weaves, for example. Non-woven textiles include textiles made by air-laid and/or spun-laid methods, for example. The upper may comprise a variety of materials, such as a first yarn, a second yarn, and/or a third yarn, which may have varying properties or varying visual characteristics.

In addition, the present disclosure relates to an article of footwear having a sole structure attached to an upper and a frame attached to the sole structure and/or the upper. The sole structure may include a midsole and an outsole. Each of the midsole and the outsole may be separate components coupled with one another, or one or more of these elements may be integrally formed with each other. The midsole may be made of a foam material and is disposed between and connects the upper with the outsole. The midsole may cushion the impact from a user's foot contacting the ground. The outsole may be attached to the midsole to define a bottom surface of the shoe. The outsole may be made from a rubber material and is configured to contact the ground and provide traction. The outsole may include one or more sections, for example, a heel section and a forefoot section, although the outsole may include more than two sections at different areas, or it may be a single component. The frame may be made of a rigid plastic, such as thermoplastic polyurethane (TPU), or from another type of plastic or composite, and is provided to increase structural support and/or contain components of the sole structure. In particular, the frame may wrap around the sole structure and has portions on both the lateral and medial sides of the article of footwear. Further, the frame can be configured to removably attach to the shoe, e.g., the sole structure and/or the upper. In some embodiments, the frame can be further configured to receive outsole members disposed between the frame and the midsole, in which the outsole members can function as the outsole of the shoe. Thus, the frame can provide customized support to the shoe while further providing a means to replace the outsole of the shoe.

A frame is an elongate member that is coupled with and wraps around the sole structure and/or portions of the upper. The frame has an inner surface facing the article of footwear, which is configured to couple with the sole structure, and further, at least a portion of the upper when the sole structure is connected with the upper in some embodiments. The frame also has an outer surface, which, in some embodiments, may be smooth, contoured, or have other features such as apertures. The frame may be contoured, for example, to match adjacent portions of the sole structure and/or the upper. Such features can be used to tune the flexibility of the frame, making it stiffer in some portions, or along some directions, such as the length of the frame. Further, the frame may serve to add to the decorative nature of the shoe. Furthermore, the frame may have edges that are generally smooth and curvilinear, wavy, zig-zag, or otherwise undulate. Some portions of the frame, for example, those portions adjacent the bottom surface, may have one or more flanges extending therefrom. In such embodiments, the flanges of the frame may be disposed between the midsole, the outsole, and/or the upper to aid in securing the frame to the sole structure and/or the upper.

As noted above, the frame wraps around the sole structure. In particular, the frame may define a first or distal end in a forefoot region proximate a medial side and a lateral side. The distal end may be located adjacent the bottom surface of the sole structure or it may extend partially onto the side of the midsole or the upper. The frame may extend rearward along the bottom surface of the sole structure proximate the medial side and the lateral side to a second or proximate end in a heel region. The frame may extend above the midsole near the forefoot region, the midfoot region, and/or the heel region, so that it connects with the upper. The frame may also wrap around the periphery of a heel region from the lateral side to the medial side, extending forward and ending at the distal end near or adjacent to the midfoot region or the forefoot region. The frame may be configured to connect with the sole structure and/or the upper on at least a portion of its length.

The following discussion and accompanying figures disclose various embodiments or configurations of an article of footwear. The article of footwear can be provided as a pair of shoes including a first or left shoe and a second or right shoe. The left shoe and the right shoe may be similar in all material aspects, except that the left shoe and the right shoe are sized and shaped to receive a left foot and a right foot of a user, respectively. For ease of disclosure, a single shoe or article of footwear will be referenced to describe aspects of the disclosure. In some figures, the article of footwear is depicted as a right shoe, and in some figures the article of footwear is depicted as a left shoe. The disclosure below with reference to the article of footwear is applicable to both the left shoe and the right shoe. In some embodiments, there may be differences between the left shoe and the right shoe other than the left/right configuration. For example, in some embodiments, the left shoe may include a frame, while the right shoe may not include the frame, or vice versa. Further, in some embodiments, the left shoe may include one or more additional elements that the right shoe does not include, or vice versa.

FIGS. 1-5 depict an exemplary embodiment of an article of footwear 100 including an upper 102 and a sole structure 104. Referring specifically to FIG. 1, the upper 102 is attached to the sole structure 104, which together define an interior cavity 106 (see FIGS. 2 and 3) into which a foot of a user may be inserted. Many conventional footwear uppers are formed from multiple elements (such as, e.g., textiles, polymer foam, polymer sheets, leather, and synthetic leather) that are joined through bonding or stitching at a seam. In some embodiments, the upper 102 of the article of footwear 100 is formed from a knitted structure or knitted components. In various embodiments, a knitted component may incorporate various types of yarn that may provide different properties to an upper. For example, one area of the upper 102 may be formed from a first type of yarn that imparts a first set of properties, and another area of the upper 102 may be formed from a second type of yarn that imparts a second set of properties. Using this configuration, properties of the upper 102 may vary throughout the upper 102 by selecting specific yarns for different areas of the upper 102.

With reference to the material(s) that comprise the upper 102, the specific properties that a particular type of yarn will impart to an area of a knitted component may at least partially depend upon the materials that form the various filaments and fibers of the yarn. For example, cotton may provide a soft effect, biodegradability, or a natural aesthetic to a knitted material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn and other aspects of the yarn may be selected to impart a variety of properties to particular areas of the upper 102.

In some embodiments, an elasticity of a knit structure may be measured based on comparing a width or length of the knit structure in a first, non-stretched state to a width or length of the knit structure in a second, stretched state after the knit structure has a force applied to the knit structure in a lateral direction. In further embodiments, the upper 102 may also include additional structural elements. For example, in some embodiments, a heel plate or cover (not shown) may be provided on the heel region 112 to provide added support to a heel of a user. In some instances, other elements, e.g., plastic material, logos, trademarks, etc., may also be applied and fixed to an exterior surface using glue or a thermoforming process. In some embodiments, the properties associated with the upper 102, e.g., a stitch type, a yarn type, or characteristics associated with different stitch types or yarn types, such as elasticity, aesthetic appearance, thickness, air permeability, or scuff-resistance, may be varied.

Figure 2:
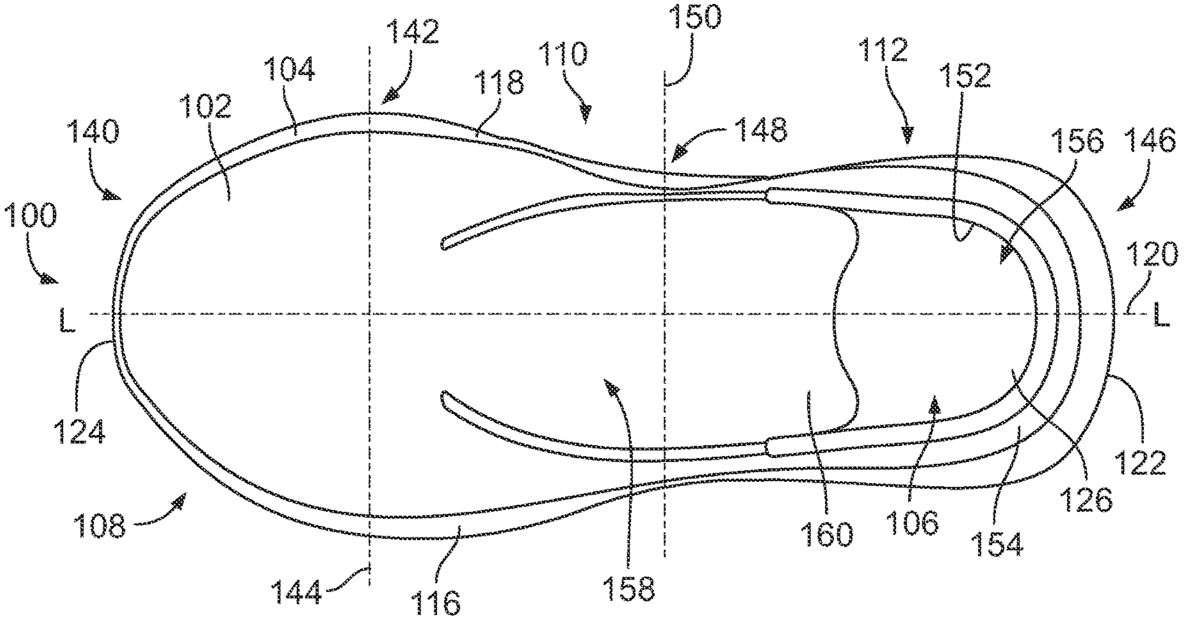
FIG. 2 is a top view of the article of footwear of FIG. 1, with the frame and a lacing mechanism of an upper removed.
Figure 3:
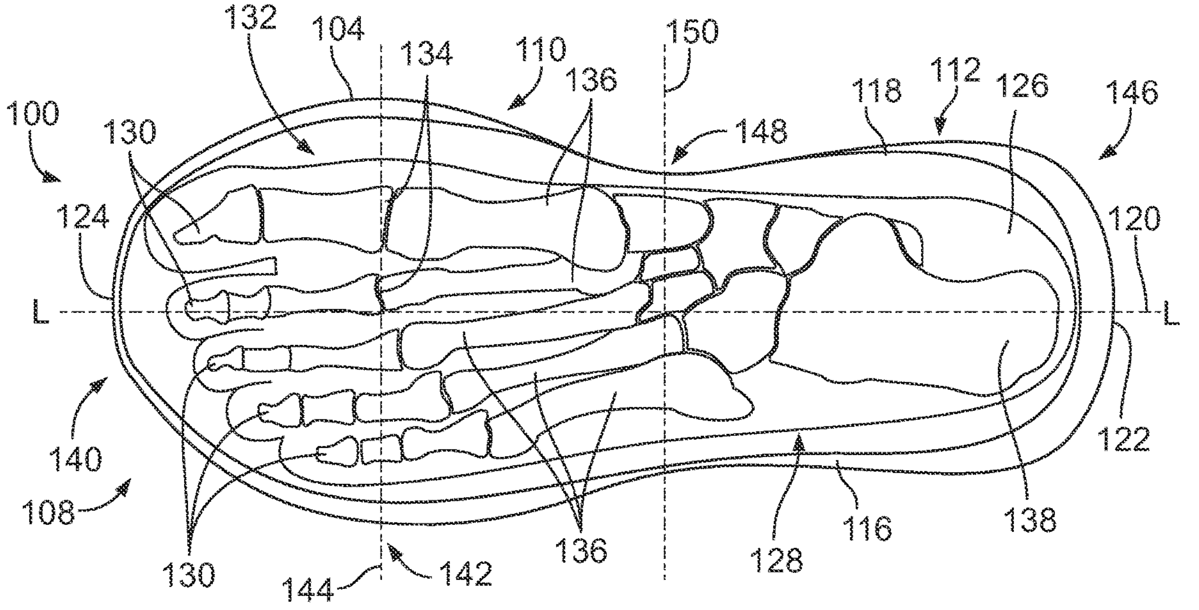
FIG. 3 is a top plan view of the article of footwear of FIG. 1, with an upper removed and a user's skeletal foot structure overlaid thereon.

Referring now to FIGS. 2 and 3, the article of footwear 100 defines a lateral side 116 and a medial side 118. When a user is wearing the shoes, the lateral side 116 corresponds with an outside-facing portion of the article of footwear 100 while the medial side 118 corresponds with an inside-facing portion of the article of footwear 100. As such, the article of footwear 100 has opposing lateral and medial sides 116, 118. The lateral side 116 and the medial side 118 adjoin one another along a longitudinal central plane or axis 120 of the article of footwear 100, which is coplanar with a longitudinal axis L of the article of footwear 100. As will be further discussed herein, the longitudinal central plane or axis 120 may demarcate a central, intermediate axis between the lateral side 116 and the medial side 118 of the article of footwear 100. Put differently, the longitudinal plane or axis 120 may extend between a rear, proximal end 122 of the article of footwear 100 and a front, distal end 124 of the article of footwear 100 and may continuously define a middle of the sole structure 104 and/or the upper 102 of the article of footwear 100, i.e., the longitudinal plane or axis 120 is a straight axis extending through the proximal end 122 to the distal end 124 of the article of footwear 100.

Referring still to FIGS. 2 and 3, the article of footwear 100 may be defined by a forefoot region 108, a midfoot region 110, and a heel region 112, unless otherwise specified. The forefoot region 108 may generally correspond with portions of the article of footwear 100 that encase portions of a foot 128 that include the toes or phalanges 130, the ball of the foot 132, and one or more of the joints 134 that connect the metatarsals 136 of the foot 128 with the toes or phalanges 130 (see FIG. 3). The midfoot region 110 is proximate and adjoins the forefoot region 108. The midfoot region 110 generally corresponds with portions of the article of footwear 100 that encase an arch of the foot 128, along with a bridge of the foot 128 (see FIG. 3). The heel region 112 is proximate to the midfoot region 110 and adjoins the midfoot region 110. The heel region 112 generally corresponds with portions of the article of footwear 100 that encase rear portions of the foot 128, including the heel or calcaneus bone 138 (see FIG. 3), the ankle (not shown), and/or the Achilles tendon (not shown).

Still referring to FIGS. 2 and 3, the forefoot region 108, the midfoot region 110, the heel region 112, the lateral side 116, and the medial side 118 are intended to define boundaries or areas of the article of footwear 100. To that end, the forefoot region 108, the midfoot region 110, the heel region 112, the lateral side 116, and the medial side 118 generally characterize sections of the article of footwear 100. Certain aspects of the disclosure may refer to portions or elements that are coextensive with one or more of the forefoot region 108, the midfoot region 110, the heel region 112, the lateral side 116, and/or the medial side 118. Further, both the upper 102 and the sole structure 104 may be characterized as having portions within the forefoot region 108, the midfoot region 110, the heel region 112, and/or along the lateral side 116 and/or the medial side 118. Therefore, the upper 102 and the sole structure 104, and/or individual portions of the upper 102 and the sole structure 104, may include portions thereof that are disposed within the forefoot region 108, the midfoot region 110, the heel region 112, and/or along the lateral side 116 and/or the medial side 118.

With continued reference to FIGS. 2 and 3, the forefoot region 108, the midfoot region 110, the heel region 112, the lateral side 116, and the medial side 118 are shown in detail. The forefoot region 108 extends from a toe end 140 to a widest portion 142 of the article of footwear 100. The widest portion 142 is defined or measured along a first line 144 that is perpendicular with respect to the longitudinal axis 120 that extends from a distal portion of the toe end 140 to a distal portion of a heel end 146, which is opposite the toe end 140. The midfoot region 110 extends from the widest portion 142 to a thinnest portion 148 of the article of footwear 100. The thinnest portion 148 of the article of footwear 100 is defined as the thinnest portion of the article of footwear 100 measured across a second line 150 that is perpendicular with respect to the longitudinal axis 120. The heel region 112 extends from the thinnest portion 148 to the heel end 146 of the article of footwear 100.

It should be understood that numerous modifications may be apparent to those skilled in the art in view of the foregoing description, and individual components thereof, may be incorporated into numerous articles of footwear. Accordingly, aspects of the article of footwear 100 and components thereof, may be described with reference to general areas or portions of the article of footwear 100, with an understanding the boundaries of the forefoot region 108, the midfoot region 110, the heel region 112, the lateral side 116, and/or the medial side 118 as described herein may vary between articles of footwear. However, aspects of the article of footwear 100 and individual components thereof, may also be described with reference to exact areas or portions of the article of footwear 100 and the scope of the appended claims herein may incorporate the limitations associated with these boundaries of the forefoot region 108, the midfoot region 110, the heel region 112, the lateral side 116, and/or the medial side 118 discussed herein.

Referring still to FIGS. 2 and 3, the lateral side 116 begins at the distal, toe end 140 and bows outward along an outer side of the article of footwear 100 along the forefoot region 108 toward the midfoot region 110. The lateral side 116 reaches the first line 144, at which point the lateral side 116 bows inward, toward the longitudinal, central axis 120. The lateral side 116 extends from the first line 144, i.e., the widest portion 142, toward the second line 150, i.e., the thinnest portion 148, at which point the lateral side 116 enters into the midfoot region 110, i.e., upon crossing the first line 144. Once reaching the second line 150, the lateral side 116 bows outward, away from the longitudinal, central axis 120, at which point the lateral side 116 extends into the heel region 112, i.e., upon crossing the second line 150. The lateral side 116 then bows outward and then inward toward the heel end 146, and terminates at a point where the lateral side 116 meets the longitudinal, central axis 120.

The medial side 118 also begins at the distal, toe end 140 and bows outward along an inner side of the article of footwear 100 along the forefoot region 108 toward the midfoot region 110. The medial side 118 reaches the first line 144, at which point the medial side 118 bows inward, toward the central, longitudinal axis 120. The medial side 118 extends from the first line 144, i.e., the widest portion 142, toward the second line 150, i.e., the thinnest portion 148, at which point the medial side 118 enters into the midfoot region 110, i.e., upon crossing the first line 144. Once reaching the second line 150, the medial side 118 bows outward, away from the longitudinal, central axis 120, at which point the medial side 118 extends into the heel region 112, i.e., upon crossing the second line 150. The medial side 118 then bows outward and then inward toward the heel end 146, and terminates at a point where the medial side 118 meets the longitudinal, central axis 120.

With continued reference to FIGS. 2 and 3, the upper 102 extends along the lateral and medial sides 116, 118, and across the forefoot, midfoot, and heel regions 108, 110, 112 to house and enclose the foot 128 of a user (see FIG. 3). With specific reference to FIG. 2, when fully assembled, the upper 102 also includes an interior surface 152 and an exterior surface 154. The interior surface 152 faces inward and generally defines the interior cavity 106, and the exterior surface 154 of the upper 102 faces outward and generally defines an outer perimeter or boundary of the upper 102. The upper 102 also includes an opening 156 that is at least partially located in the heel region 112 of the article of footwear 100, which provides access to the interior cavity 106 and through which the foot 128 (see FIG. 3) may be inserted and removed. In some embodiments, the upper 102 may also include an instep region 158 that extends from the opening 156 in the heel region 112 over an area corresponding to an instep of a foot to an area proximate the forefoot region 108. The instep region 158 may comprise an area similar to where a tongue 160 of the present embodiment is disposed. In some embodiments, the upper 102 does not include the tongue 160, i.e., the upper 102 is tongueless.

Referring again to FIG. 1, the sole structure 104 is connected or secured to the upper 102 and extends between the foot 128 (see FIG. 3) of a user and a ground surface (not shown) when the article of footwear 100 is worn by the user. In the illustrated embodiment, the sole structure 104 includes a midsole or midsole region 162 and an outsole or outsole region 164. The outsole region 164 may define a bottom end or bottom surface 166 of the sole structure 104 across the heel region 112, the midfoot region 110, and the forefoot region 108. Further, the outsole region 164 may be a ground-engaging portion or include a ground-engaging surface (e.g., the bottom surface 166) of the sole structure 104. The outsole region 164 may be formed from one or more materials to impart durability, wear-resistance, abrasion resistance, or traction to the sole structure 104. In some embodiments, the outsole region 164 may be formed from any kind of elastomer material, e.g., rubber, including thermoset elastomers or thermoplastic elastomers, or a thermoplastic material, e.g., TPU. In some embodiments, the outsole region 164 may define a shore A hardness up to 95.

Still referring to FIG. 1, the midsole region 162 may be individually constructed from a thermoplastic material, such as polyurethane (PU), for example, and/or an ethylene-vinyl acetate (EVA), copolymers thereof, or a similar type of material. In other embodiments, the midsole region 162 may be an EVA-Solid-Sponge ("ESS") material, an EVA foam (e.g., PUMA® ProFoam Lite™, IGNITE Foam), polyurethane, polyether, an olefin block copolymer, organosheets, a thermoplastic material, e.g., a thermoplastic polyurethane, a thermoplastic elastomer, a thermoplastic polyolefin, etc., or a supercritical foam. The midsole region 162 may be a single polymeric material or may be a blend of materials, such as an EVA copolymer, a thermoplastic polyurethane, a polyether block amide (PEBA) copolymer, and/or an olefin block copolymer. One example of a PEBA material is PEBAX®. In some embodiments, the midsole region 162 is manufactured by a process involving injection molding, vulcanization, printing layer by layer, i.e., additive manufacturing systems or methods, and the like.

In embodiments where the midsole region 162 is formed from a supercritical foaming process, the supercritical foam may comprise micropore foams or particle foams, such as a TPU, EVA, PEBAX®, or mixtures thereof, manufactured using a process that is performed within an autoclave, an injection molding apparatus, or any sufficiently heated/pressurized container that can process the mixing of a supercritical fluid, e.g., carbon dioxide ($CO_2$), dinitrogen ($N_2$), or mixtures thereof, with a material, e.g., TPU, EVA, polyolefin elastomer, or mixtures thereof, that is preferably molten. During an exemplary process, a solution of supercritical fluid and molten material is pumped into a pressurized container, after which the pressure within the container is released, such that the molecules of the supercritical fluid rapidly convert to gas to form small pockets within the material and cause the material to expand into a foam. In further embodiments, the midsole region 162 may be formed using alternative methods known in the art, including the use of an expansion press, an injection machine, a pellet expansion process, a cold foaming process, a compression molding technique, die cutting, or any combination thereof. For example, the midsole region 162 may be formed using a process that involves an initial foaming step in which supercritical gas is used to foam a material and then compression molded or die cut to a particular shape.

Referring again to FIG. 2, the sole structure 104 may further include an insole 126 disposed above the midsole region 162 (see FIG. 1). The insole 126 may be a strobel board, a forefoot board, a lasting board, etc., or a combination thereof. In some embodiments, the insole 126 may be provided between the upper 102 and the sole structure 104. In some embodiments, the insole 126 may be provided as part of the upper 102. Furthermore, the insole 126 can be positioned within the interior cavity 106 of the upper 102, which can be in direct contact with the user's foot 128 (see FIG. 3) while the article of footwear 100 is being worn. Moreover, the upper 102 may also include a liner (not shown) that can increase comfort, for example, by reducing friction between the foot 128 (see FIG. 3) of the user and the upper 102, the insole 126, and/or other components of the sole structure 104, and/or by providing moisture wicking properties. The liner may line the entirety of the interior cavity 106 or only a portion thereof. In some embodiments, a binding (not shown) may surround the opening 156 of the interior cavity 106 to secure the liner to the upper 102 and/or to provide an aesthetic element to the article of footwear 100.

Referring again to FIG. 1, the upper 102 includes a fastening mechanism 172 that defines a plurality of first fastening members or lace retainers 174 disposed on the lateral side 116 and medial side 118 (see FIG. 4) of the article of footwear 100 adjacent to the tongue 160. The lace retainers 174 are configured to receive a second fastening member or lace 176 that can extend in a crisscrossing manner across the tongue 160 and through the lace retainers 174. In some embodiments, the lace 176 extends through the lace retainers 174 disposed on the lateral side 116 of the upper 102, across the tongue 160 and the instep region 158, and through the lace retainers 174 disposed on the medial side 118 of the upper 102. In some embodiments, the lace 176 has free ends that can be tied together by the user. In some embodiments, the lace 176 comprises two laces each having a first end that is fixed to the upper 102 and a second end that is free, such that the second ends of the two laces can be tied together by the user. In some embodiments, the lace 176 may be a closed loop lace that is tightened manually and/or automatically by a tightening mechanism (not shown). In some embodiments, the fastening mechanism 172 includes more than one plurality of lace retainers 174 that are configured to receive one or more laces 176.

Still referring to FIG. 1, and as discussed above, the sole structure 104 includes the midsole or midsole region 162 and the outsole or outsole region 164. In the illustrated embodiment, the midsole region 162 includes a plurality of midsole members 178 disposed along the forefoot region 108, the midfoot region 110, and the heel region 112. The plurality of midsole members 178 may have varying properties, including different shapes, colors, thicknesses, and/or widths. In some embodiments, the midsole members 178 have other properties that vary between one or more midsole members 178, such as the color. In some embodiments, and as discussed further below, one or more of the midsole members 178 can be comprised of different materials than the material comprising the other midsole members 178. For example, in some embodiments, the midsole members 178 disposed in the heel region 112 are comprised of a different material than the midsole members 178 disposed in the forefoot region 108 and/or the midfoot region 110. In some embodiments, the midsole members 178 can define both the midsole 162 and the outsole 164 of the sole structure 104.

The plurality of midsole members 178 each have an upper portion 180 and a bottom portion 182. In the illustrated embodiment, the bottom portions 182 of the plurality of midsole members 178 define the outsole 164 of the sole structure 104 and are configured to at least partially contact the ground while providing traction to a user wearing the article of footwear 100. The upper 102 is connected to the upper portion 180 of the midsole members 178. In some embodiments, the upper 102 may be attached to the upper portions 180 of the midsole members 178 by a glue or other adhesive. In some embodiments, the upper portions 180 of the plurality of midsole members 178 form a continuous surface. In such embodiments, the continuous surface of the upper portions 180 may function as the insole 126 (see FIG. 2) of the article of footwear 100. In some embodiments, one or more gaps are present between the upper portions 180 of the plurality of midsole members 178. In some embodiments, the insole 126 (see FIG. 2) is connected to the upper portions 180 of the plurality of midsole members 178. In such embodiments, the upper 102 may be connected to the insole 126 of the sole structure 104.

Figure 4:
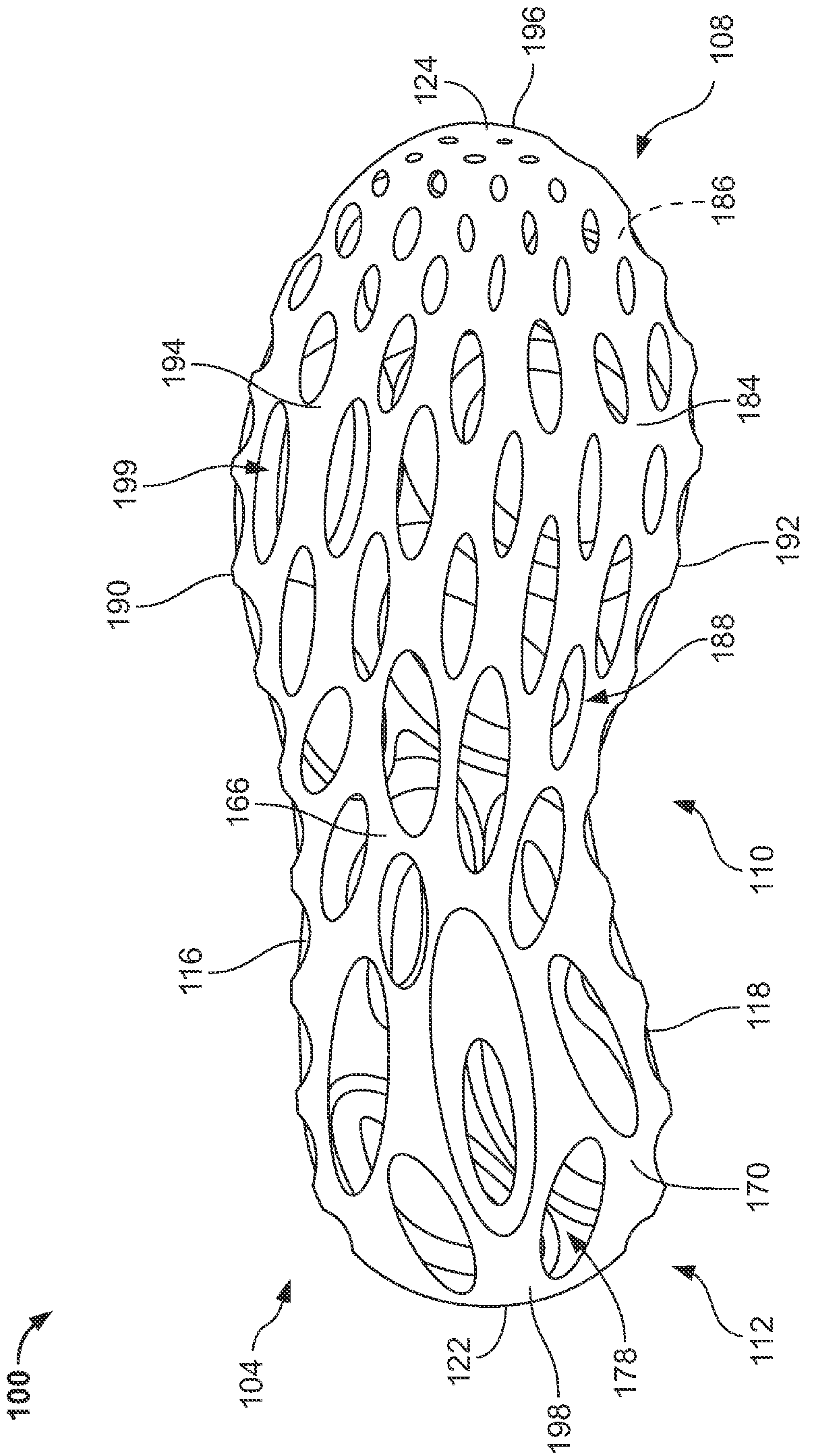
FIG. 4 is a bottom view of the article of footwear of FIG. 1.

Referring specifically to FIGS. 1 and 4, the article of footwear 100 also includes a frame 170. The frame 170 is an elongate member that wraps around the midsole region 162 and the outsole region 164 of the sole structure 104 (i.e., the plurality of midsole members 178 in the illustrated embodiment). In the illustrated embodiment, the frame 170 also wraps at least partially around lower portions of the upper 102 (see FIG. 4). Thus, in the illustrated embodiment, the frame 170 wraps around at least portions of the lateral side 116, the medial side 118 (see FIG. 2), the proximal end 122, the distal end 124, the forefoot region 108, the midfoot region 110, and the heel region 112 of the article of footwear 100. The frame 170 is a unitary body that can be made from a plastic material, such as TPU. In some embodiments, the frame 170 is made from a translucent TPU or another translucent material. Furthermore, two or more portions of the frame 170 may be comprised of two or more materials that have varying properties relative to each other. For example, in some embodiments, the frame 170 may have a portion comprising TPU and another portion comprising a composite.

The frame 170 may be configured to be removably attached to the sole structure 104 and/or the upper 102. In such embodiments, the frame 170 may be configured to include a plurality of frames having differing geometric and/or material properties that can each be removably attached to the sole structure 104 by the user to provide a specific support structure desired by the user for a particular physical activity. Further, as discussed below, the frame 170 may be configured such that a user can remove and replace the outsole 164 of the article of footwear 100. In addition, as discussed below, the inclusion of the frame 170 can add to the visual appeal of the shoe by permitting the plurality of midsole members 178 to be visible from an outside of the article of footwear 100 through the frame 170.

Still referring to FIGS. 1 and 4, the frame 170 is an elongate member that wraps around the midsole members 178 along with the lateral side 116 and the medial side 118 (see FIG. 4) of the upper 102. The frame 170 has an exterior surface 184 that faces away from the article of footwear 100 and an interior surface 186 that faces toward the article of footwear 100. In some embodiments, the frame 170 covers at least a portion of the sole structure 104 and does not cover any portion of the upper 102. In some embodiments, the frame 170 covers a portion of the sole structure 104 and a portion of the upper 102. In some embodiments, a percentage coverage of the upper 102 by the frame 170, as defined as an absolute surface area without consideration of a plurality of apertures 188 of the frame 170, is in a range of about 2% to about 90%, in a range of about 5% to about 95%, in a range of about 15% to about 80%, in a range of about 25% to about 75%, in a range of about 30% to about 70%, or in a range of about 50% to about 65%.

The interior surface 186 of the frame 170 is configured to encase or cover one or more of the midsole members 178 of the sole structure 104 and/or portions of the upper 102. In other words, the interior surface 186 along a lateral side 190, a medial side 192 (see FIG. 6), a bottom side 194, a distal side 196, and a proximal side 198 of the frame 170 defines a frame interior cavity 199 (see FIGS. 1 and 4) of the frame 170 that is configured to receive at least portions of one or more of the midsole members 178 and/or portions of the upper 102. In some embodiments, the frame 170 may be at least partially disposed within a plurality of channels or recesses (not shown) formed on one or more of the midsole members 178. In some embodiments, the frame 170 is co-molded with the midsole members 178. In some embodiments, the frame 170 is adhered to the midsole members 178 or the upper 102. In some embodiments, the frame 170 is removably attached to the midsole members 178 by compression or other means. In some embodiments, the frame 170 can extend over, or cover, only a portion of the midsole members 178. For example, in such embodiments, the frame 170 can extend over only those midsole members 178 disposed in the heel region 112, such that the midsole members 178 disposed in the forefoot region 108 and the midfoot region 110 are not covered by the frame 170. In some embodiments, the article of footwear 100 can include more than one frame 170, for example, a first frame can extend over the midsole members 178 disposed in the heel region 112 and a second frame can extend over the midsole members 178 disposed in the forefoot region 108 and/or the midfoot region 110.

Referring still to FIGS. 1 and 4, the frame 170 has a lattice-work structure formed by the plurality of apertures 188 that extend from the exterior surface 184 to the interior surface 186 of the frame 170. In the illustrated embodiment, the apertures 188 are disposed along each of the lateral side 190, the medial side 192 (see FIG. 6), the bottom side 194, the distal side 196, and the proximal side 198 of the frame 170. Thus, the lattice-work structure of the frame 170 extends over the entire frame 170 such that the midsole members 178 covered by the frame 170 are visible from an outside (e.g., along the lateral side 116, the medial side 118 (see FIG. 2), the proximal end 122, the distal end 124, and the outsole region 164) of the article of footwear 100 through the lattice-work structure (i.e., the apertures 188) of the frame 170. In some embodiments, the apertures 188 are disposed entirely on the bottom side 194 of the frame 170 and thus the lattice-work structure of the frame 170 extends along only the outsole region 164 of the article of footwear 100 while the remainder of the frame 170 can extend along the lateral side 116, the medial side 118 (sec FIG. 2), the proximal end 122, and the distal end 124 of the article of footwear 100. In some embodiments, the apertures 188 are disposed only on the lateral and bottom sides 190, 194 of the frame 170 and thus the lattice-work structure of the frame 170 extends along only the lateral side 116 and the outsole region 164 of the article of footwear 100 while the remainder of the frame can extend along the medial side 118 (see FIG. 2), the proximal end 122, and the distal end 124 of the article of footwear 100. In some embodiments, the apertures 188 are disposed only on the lateral and proximal sides 190, 198 of the frame 170 and thus the lattice-work structure of the frame 170 extends along only the lateral side 116 and the heel region 112 of the article of footwear 100 while the remainder of the frame 170 can extend along the medial side 118 (see FIG. 2), the distal end 124, and the outsole region 164 of the article of footwear 100. In some embodiments, a percentage of the frame 170 including the plurality of apertures 188 (i.e., the lattice-work structure) is in a range of about 5% to about 30%, in a range of about 20% to about 60%, in a range of about 30% to about 80%, in a range of about 50% to about 90%, or in a range of about 10% to about 95%. In some embodiments, the lattice-work structure of the frame 170 can extend along a percentage of the exterior surface 154 of the upper 102 in a range of about 5% to about 60%, in a range of about 10% to about 50%, in a range of about 15% to about 45%, or in a range of about 20% to about 40%. In some embodiments, the frame 170, or portions thereof, can have a continuous exterior surface 184 with no apertures 188.

With continued reference to FIGS. 1 and 4, the plurality of apertures 188 can be of varying size and shape. For example, with specific reference to FIG. 4, the apertures 188 disposed on the bottom side 194 of the frame 170 toward the distal side 196 of the frame 170 have a smaller size and generally have a more circular shape in comparison to the apertures 188 disposed toward the proximal side 198 of the frame 170. Likewise, with specific reference to FIG. 1, the apertures 188 disposed on the lateral side 190 of the frame 170 have a generally oval shape, and the apertures 188 disposed toward the distal side 196 of the frame 170 have a smaller size and differently orientated oval shapes in comparison to the apertures 188 disposed toward the proximal side 198 of the frame 170.

Figure 5:
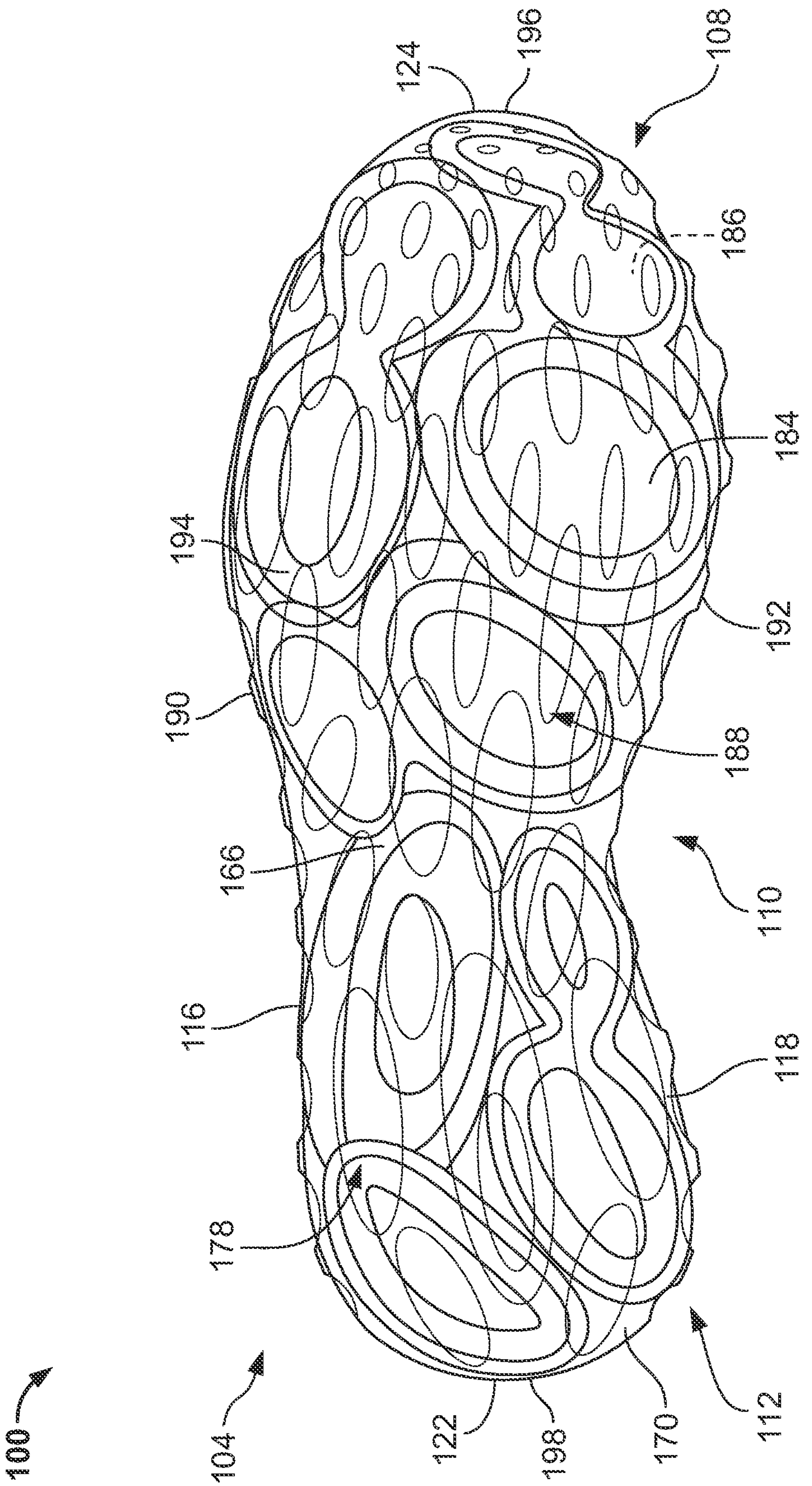
FIG. 5 is a bottom view of the article of footwear of FIG. 1, with another example frame of the article of footwear of FIGS. 1 and 4.

Referring specifically to FIGS. 4 and 5, and as discussed above, with the apertures 188 included on the bottom side 194 of the frame 170, the frame 170 and the bottom portions 182 of the midsole members 178 partially define the bottom surface 166 of the outsole 164 of the sole structure 104. In the illustrated embodiment, the apertures 188 disposed on the bottom side 194 of the frame 170 are arranged such that at least two or more apertures 188 are at least partially disposed over each of the midsole members 178. In some embodiments, the bottom side 194 of the frame 170 and the bottom portions 182 of the midsole members 178 form a substantially flat or continuous bottom surface 166 of the outsole 164. In some embodiments, the midsole members 178 can include a plurality of protrusions (not shown) that align with two or more of the apertures 188 disposed on the bottom side of the frame 170, such that the protrusions of the bottom portions 182 of the midsole members 178 extend at least partially through the apertures 188 of the frame 170.

Referring again to FIGS. 1, 4, and 5, the midsole members 178 can be comprised of a compressible and/or deformable material that can provide cushioning or shock absorption benefits to a user when wearing the article of footwear 100. In such embodiments, the frame 170 can be comprised of a material that is more rigid than a material comprising the midsole members 178 such that frame 170 provides support to the midsole members 178 when a user's foot exerts force on the sole structure 104. In such embodiments, when a user wearing the article of footwear 100 exerts downward force on the sole structure 104 opposite a ground surface, the frame 170 can flex inward toward the midsole members 178 while the midsole members 178 compress between the user's foot and the ground surface. In some embodiments, the upper portions 180 of the midsole members 178 can be comprised of a different material than the bottom portions 182 of the midsole members 178. In such embodiments, for example, the bottom portions 182 of the midsole members 178 can be comprised a first material that provides traction between the midsole members 178 and a ground surface while the upper portions 180 of the midsole members 178 are comprised of a second material that provides cushioning to a user wearing the article of footwear 100.

Likewise, the frame 170 can be comprised of two or more materials having different properties. For example, the lateral side 190, the medial side 192 (see FIGS. 4 and 5), the distal side 196, and/or the proximal side 198 of the frame 170 that are adjacent to the midsole region 162 can be comprised of a first material that is flexible while the bottom side 194 of the frame 170 adjacent to the outsole region 164 can be comprised of a second material that is more rigid than the first material. In such embodiments, portions of the lateral side 190 and the medial side 192 (see FIGS. 4 and 5) of the frame 170 can be comprised of a third material that is more elastic than the first material. Such portions of the lateral side 190 and the medial side 192 (see FIGS. 4 and 5) comprised of the third elastic material can be utilized as a fastening member of the fastening mechanism 172 in some embodiments. For example, the first fastening member or lace 176 can extend through the apertures 188 disposed on the lateral side 190 and the medial side 192 (see FIGS. 4 and 5) of the frame 170 in addition to, or instead of, the second fastening members or lace retainers 174. In such embodiments, the third material comprising the portions of the lateral side 190 and the medial side 192 (see FIGS. 4 and 5) of the frame 170 can allow for elastic deformation of the frame 170 under tension by the lace 176. In such embodiments, elastic deformation of the frame 170 may be defined as one or more portions of the lattice-work structure of the frame 170 being configured to sustain an elastic deformation when a force (e.g., the tensile force of the tightened lace 176) is applied to the one or more portions of the frame 170 and to self-recover the original shape of the lattice-work structure of the frame 170 when the force is removed (e.g., when the lace 176 is loosened).

As discussed above, the frame 170 can extend along various portions of the upper 102, which encases the user's foot 128 (see FIG. 3). Accordingly, in some embodiments, at least the lattice-work structure of the frame 170 defined by the plurality of apertures 188 can be formed of a material configured to adapt to a wearer's foot. For example, in such embodiments, the lattice-work structure of the frame 170 can be formed of an elastic material that is configured to adapt and elastically deform around contours of the wearer's foot, including expanding to a first length at some locations of the wearer's foot while expanding to a second length that is greater than the first length at other locations of the wearer's foot. In some such embodiments, the material forming the lattice-work structure of the frame 170 can be configured to maintain a shape corresponding to contours of a wearer's foot after the article of footwear 100 is worn by the user for some time. In other embodiments, the material forming the lattice-work structure of the frame 170 can be configured to adapt and elastically deform in response to bending of the sole structure 104 and/or upper 102 (e.g., when the forefoot region 108 of bottom surface 166 of the outsole 164 contacts a ground surface while the heel region 112 of the bottom surface 166 of the outsole 164 is raised from the ground surface during a particular phase of the wearer's stride) and then to self-recover to the non-bending shape of the lattice-work structure of the frame 170 when the sole structure 104 and/or upper 102 return to the original shape (e.g., when the forefoot and heel regions 108, 112 of the bottom surface 166 of the outsole 164 simultaneously contact the ground surface during a different phase of the wearer's stride or when the wearer is standing stationary).

As discussed above, the frame 170 can be comprised of a translucent or partially transparent material. In this regard, FIG. 5 illustrates an alternative embodiment of the frame 170 as being translucent, such that the entirety of the bottom portions 182 of the midsole members 178 are at least partially visible from the bottom surface 166 of the article of footwear 100 through the translucent frame 170, in addition to portions of the midsole members 178 being visible through the apertures 188 disposed on the bottom side 194 of the frame 170. In some embodiments, the upper portions 180 of the midsole members 178 and/or portions of the upper 102 covered by the frame 170 can be visible or partially visible from a side (such as, e.g., the lateral side 116) of the article of footwear 100 through the frame 170, in addition to portions thereof being visible through the apertures 188 disposed on the lateral side 190, the medial side 192, the distal side 196, and/or the proximal side 198 of the frame 170. In some embodiments, portions of the frame 170 can be translucent and other portions of the frame 170 can be opaque. For example, in some embodiments, the lateral side 190 of the frame 170 can be translucent while the medial side 192, the bottom side 194, the distal side 196, and/or the proximal side 198 of the frame 170 can be opaque.

Referring again to FIGS. 1, 4, and 5, in some embodiments, one or more of the midsole members 178 and/or the frame 170 can be configured to be removably attached to the sole structure 104. For example, in some embodiments, at least some portions of the frame 170 may be comprised of an elastic material and the frame 170 may be configured such that a user can remove the frame 170 from the fixedly attached midsole members 178 by inserting a finger into one or more of the apertures 188 and pulling the frame 170 outward and downward relative to the upper 102. In another example, both the frame 170 and one or more midsole members 178 can be removably attached to the upper 102, such that the frame 170 can be removed, one or more midsole members 178 can be replaced with a different midsole member 178 that can have different properties, and then the frame 170 can be reattached over the different midsole member 178. In some embodiments, the midsole members 178 can be unattached to the upper 102 and the frame 170 can be configured to hold the midsole members 178 in contact with the upper 102 and/or contain the midsole members 178 in a particular arrangement with one another. In such embodiments, the frame 170 can further include one or more protrusions (not shown) extending from the interior surface 186 that can be configured to extend at least partially between the unattached midsole members 178.

Referring still to FIGS. 1, 4 and 5, the midsole members 178 and/or the frame 170 may be formed through additive manufacturing techniques, such as by 3D printing. To that end, a number of 3D printed techniques may be implemented to form the midsole members 178 and/or the frame 170, such as vat photopolymerization, material jetting, binder jetting, powder bed fusion, material extrusion, directed energy deposition, and/or sheet lamination. In some embodiments, the frame 170, or components thereof, may be 3D printed directly upon the midsole members 178 or along a portion of the upper 102. In some embodiments, the frame 170, or components thereof, may be 3D printed and then separately coupled with a portion of the article of footwear 100.

Referring now to FIGS. 6-14, another exemplary embodiment of an article of footwear 200 is depicted, which includes an upper 202, a sole structure 204 having a midsole or midsole region 262 and an outsole or outsole region 264, and a frame 270. The article of footwear 200 is similar to previous embodiments, with like elements being indicated by similar reference numerals under the "2xx" series of reference numerals. For example, the upper 202 of the article of footwear 200 has an interior surface 252, an exterior surface 254, and an instep region 258, just as the upper 102 of the article of footwear 100 has the interior surface 152, the exterior surface 154, and the instep region 158 (see FIG. 1). Further, the sole structure 204 of the article of footwear 200 includes a plurality of midsole members 278 arranged within a frame internal cavity 299 (sec FIGS. 6 and 7) of the frame 270, similar to the sole structure 104 of the article of footwear 100. While the article of footwear 200 is similar to the previous embodiment in many aspects, there are some aspects that differ. In particular, the fastening mechanism 272 further includes third fastening members or a second plurality of lace retainers 274*b* in addition to the second fastening members or the first plurality of lace retainers 274*a*.

Figure 6:
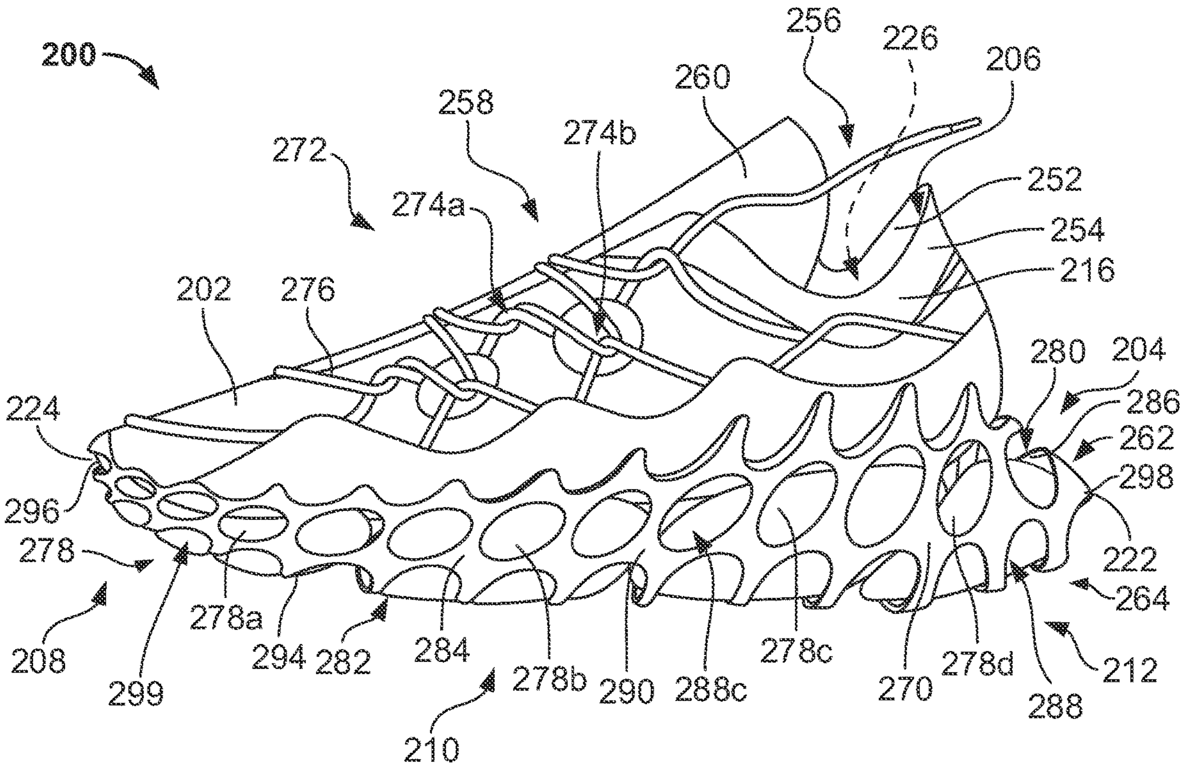
FIG. 6 is a lateral side view of another example of an article of footwear that is similar to the article of footwear of FIG. 1.
Figure 7:
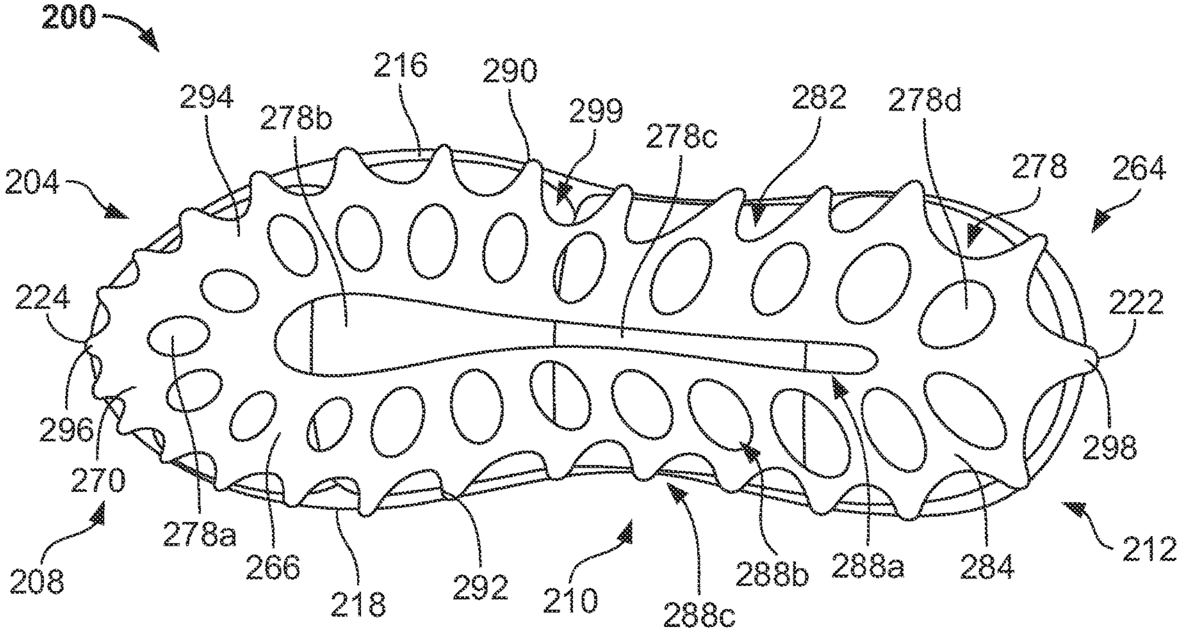
FIG. 7 is a bottom view of the article of footwear of FIG. 6.

Referring specifically to FIGS. 6 and 7, the first fastening member or the lace 276 extends in a crisscrossing manner across the tongue 260 and through the first and second pluralities of lace retainers 274*a*, 274*b* in an alternating sequence or in series, i.e., through one of the first plurality of lace retainers 274*a*, across the tongue 260, through one of the second plurality of lace retainers 274*b*, and so on. In the illustrated embodiment, the second plurality of lace retainers 274*b* are arranged between the first plurality of lace retainers 274*a* and the sole structure 204. The first and second pluralities of lace retainers 274*a*, 274*b* can each be formed by a single lace or strip of material extending around and partially adhered to the lateral side 216 and the medial side 218 (see FIG. 7) of the upper 102 and having one or more disconnected portions that can form the first and second pluralities of lace retainers 274*a*, 274*b*.

Referring still to FIGS. 6 and 7, the frame 270 extends along the lateral side 216, the medial side 218 (see FIG. 7), the proximal end 222, and the distal end 224 of the sole structure 204 and along at least a lower portion of the upper 202. Similar to the embodiment illustrated in FIGS. 1-5, the frame 270 has a lattice-work structure formed by a plurality of apertures 288, including a first plurality of apertures 288*a* disposed at least partially along the lateral side 290, the medial side 292, the distal side 296, and/or the proximal side 298 of the frame 270 and extending through the exterior and interior surfaces 284, 286 of the frame 270 and into the frame internal cavity 299. However, unlike the previous embodiment of FIGS. 1-5, the frame 270 includes a large central aperture 288*b* defined on the bottom side 294 of the frame 270 that extends partially along the forefoot, midfoot, and heel regions 208, 210, 212 between the lateral side 216 and the medial side 218 (see FIG. 7) of the article of footwear 200. The bottom side 294 of the frame 270 further includes a second plurality of apertures 288*c* (see FIG. 6) disposed around a perimeter of the large central aperture 288*b*. Similar to the first plurality of apertures 288*a*, the large central aperture 288*b* and the second plurality of apertures 288*c* extend through the exterior and interior surfaces 284, 286 of the frame 270 and into the frame internal cavity 299.

With continued reference to FIGS. 6 and 7, in the illustrated embodiment, each of the midsole members 278 extend from the lateral side 216 to the medial side 218 (see FIG. 7) of the sole structure 204. The plurality of midsole members 278 includes a first or forefoot midsole member 278*a*, a second or midfoot midsole member 278*b*, a third or distal-heel midsole member 278*c*, and a fourth or proximal-heel midsole member 278*d*. The first midsole member 278*a* is disposed entirely within the forefoot region 208 of the article of footwear 200, and the second midsole member 278*b* is disposed entirely within the midfoot region 210 of the article of footwear 200. The third and fourth midsole members 278*c*, 278*d* are disposed entirely within distal and proximal portions of the heel region 212, respectively, of the article of footwear 200.

Figure 8:
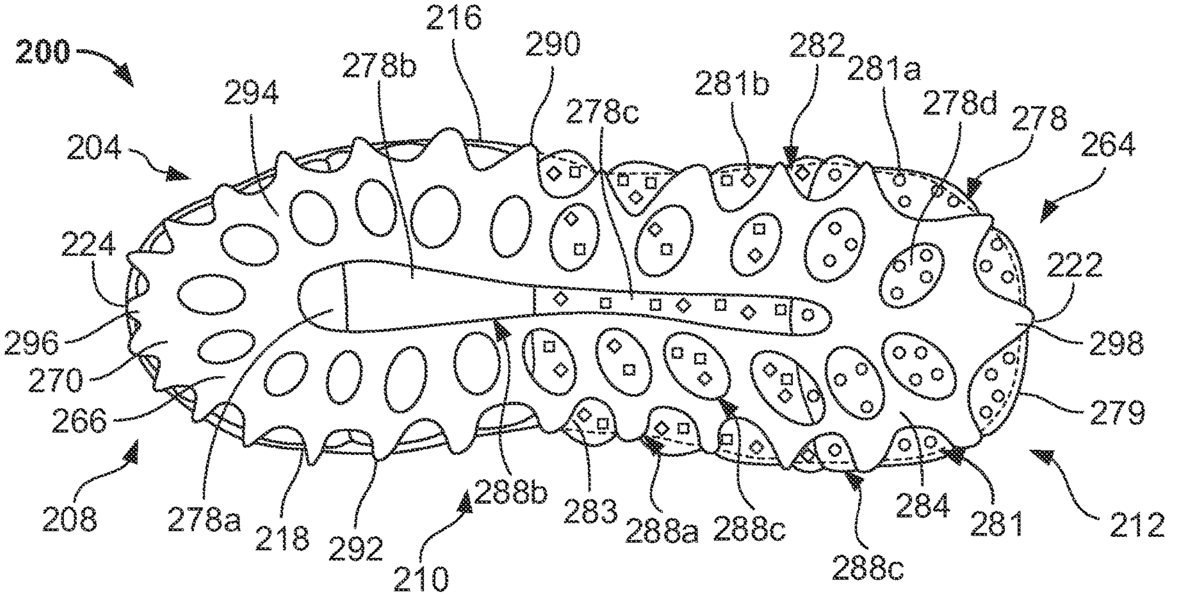
FIG. 8 is a bottom view of the article of footwear of FIG. 6, with another example midsole member in a first compressed configuration.
Figure 9:
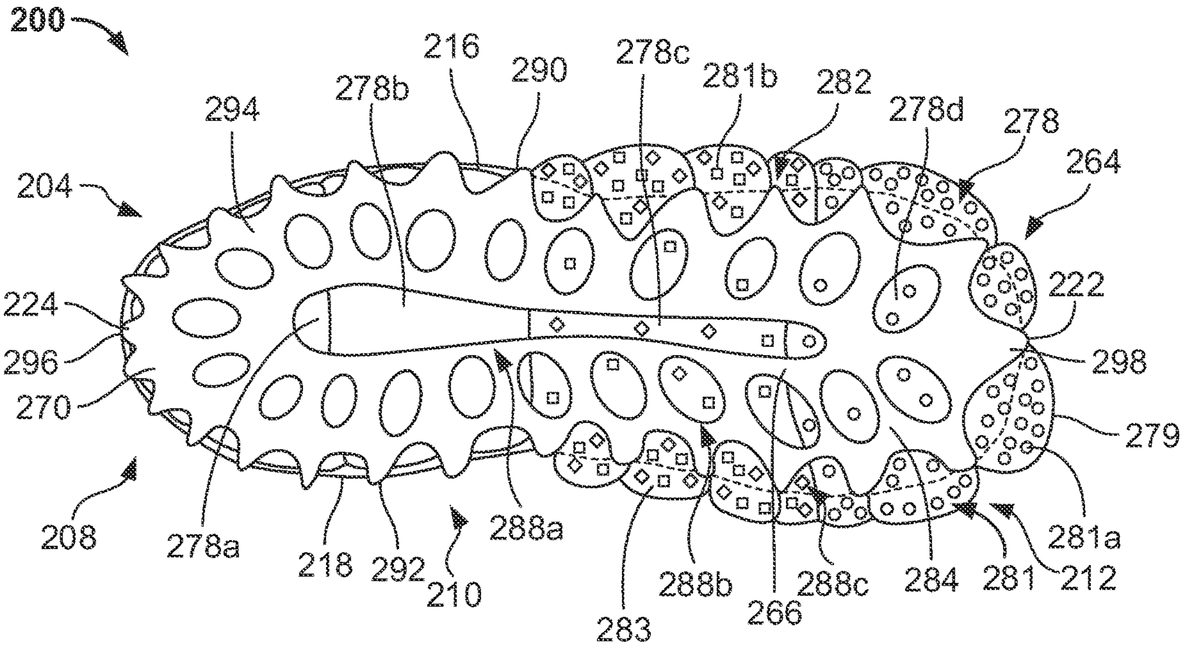
FIG. 9 is a bottom view of the article of footwear of FIG. 8, with the example midsole member in a second compressed configuration.

In some embodiments, one or more of the midsole members 278 may be configured such that at least some portions of such midsole members 278 can expand through one or more of the first plurality of apertures 288*a* disposed on the lateral side 290, the medial side 292, and the proximal side 298 of the frame 270 when the sole structure 204 is compressed by a user's foot. For example, FIGS. 8 and 9 illustrate the article of footwear 200 with various amounts of force applied downward on the insole 226 (see FIG. 6) of the sole structure 204, such as downward force applied by a user's foot while in stride, and with the third and fourth midsole members 278*c*, 278*d* being configured to be expandable and the first and second midsole members 278*a*, 278*b* being configured to be non-expandable. Referring specifically to FIG. 8, the article of footwear 200 is shown in a first compressed position when a first amount of force is applied downward on the insole 226 (see FIG. 6) of the sole structure 204. In the first compressed position, the midsole members 278 of the sole structure 204 are compressed between the downward force on the insole 226 (see FIG. 6) and an opposing ground surface (not shown) contacting the bottom surface 266 of the outsole 264 of the sole structure 204, causing the third and fourth midsole members 278*c*, 278*d* to expand partially outward through the first plurality of apertures 288*a* of the frame 270. In such embodiments, the frame 270 may be configured to compress along at least the lateral and medial sides 290, 292 of the frame 270 to a lesser or equal distance in which the midsole members 278 are compressed. In other embodiments, the frame 270 may be configured to be caused to move upward toward the opening 256 (see FIG. 6) of the upper 202 when the sole structure 204 is compressed.

Referring specifically to FIG. 9, the article of footwear 200 is shown in a second compressed configuration when a second amount of force, greater than the first amount of force, is applied downward on the insole 226 (see FIG. 6) of the sole structure 204. In the second compressed position, the midsole members 278 of the sole structure 204 are compressed further between the greater downward force on the insole 226 (see FIG. 6) and the opposing ground surface (not shown) contacting the bottom surface 266 of the outsole 264 of the sole structure 204, causing the third and fourth midsole members 278*c*, 278*d* to expand further outward through the first plurality of apertures 288*a* of the frame 270. In some embodiments, the midsole members 278 may be configured to expand at least partially outward through the central aperture 288*b* and/or the second plurality of apertures 288*c* disposed on the bottom side 294 of the frame 270 when the sole structure 204 is compressed. In such embodiments, at least a bottom surface of the midsole members 278 may be comprised of a material that provides traction between the expanded portions of the midsole members 278 extending through the central aperture 288*b* and/or the second plurality of apertures 288*c* and the ground surface when the sole structure 204 is compressed.

Referring still to FIGS. 8 and 9, and as noted above, the first and second midsole members 278*a*, 278*b* located in the forefoot and midfoot regions 208, 210, respectively, are configured to be non-expandable when the sole structure 204 is compressed, and the third and fourth midsole members 278*c*, 278*d* located in the heel region 212 are configured to be expandable when the sole structure 204 is compressed. Thus, when the sole structure 204 is compressed in the illustrated embodiment, the third and fourth midsole members 278*c*, 278*d* expand through the first plurality of apertures 288*a* while the first and second midsole members 278*a*, 278*b* do not expand through the first plurality of apertures 288*a*. In other embodiments, the midsole members 278 located in the forefoot, midfoot, and heel regions 208, 210, 212 can be configured to be expandable through the first plurality of apertures 288*a* when the sole structure 204 is compressed.

Still referring to FIGS. 8 and 9, the midsole members 278 may be comprised of an outer casing 279 with a plurality of plastic bodies 281 disposed within the outer casing 279. In some embodiments, the outer casing 279 of one or more of the midsole members 278 may be comprised of a translucent or partially translucent material such that the plastic bodies 281 disposed therein are visible therethrough and, thus, visible from an outside of the article of footwear 200 through the apertures 288. In such embodiments, a fluid 283 may be contained within the outer casing 279 of the midsole members 278 such that the plastic bodies 281 are suspended in the fluid 283 and free to move relative to each other within the outer casing 279. Thus, the fluid 283 may permit the plastic bodies 281 to move outwardly relative to an outer perimeter of the frame 270 into portions of the midsole members 278 that expand through the first plurality of apertures 288*a* of the frame 270, as shown in FIG. 9. In other embodiments, the fluid 283 may be a binder such that movement of the plurality of plastic bodies 281 relative to each other is at least partially constrained.

With continued reference to FIGS. 8 and 9, the plurality of plastic bodies 281 may be of a variety of shapes and sizes. For example, in the illustrated embodiment of FIGS. 8 and 9, a first plurality of plastic bodies 281*a* disposed within the fourth midsole member 278*d* have a different shape and size than a second plurality of plastic bodies 281*b* disposed within the third midsole member 278*c*. In some embodiments, the plurality of plastic bodies 281 are spherical and/or ellipsoidal shaped. In such embodiments, the spherical and/or ellipsoidal shaped plastic bodies 281 have dimensions, in the three spatial direction, in a range between about 1 millimeter (mm) and about 18 mm, in a range between about 2 mm and about 12 mm, or in a range between about 3 mm and about 10 mm. In some embodiments, the plurality of plastic bodies 281 has other varying properties within the same or different midsole members 278*a*, 278*b*, 278*c*, 278*d*. For example, in the illustrated embodiment of FIGS. 8 and 9, the first plurality of plastic bodies 281*a* may have varying colors within the fourth midsole member 278*d* or the first and second plurality of plastic bodies 281*a*, 281*b* may have differing colors within the third and fourth midsole members 278*c*, 278*d*, respectively. In some embodiments, the plastic bodies 281 may comprise between about 30% to about 95% of a weight of the midsole members 278, and the fluid 283 may comprise between about 5% to about 70% of the weight of the midsole members 278. In other embodiments, the plastic bodies 281 may comprise about 50% to about 60% of the weight of the midsole members 278, and the fluid 283 may comprise about 40% to about 50% of the weight of the midsole members 278.

Figure 10:
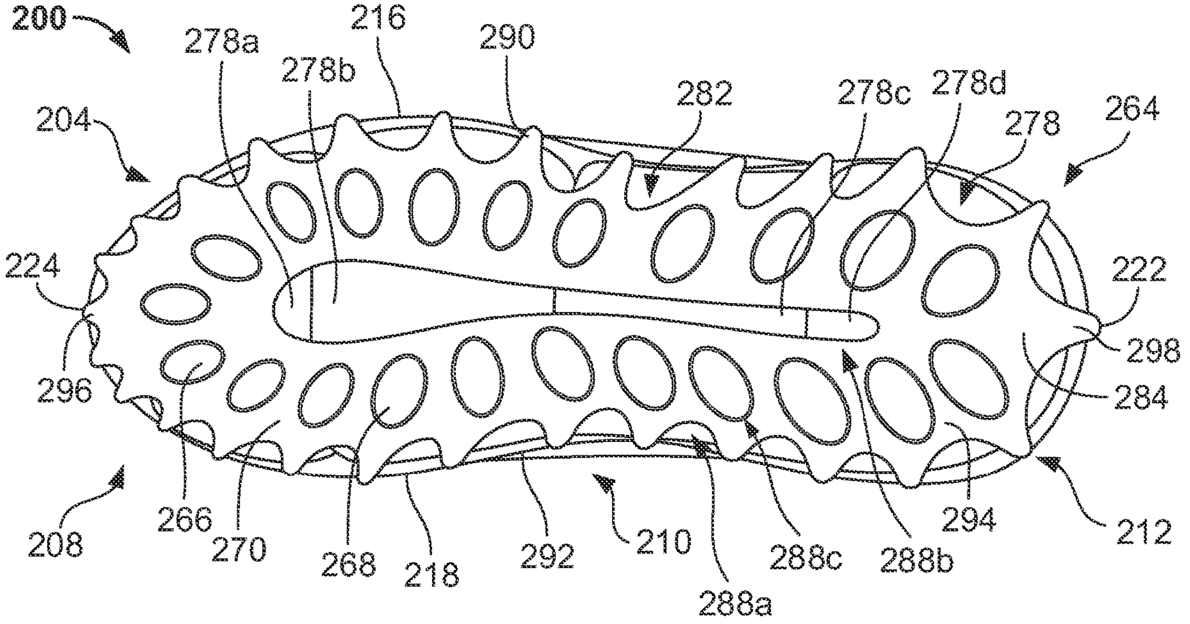
FIG. 10 is a bottom view of the article of footwear of FIG. 6, with an example outsole member included in the frame.

Referring specifically to FIG. 10, the frame 270 of the article of footwear 200 may be configured to receive an outsole member 268 disposed between the bottom portions 282 of the midsole members 278 and the interior surface 286 along the bottom side 294 of the frame 270. In the illustrated embodiment, the outsole member 268 is arranged such that portions of the outsole member 268 cover some of the second plurality of apertures 288*c* disposed on the bottom side 294 of the frame 270. In some embodiments, the bottom side 294 of the frame 270 and the outsole member 268 can together define the bottom surface 266 of the outsole 264 of the article of footwear 200. In some embodiments, the outsole member 268 can cover each of the apertures 288 disposed on the bottom side 294 of the frame 270. In some embodiments, the outsole member 268 can be comprised of a material that is different than the frame 270 and/or the midsole members 278. For example, in such embodiments, the outsole member 268 can be comprised of a first material that is configured to provide traction between the article of footwear 200 and a ground surface, the frame 270 can be comprised of a second material that is configured to provide structural support to the article of footwear 200, and the midsole members 278 can be comprised of a third material that is configured to provide cushioning to a user wearing the article of footwear 200.

Figure 11:
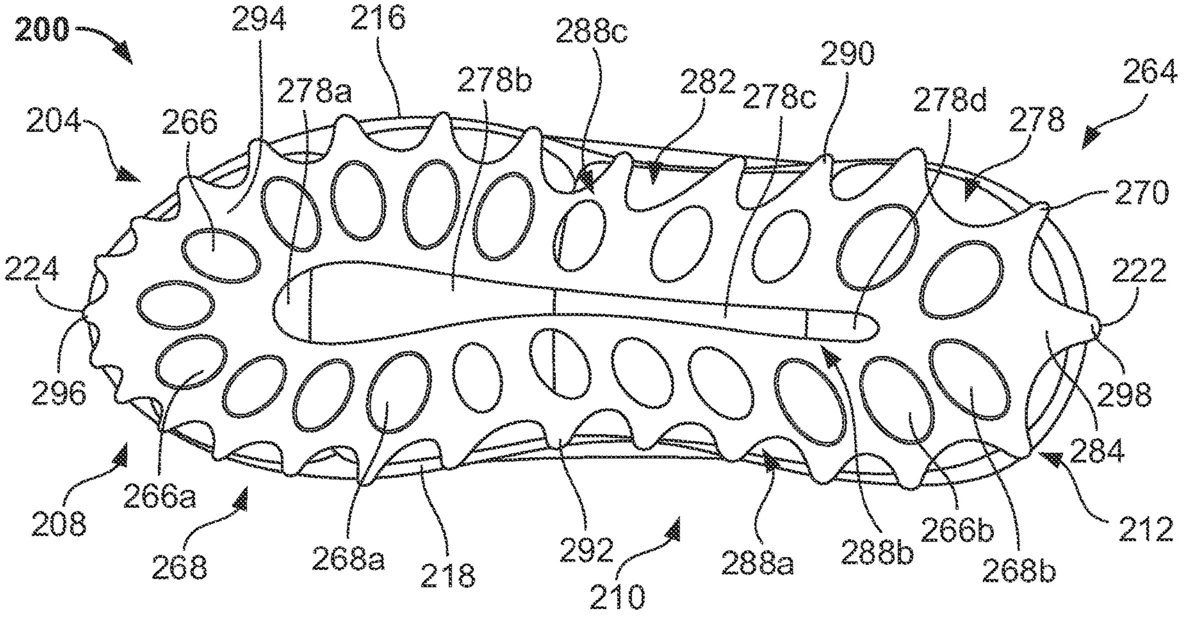
FIG. 11 is a bottom view of the article of footwear of FIG. 6, with another example outsole member included in the frame.

Referring specifically to FIG. 11, the outsole member 268 can include a first or distal outsole member 268*a* and a second or proximal outsole member 268*b*. Additionally, in such embodiments, the first and second outsole members 268*a*, 268*b* can be arranged such that some of the apertures 288 disposed on the bottom side 294 of the frame 270 open to the first or second outsole members 268*a*, 268*b* and some of the apertures 288 disposed on the bottom side of the frame 270 open to the bottom portions 282 of one or more of the midsole members 278*a*, 278*b*, 278*c*, 278*d*. In some embodiments, the first and second outsole members 268*a*, 268*b* and the bottom side 294 of the frame 270 can collectively define the bottom surface 266 of the outsole 264 of the sole structure 204. More specifically, in such embodiments, the first outsole member 268*a* can define a first or distal bottom surface portion 266*a* of the bottom surface 266, the second outsole member 268*b* can define a second or proximal bottom surface portion 266*b* of the bottom surface 266, and the bottom side 294 of the frame 270 can define the remaining portion(s) of the bottom surface 266. In some embodiments, the outsole member 268 can comprise three or more outsole members.

Figure 12:
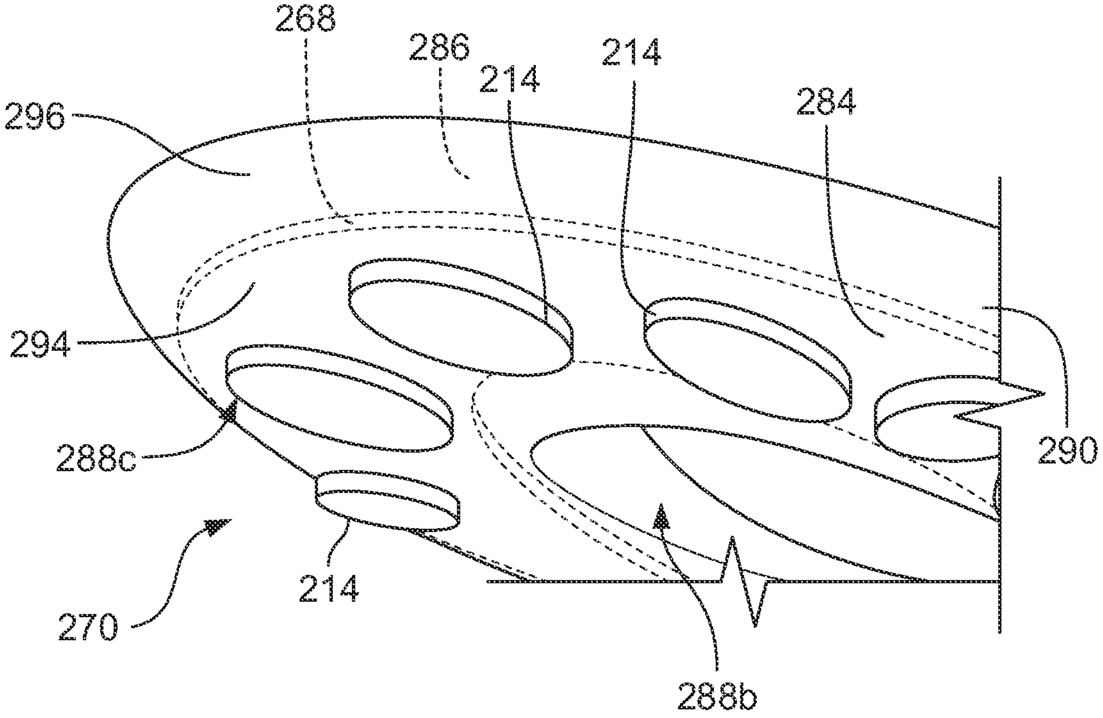
FIG. 12 is a bottom-distal side partial detail view of the frame and the outsole member of the article of footwear of FIG. 10.
Figure 13:
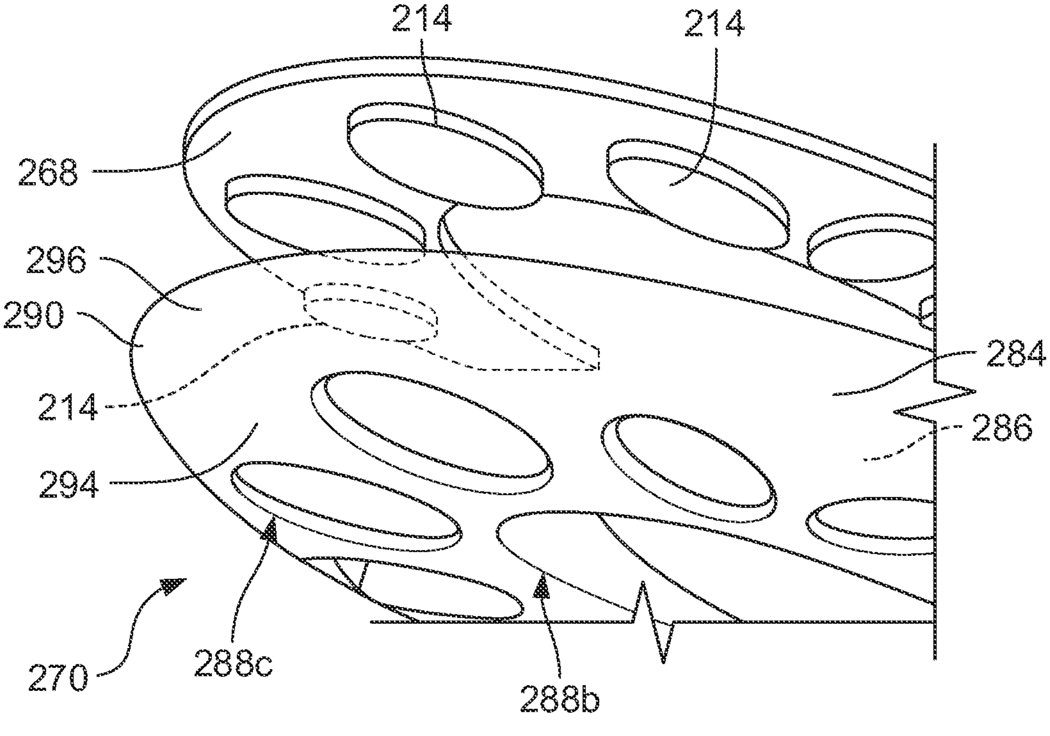
FIG. 13 is an exploded view of FIG. 12.

FIGS. 12 and 13 depict detail views of the outsole member 268 positioned on the interior surface 286 of the bottom side 294 of the frame 270, with the lateral, medial, and distal sides 290, 292, 296 of the frame 270 including the first plurality of apertures 288*a* having been removed for illustration purposes. As illustrated in FIGS. 12 and 13, the outsole member 268 can include a plurality of protrusions 214 that are configured to align with some of the apertures 288 along the bottom side 294 of the frame 270, such as the second plurality of apertures 288*c*, when the outsole member 268 is included between the interior surface 286 of the frame 270 and the bottom portions 282 of midsole members 278. More specifically, in the illustrated embodiment, the plurality of protrusions 214 extend downwardly from the outsole members 268 away from the midsole members 278 such that the plurality of protrusions 214 can be at least partially received within the second plurality of apertures 288*c* of the frame 270 and extend from the interior surface 286 toward the exterior surface 284 of the frame 270. As discussed above, in some embodiments, the article of footwear 200 can be configured such that the frame 270 is removably attached to the sole structure 204. In such embodiments, the outsole member 268 can be inserted into or removed from the interior surface 286 of the frame 270 when the frame 270 is removed from the sole structure 204 by a user. For example, if the protrusions 214 of the outsole member 268 wear down after repeated use of the article of footwear 200, a user can remove the frame 270, replace the worn-down outsole member 268 with a new outsole member 268 that is inserted into the interior surface 286 of the frame 270, and then reattach the frame 270 to the sole structure 204 of the article of footwear 200.

Figure 14:
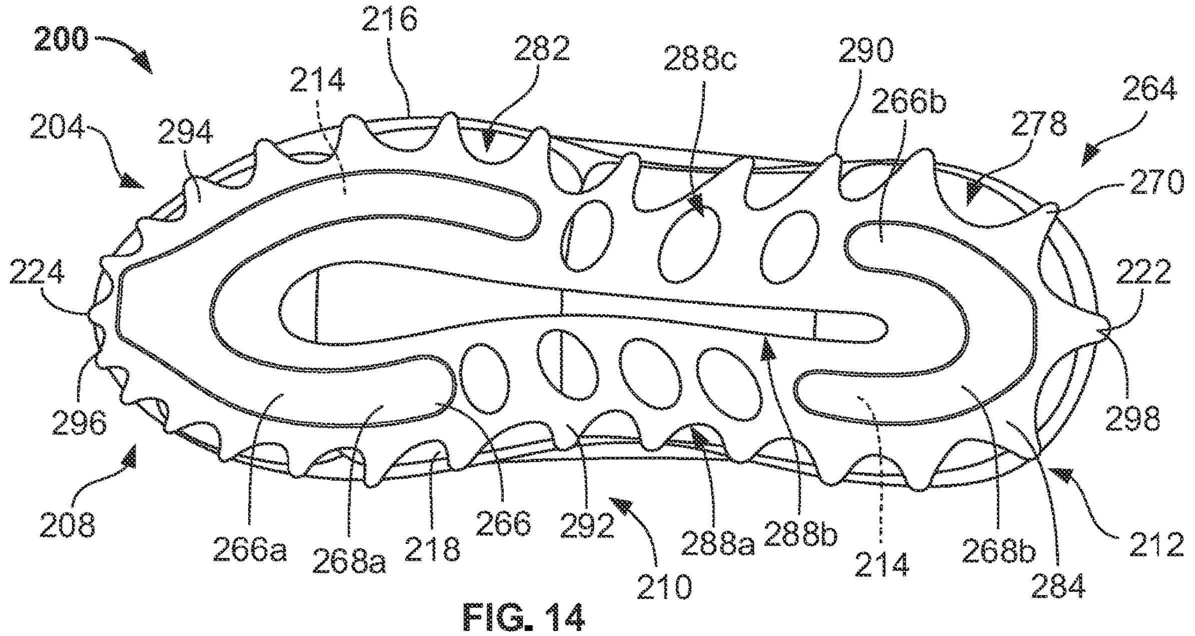
FIG. 14 is a bottom view of the article of footwear of FIG. 6, with yet another example outsole member included in the frame.
Figure 15:
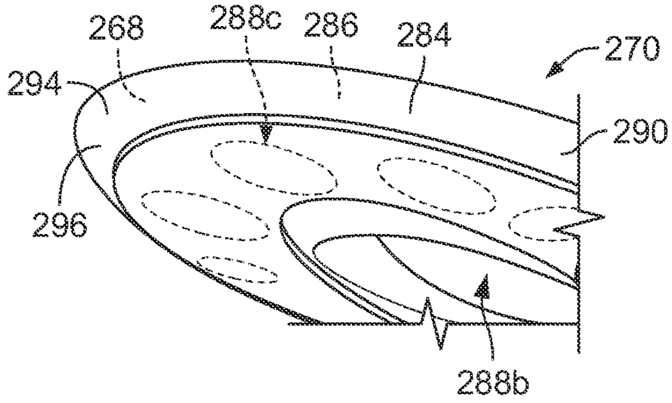
FIG. 15 is a bottom-distal side partial detail view of the frame and the outsole member of the article of footwear of FIG. 14.
Figure 16:
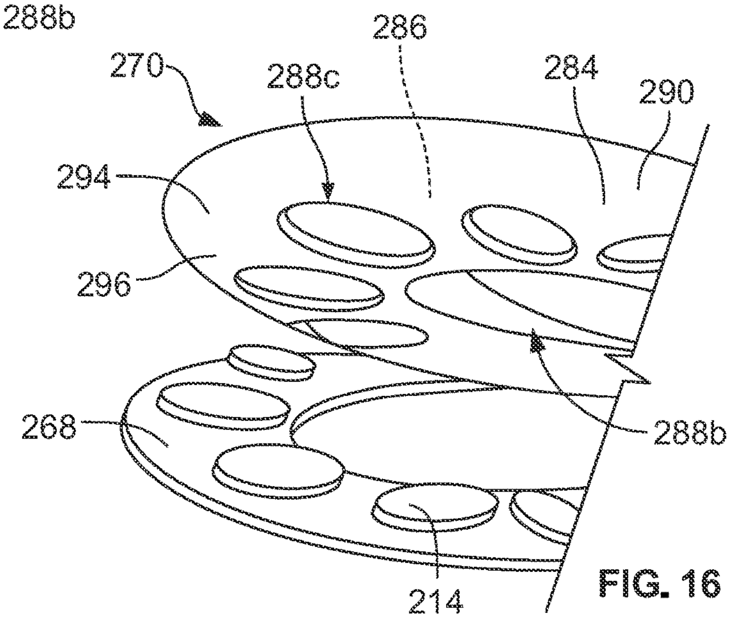
FIG. 16 is an exploded view of FIG. 15.
Figure 17:
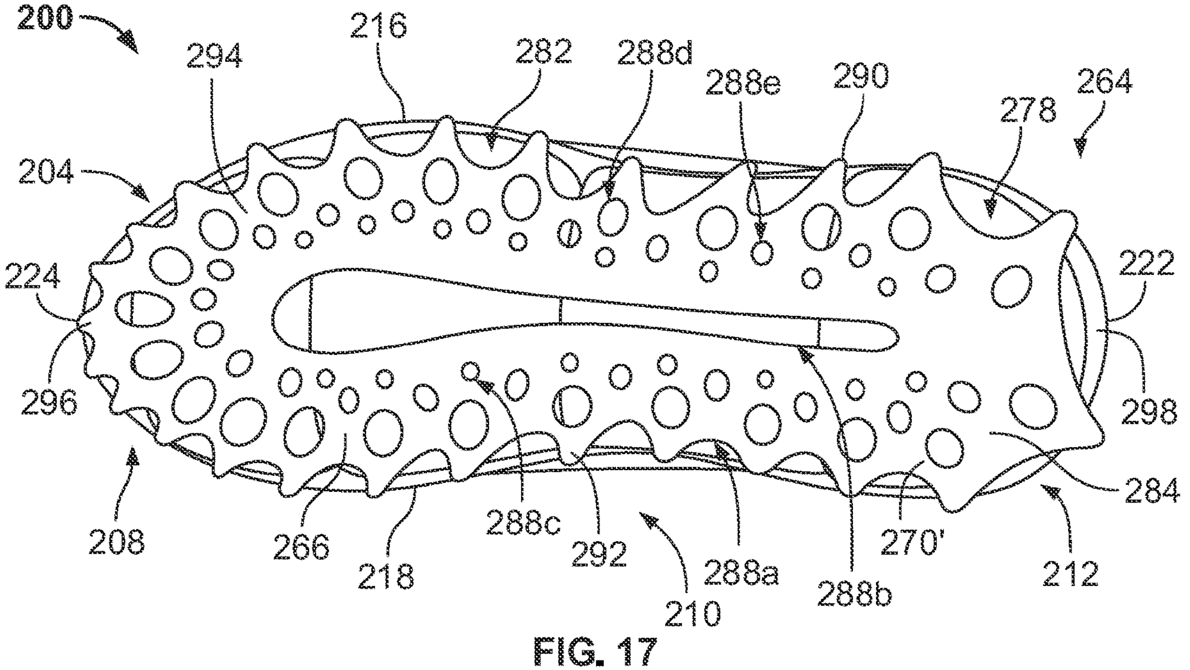
FIG. 17 is a bottom view of the article footwear of FIG. 6, with another example frame.

Referring now to FIGS. 14-16, in some embodiments, the outsole member 268 may be configured to be attached to the exterior surface 284 of the frame 270. In this regard, FIGS. 15 and 16 depict detail views of the outsole member 268 positioned on the exterior surface 284 along the bottom side 294 of the frame 270, with the lateral, medial, and distal sides 290, 292, 296 of the frame 270 including the first plurality of apertures 288*a* having been removed for illustration purposes. In such embodiments, the outsole member 268 can include one or more protrusions 214 that are configured to align with, and be disposed within, one or more apertures 288 disposed on the bottom side 294 of the frame 270, such as the second plurality of apertures 288*c*. More specifically, the plurality of protrusions 214 can extend upwardly from the outsole members 268 toward the midsole members 278 such that the plurality of protrusions 214 can be at least partially received within the second plurality of apertures 288*c* of the frame 270 and extend from the exterior surface 284 toward the interior surface 286 of the frame 270. In such embodiments, a user can replace a worn-down outsole member 268 with a new outsole member 268 along the exterior surface 284 of the frame 270 without removing the frame 270 from the sole structure 204.

Referring in particular to FIG. 14, the first outsole member 268*a* is attached to the exterior surface 284 of the frame 270 by engagement of one or more protrusions 214 with at least some of the second plurality of apertures 288*c* of the frame 270 located in the forefoot region 208 and the midfoot region 210. Likewise, the second outsole member 268*b* is attached to the exterior surface 284 of the frame 270 by engagement of one or more protrusions of the second outsole member 268*b* with some of the second plurality of apertures 288*c* of the frame 270 located in the heel region 212. As such, the first and second outsole members 268*a*, 268*b* each form distinct bottom surface portions 266*a*, 266*b* located below the exterior surface 284 of the frame 270 and that at least partially define the bottom surface 266 of the outsole 264 of the article of footwear 200. In some embodiments, the first and second outsole members 268*a*, 268*b* can define the entire bottom surface 266 of the outsole 264 of the article of footwear 200. In some embodiments, the protrusions 214 can be removably attached to surfaces defining the one or more apertures 288 and/or the exterior surface 284 along the bottom side 294 of the frame 270. In some embodiments, the outsole member 268 is fixedly attached to the bottom side 294 of the frame 270 using an adhesive or other known fastening means. In some embodiments, one or more protrusions 214 of the outsole member 268 are attached to the bottom portion 282 of one or more midsole members 278 using an adhesive or other known fastening means.

Referring now to FIGS. 17-20, another exemplary embodiment frame 270' of the article of footwear 200 is depicted. The frame 270' of the article of footwear 200 of FIGS. 17-20 is similar to the previous embodiment of FIGS. 6-16, with like elements being indicated by similar reference numerals. While the frame 270' of the article of footwear 200 of FIGS. 17-20 is similar to the previous embodiment in many aspects, there are some aspects that differ. In particular, the apertures 288 disposed on the bottom side 294 of the frame 270' have a generally circular shape. Further, two or more sets or pluralities of apertures 288 have varying diameters. For example, the second plurality of apertures 288*c* with a diameter D1 is arranged adjacent to the large central aperture 288*b* that is disposed on the bottom side 294 of the frame 270'. A third plurality of apertures 288*d* having a diameter D2, which is larger than the diameter D1 of the second plurality of apertures 288*c*, is arranged toward the periphery of the bottom side 294 of the frame 270'. A fourth plurality of apertures 288*e* having a diameter D3, which is smaller than the diameter D2 of the third plurality of apertures 288*d* but larger than the diameter D1 of the second plurality of apertures 288*c*, is arranged between the second and third pluralities of apertures 288*c*, 288*d* along the bottom side 294 of the frame 270'.

Figure 18:
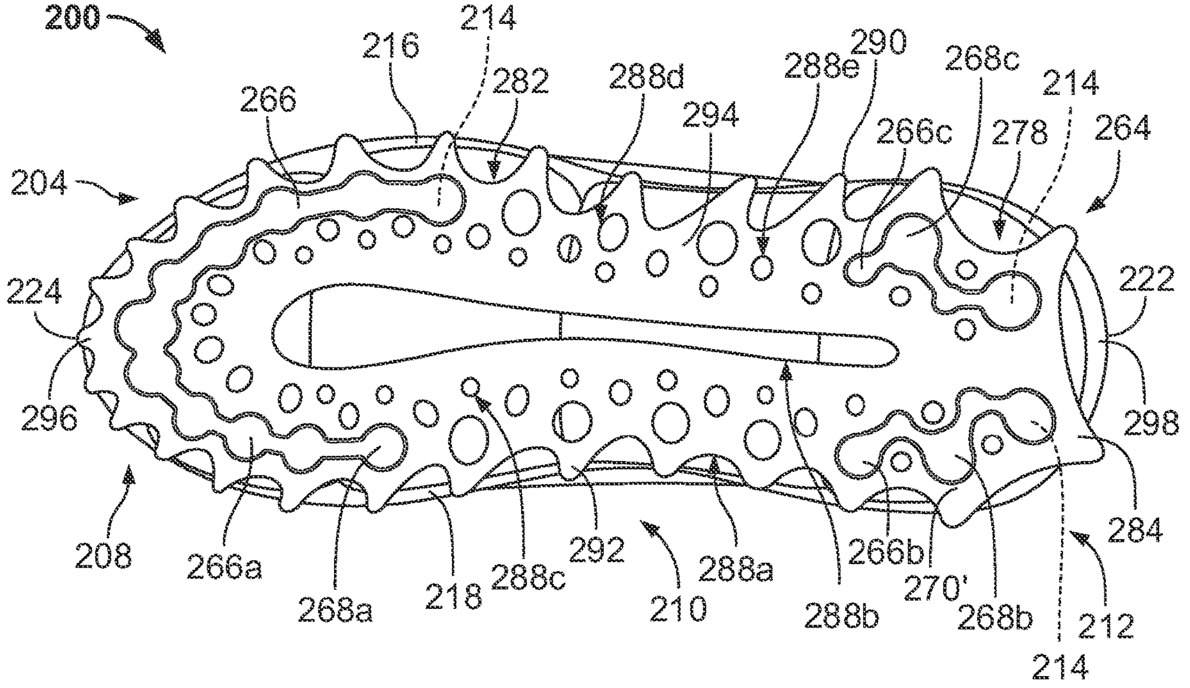
FIG. 18 is a bottom view of the article of footwear of FIG. 17, with an example outsole member included in the frame.
Figure 19:
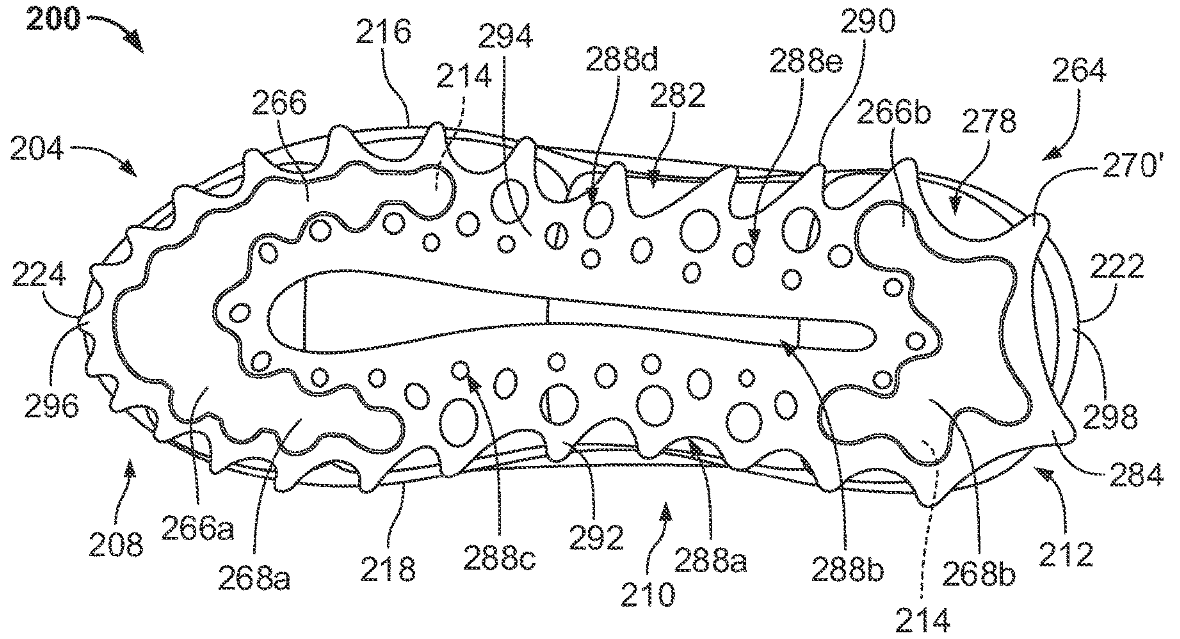
FIG. 19 is a bottom view of the article of footwear of FIG. 17, with another example outsole member included in the frame.
Figure 20:
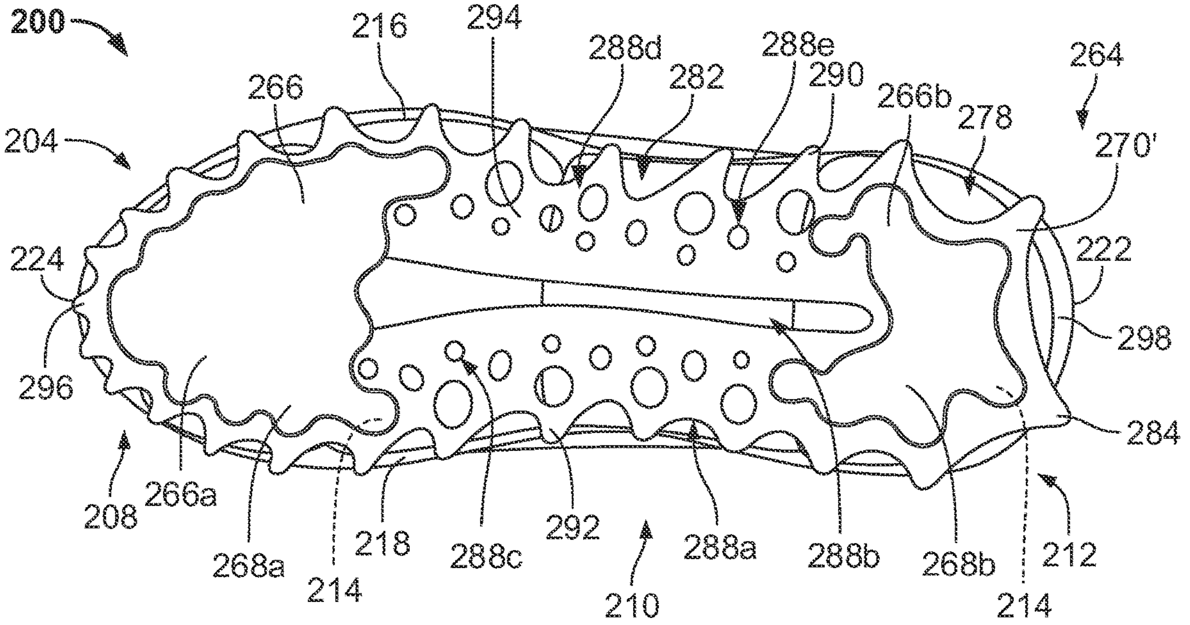
FIG. 20 is a bottom view of the article of footwear of FIG. 17, with yet another example outsole member included in the frame.

In some embodiments, the outsole members 268 can be configured to attach to the exterior surface 284 of the frame 270' via one or more protrusions 214 that are configured to be received by apertures 288 disposed on the bottom side 294 of the frame 270', similar to the exemplary outsole members 268 of FIGS. 14-16 described above, but can be further configured to be received by two or more apertures 288 of varying shapes and sizes. Referring specifically to FIGS. 18 and 19, in the illustrated embodiment, the protrusions 214 of the one or more outsole members 268 may be configured to be received by only one of the second, third, or fourth pluralities of apertures 288*c*, 288*d*, 288*c* (such as, e.g., the first outsole member 268*a* of FIG. 18) disposed on the bottom side 294 of the frame 270' or by two or more of the second, third, and fourth pluralities of apertures 288*c*, 288*d*, 288*c* (such as, e.g., the second and third outsole members 268*b*, 268*c* of FIG. 18 and the first and second outsole members 268*a*, 268*b* of FIG. 19). In some embodiments, the frame 270' and the outsole members 268 may be configured such that the outsole members 268 are removably attached to the exterior surface 284 of the frame 270' via an interference fit between the protrusions 214 and the corresponding apertures 288. In some embodiments, the outsole members 268 can be adhered to the exterior surface 284 of the frame 270' and/or the protrusions 214 extending through the apertures 288 can be adhered to the bottom portions 282 of the midsole members 278. In some embodiments, the protrusions 214 can include a flange (not shown) that can be configured to contact and engage the interior surface 286 of the bottom side 294 of the frame 270'. In such embodiments, the flanges of the protrusions 214 of the outsole members 268 may be adhered to the interior surface 286 of the frame 270'.

In FIG. 18, the first outsole member 268*a* is configured to attach to only the third plurality of apertures 288*d* while the second outsole member 268*b* and the third outsole member 268*c* are configured to attach to both the third and fourth pluralities of apertures 288*d*, 288*c*. Similarly, in FIG. 19, both the first and the second outsole members 268*a*, 268*b* are configured to attach to both the third and the fourth pluralities of apertures 288*d*, 288*e* disposed on the bottom side 294 of the frame 270'. In such embodiments, the outsole members 268 can be configured to attach proximate to the periphery of the bottom side 294 of the frame 270' via the third plurality of apertures 288*d* and proximate to the central aperture 288*b* via the second plurality of apertures 288*c*. Similar to the outsole members 268 of FIGS. 14-16, the first, second, and third outsole members 268*a*, 268*b*, 268*c* of FIG. 18 and the first and second outsole members 268*a*, 268*b* of FIG. 19, respectively, can each form distinct bottom surface portions 266*a*, 266*b*, 266*c* located below the exterior surface 284 of the frame 270' that can at least partially define the bottom surface 266 of the outsole 264 of the article of footwear 200. In this configuration, the frame 270' can provide greater traction to the article of footwear 200 on the bottom side 294 of the frame 270' while providing greater flexibility to the frame 270' and greater support to the article of footwear 200 via the large central aperture 288*b* of the frame 270'.

In some embodiments, the one or more outsole members 268 can be configured to attach to other parts of the frame 270'. For example, referring specifically to FIG. 20, the outsole members 268 can be further configured to at least partially attach to each of the second, third, and fourth pluralities of apertures 288*c*, 288*d*, 288*e* as well as a portion of the large central aperture 288*b* of the frame 270'. In the illustrated embodiment of FIG. 20, the first outsole member 268*a* is attached to the second, third, and fourth pluralities of apertures 288*c*, 288*d*, 288*e* disposed in the forefoot region 208 and is partially attached to a distal portion of the central aperture 288*b* in the forefoot region 208. In such embodiments, the frame 270' and the outsole members 268 can provide even greater traction to the article of footwear 200 on the bottom side 294 of the frame 270' while providing greater flexibility to the frame 270' and support to the article of footwear 200 via the large central aperture 288*b* of the frame 270', i.e., by providing a larger surface area of the bottom surface portion 266*a* for at least the first outsole member 268*a* to contact the ground surface.

Referring to FIGS. 6-20, various components of the article of footwear 200, including the upper 202, the midsole members 278, the frames 270, 270', and/or the outsole members 268, may be formed through additive manufacturing techniques, such as by one or more of the various 3D printing techniques mentioned above. For example, in some embodiments, the frame 270 may be 3D printed using a first material and the outsole members 268 may be simultaneously 3D printed within the frame 270 using a second material that is different than the first material. In some embodiments, the outsole members 268 may be 3D printed separate from the frame 270 and later attached to the frame 270. In some embodiments, the outsole members 268 can be 3D printed such that the protrusions 214 are formed of a first material while the remainder of the outsole members 268 are formed of a second material that is different than the first material.

Referring now to FIGS. 21-26, another exemplary embodiment sole structure 204' and frame 270" of the article of footwear 200 is depicted. The sole structure 204' and the frame 270" of the article of footwear 200 in FIGS. 21-26 are similar to the previous embodiments shown in FIGS. 6-20, with like elements being indicated by similar reference numerals. While the sole structure 204' and the frame 270" of FIGS. 21-26 are similar to previous embodiments in many aspects, there are some aspects that differ. In particular, the midsole members 278 have an interconnected upper portion 280 with the bottom portions 282 extending downward from the upper portion 280 such that one or more gaps 234 extend between the bottom portions 282 of the midsole members 278.

Figure 21:
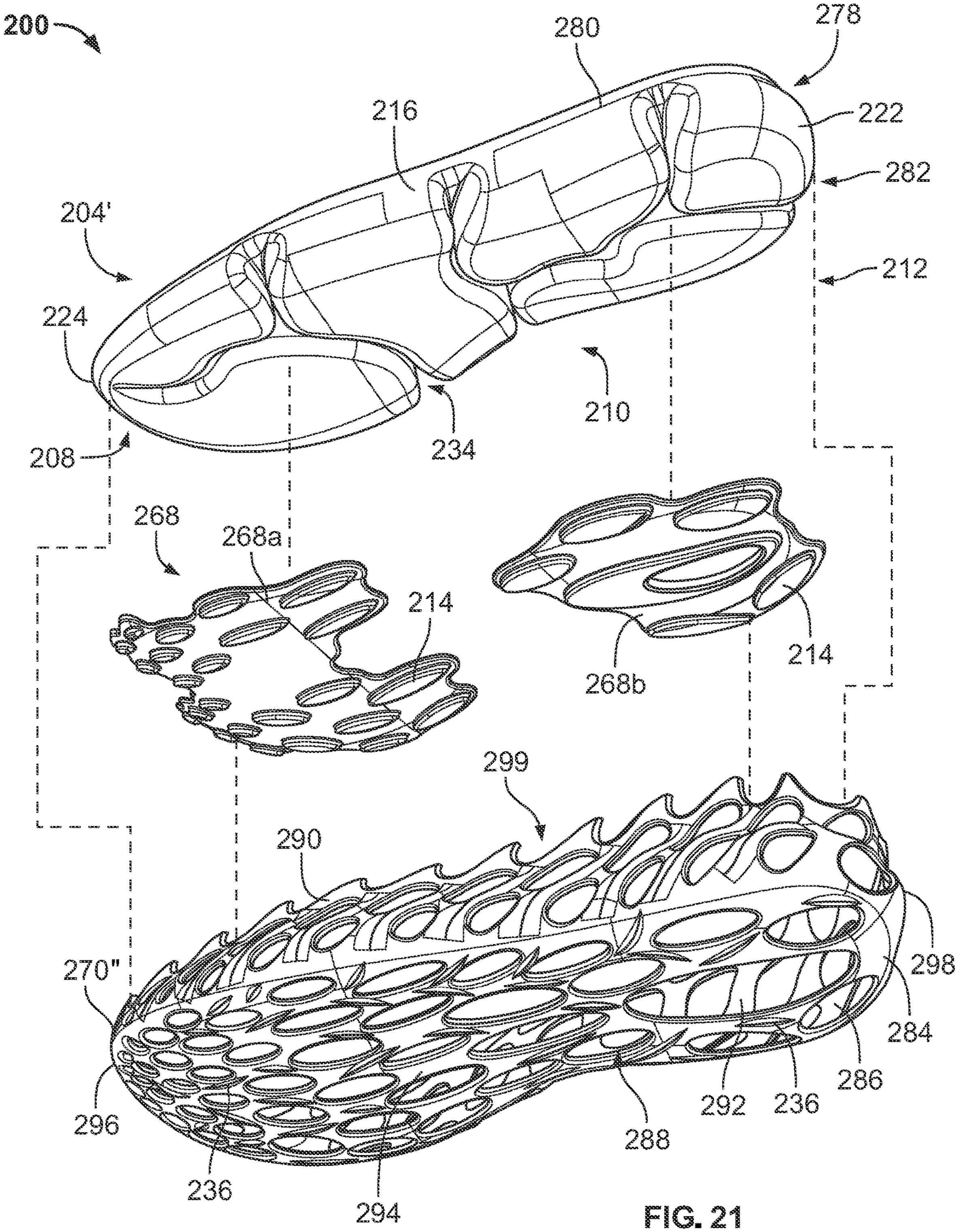
FIG. 21 is a bottom-lateral side perspective exploded view of another example sole structure and a frame of the article of footwear of FIG. 6, with an upper removed.
Figure 23:
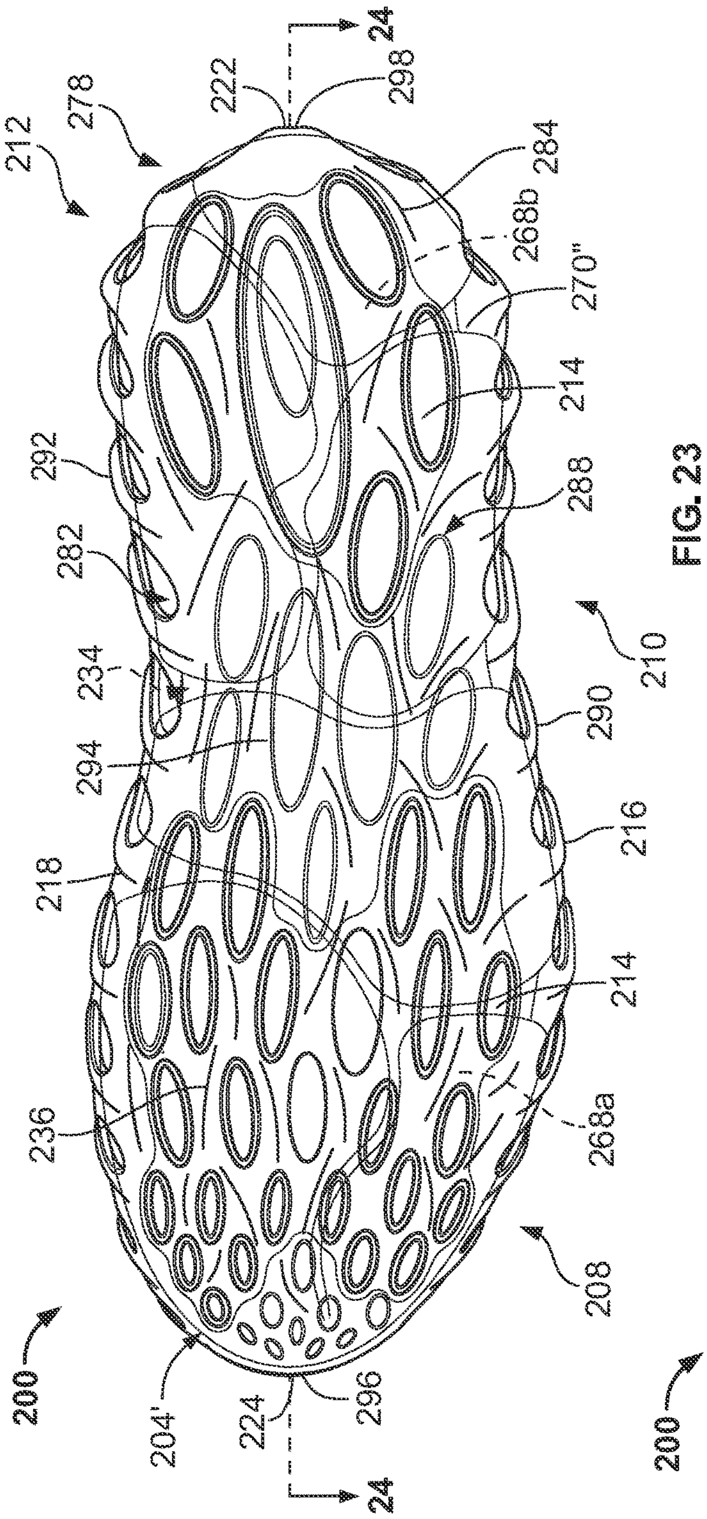
FIG. 23 is a bottom view of the sole structure and the frame of FIG. 21.

Referring specifically to FIG. 21, the sole structure 204' and the frame 270" of the article of footwear 200 are shown in an exploded view. The frame 270" has a lattice-work structure formed by a plurality of apertures 288 disposed on the lateral side 290, medial side 292, bottom side 294, distal side 296, and proximal side 298 and that extend through exterior and interior surfaces 284, 286 of the frame 270" into the frame internal cavity 299. The frame 270" further includes a plurality of outsole members 268 including a first outsole member 268*a* and a second outsole member 268*b*, each having protrusions 214*a*, 214*b* and disposed between a first interior surface 286*a* of the bottom side 294 of the frame 270" and the bottom portions 282 of the midsole members 278. Referring specifically to FIG. 23, the first outsole member 268*a* is disposed in the forefoot region 208 and partially in the midfoot region 210 of the sole structure 204', and the second outsole member 268*b* is disposed entirely in the heel region 212 of the sole structure 204'.

Referring again to FIG. 21, the bottom side 294 of the frame 270" can include a plurality of ribs 236 extending downwardly from the exterior surface 284 and arranged between the plurality of apertures 288. In such embodiments, the plurality of ribs 236 on the bottom side 294 of the frame 270" can be configured to provide additional traction to the article of footwear 200 by at least partially defining the bottom surface 266 of the outsole 264 (see FIG. 26). Further, in some embodiments, the plurality of ribs 236 can provide increased structural support to the bottom side 294 of the frame 270". In some embodiments, the ribs 236 extend from the exterior surface 284 of the frame 270" to a distance that is equal to or less than a distance that the protrusions 214*a*, 214*b* of the outsole members 268 extend past the exterior surface 284 of the frame 270". In some embodiments, the ribs 236 are comprised of a material having one or more properties that are different than a material that comprises at least the bottom side 294 of the frame 270". For example, the bottom side 294 of the frame 270" can be comprised of a first material while the ribs 236 can be comprised of a second material that has a greater hardness or has greater frictional attributes than the first material.

Figure 22:
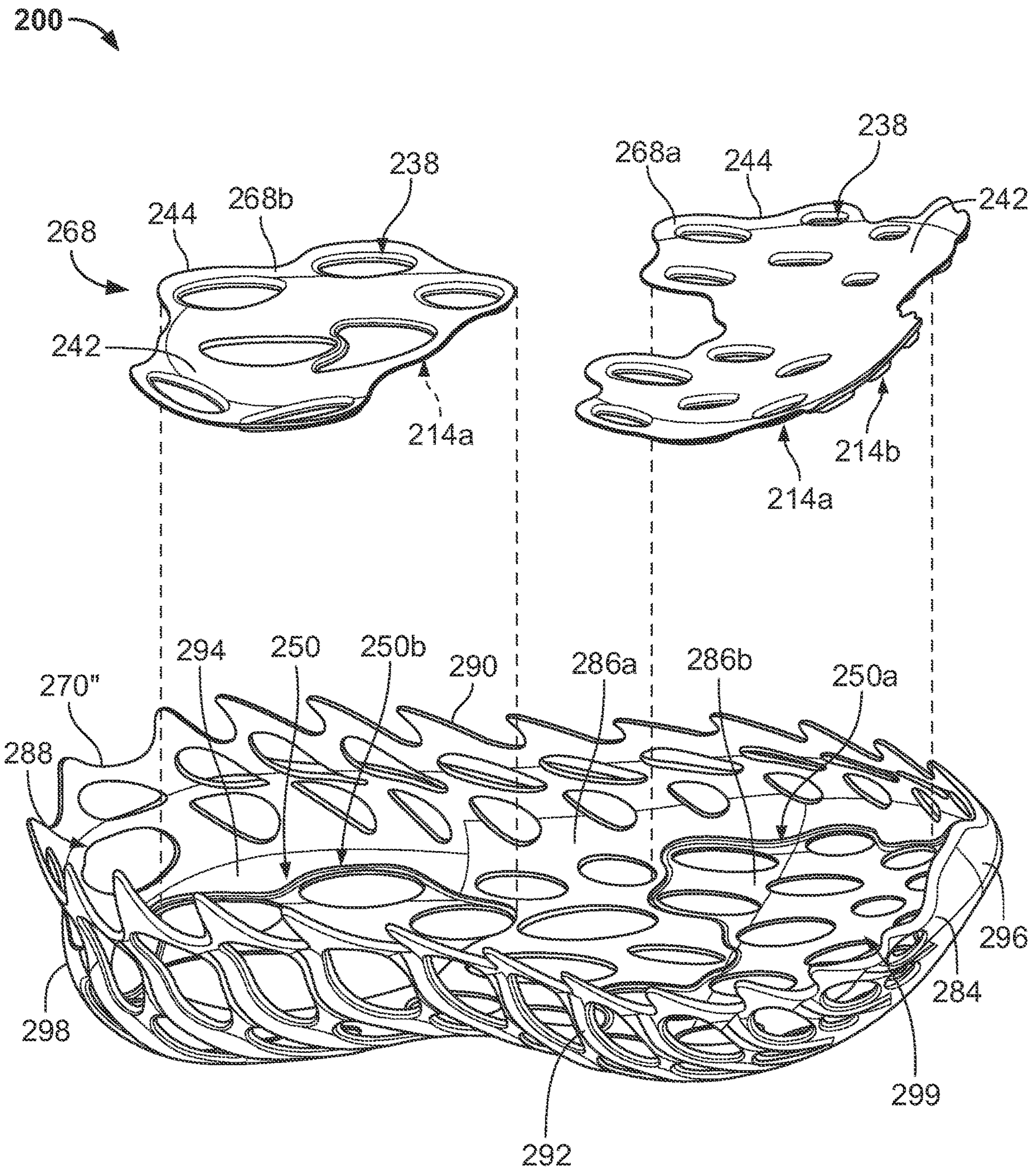
FIG. 22 is a top-medial side perspective exploded view of the frame and outsole members of FIG. 21.

Referring to FIG. 22, the first interior surface 286*a* of at least the bottom side 294 of the frame 270" can include one or more cavities 250 that are configured to receive one or more outsole members 268. In the illustrated embodiment, the cavities 250 of the frame 270" have an outer shape that matches an outer perimeter 244 of one or more outsole members 268. Similarly, with reference to FIG. 24, the cavities 250 may have a depth D that may correspond to a thickness $T_1$ of the outsole members 268. The depth D being measured from the first interior surface 286*a* of the frame 270" to a second interior surface 286*b* of the cavity 250, and the thickness $T_1$ being measured from an interior surface 242 to an exterior surface 248 of the outsole member 268 at a point on the outsole member 268 that does not include a protrusion 214*a*, 214*b*. In some embodiments, the outsole members 268 can have a thickness $T_1$ in a range of about 0.3 mm to about 2 mm, in a range of about 0.5 mm to about 1.5 mm, or in a range of about 0.7 mm to about 1.3 mm. In some embodiments, the depth D of the cavities 250 of the frame 270" can be greater than or equal to the thickness $T_1$ of the outsole members 268. In some embodiments, the depth D of the cavities 250 of the frame 270" can be less than the thickness $T_1$ of the outsole members 268.

Referring again to FIG. 22, the outsole members 268 may include one or more recesses 238 corresponding to one or more of the protrusions 214*a*. The recesses 238 may be disposed on the interior surface 242 of the outsole members 268 such that each of the recesses 238 align with at least one of the protrusions 214*a*, 214*b* disposed on the exterior surface 248 of the outsole member 268. Some of the protrusions 214*b* of the outsole members 268 may not have a corresponding recess 238, as illustrated in FIG. 22. In some embodiments, each of the protrusions 214*a*, 214*b* of the outsole members 268 may have a corresponding recess 238. Referring again to FIG. 24, the outsole members 268 have a thickness $T_2$ measured at a point on the outsole member 268 that includes a protrusion 214*a* with a corresponding recess 238 from the interior surface 242 (i.e., within the corresponding recess 238 of the protrusion 214) to the exterior surface 248. In some embodiments, the thickness $T_2$ can be equal to the thickness $T_1$ of the outsole members 268, such that the outsole members 268 have a uniform thickness from any point measured from the interior surface 242 to the exterior surface 248 of the outsole members 268. In some embodiments, the thickness $T_2$ can be greater than or less than the thickness $T_1$ of the outsole members 268.

Figure 24:
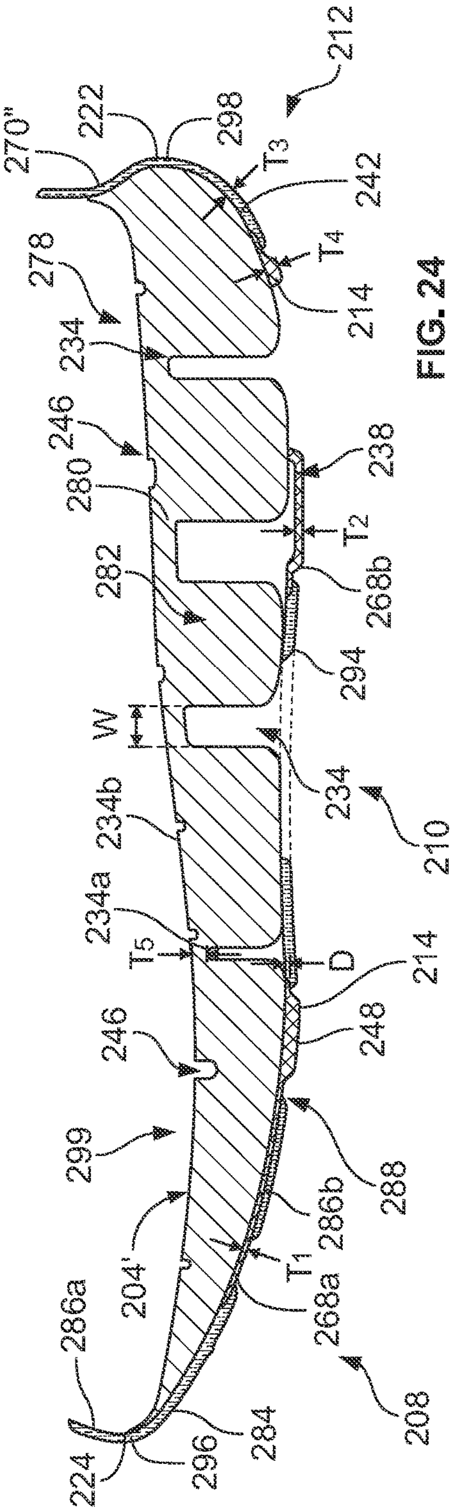
FIG. 24 is a cross-sectional view taken along line 24-24 of FIG. 23.
Figure 25:
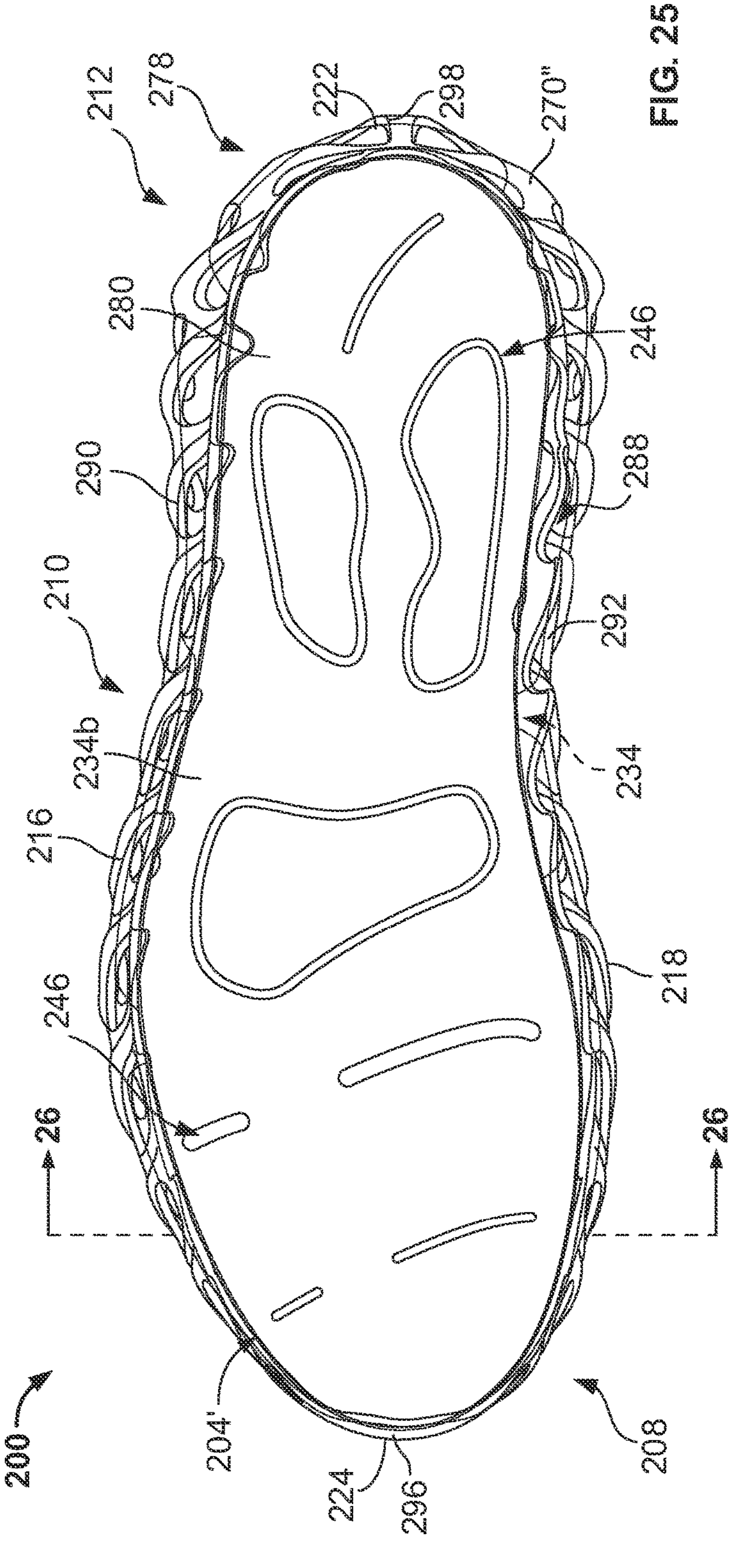
FIG. 25 is a top view of the sole structure and the frame of FIG. 21.

With continued reference to FIG. 24, the gaps 234 extending between the bottom portions 282 of the midsole members 278 extend from the upper portion 280 through the bottom portions 282 and can extend through the lateral side 216 and/or medial side 218 of the sole structure 204'. In some embodiments, the gaps 234 of the midsole members 278 can extend in a straight line from the lateral side 216 to the medial side 218 of the sole structure 204'. In some embodiments, the gaps 234 can extend through the proximal end 222 and/or the distal end 224 of the sole structure 204'. Referring to FIGS. 24 and 25, one or more channels 246 can be defined on an upper surface 234*b* of the upper portion 280 of the midsole members 278. In some embodiments, the channels 246 may be disposed above one or more of the bottom portions 282 between the gaps 234, such as, e.g., on a portion of the upper portion 280 that aligns with a bottom portion 282 disposed in the forefoot region 208 of the sole structure 204'. In some embodiments, the midsole member 278 may be comprised of an ethylene vinyl acetate (EVA) that may be formed via a compression molding process.

Referring specifically to FIG. 24, the frame 270" has a thickness $T_3$ measured from the exterior surface 284 to the first interior surface 286*a* of the frame 270". In some embodiments, the thickness $T_3$ of the frame 270" can be in a range of about 0.5 mm to about 8 mm, in a range of about 0.8 mm to about 6 mm, in a range of about 1 mm to about 10 mm, in a range of about 1 mm to about 5 mm, or in a range of about 0.8 mm to about 4 mm. In the illustrated embodiment, the protrusions 214*b* of the outsole members 268 that do not have a corresponding recess 238 have a thickness $T_4$ measured from the interior surface 242 of the outsole member 268 that contacts the bottom portions 282 of the midsole members 278 to the exterior surface 248 of the protrusion 214*b*. In some embodiments, such protrusions 214*b* of the outsole members 268 can have a thickness $T_4$ in a range of about 0.3 mm to about 10 mm, in a range of about 0.5 mm to about 12 mm, in a range of about 0.8 to about 14 mm, in a range of about 1 mm to about 6 mm, or in a range of about 0.6 mm to about 5 mm. In some embodiments, the thickness $T_4$ of the protrusions 214*b* can be greater than the thickness $T_3$ of the frame 270" such that the exterior surface 248 of the protrusions 214*b* extend past the exterior surface 284 of the bottom side 294 of the frame 270". In other embodiments, the thickness $T_4$ of the protrusions 214*b* can be equal to or less than the thickness $T_3$ of the frame 270" such that the exterior surface 248 of the protrusions 214*b* do not extend past the exterior surface 284 of the bottom side 294 of the frame 270".

With continued reference to FIG. 24, the gaps 234 of the midsole members 278 have a width W measured between opposing surfaces of the bottom portions 282 of the midsole members 278. In some embodiments, the gaps 234 of the midsole members 278 can have a width W in a range of about 0.1 mm to about 5 mm, in a range of about 0.2 mm to about 3 mm, in a range of about 0.3 mm to about 2 mm, or in a range of about 0.5 mm to about 1.5 mm. Referring still to FIG. 24, the interconnected upper portion 280 of the midsole members 278 has a thickness $T_5$ measured from the upper end 234*a* of the gaps 234 to the upper surface 234*b* of the midsole members 278. In some embodiments, the upper portion 280 of the midsole members 278 can have a thickness $T_5$ in a range of about 2.5 mm to about 10 mm, in a range of about 3 mm to about 8 mm, or in a range of about 3.5 mm to about 7 mm.

Figure 26:
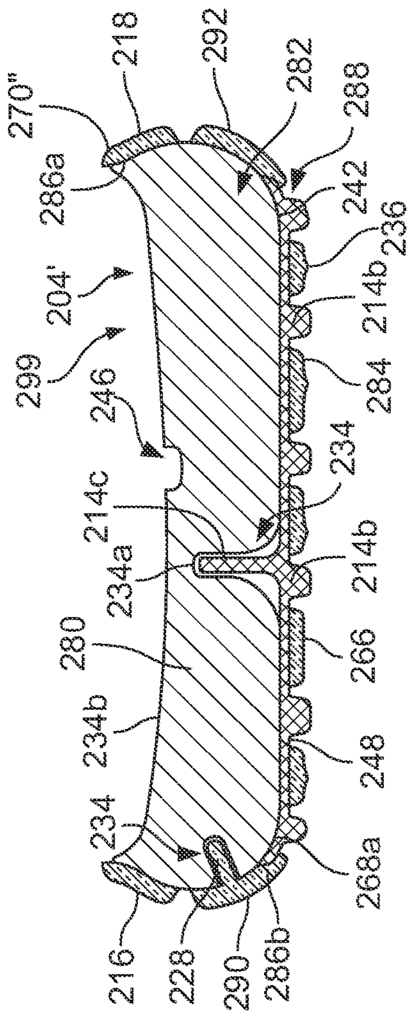
FIG. 26 is a cross-sectional view taken along line 26-26 of FIG. 25.

Referring to FIG. 26, the outsole members 268*a*, 268*b* can further include a second plurality of protrusions 214*c* extending from the interior surface 242 of the outsole members 268*a*, 268*b*. In some embodiments, the second plurality of protrusions 214*c* may be configured to be received within the gaps 234 of the midsole members 278 (as illustrated in FIG. 26) or to otherwise contact or engage the bottom portions 282 of the midsole members 278. Similarly, the frame 270" can further include one or more protrusions 228 extending from the first interior surface 186*a* of the lateral side 290, the medial side 292, the bottom side 294, the distal side 296, and/or the proximal side 298. In some embodiments, the protrusions 228 of the frame 270" may be configured to be received within the gaps 234 of the midsole members 278 (as illustrated in FIG. 26) or to otherwise contact or engage the bottom portions 282 of the midsole members 278.

Figure 27:
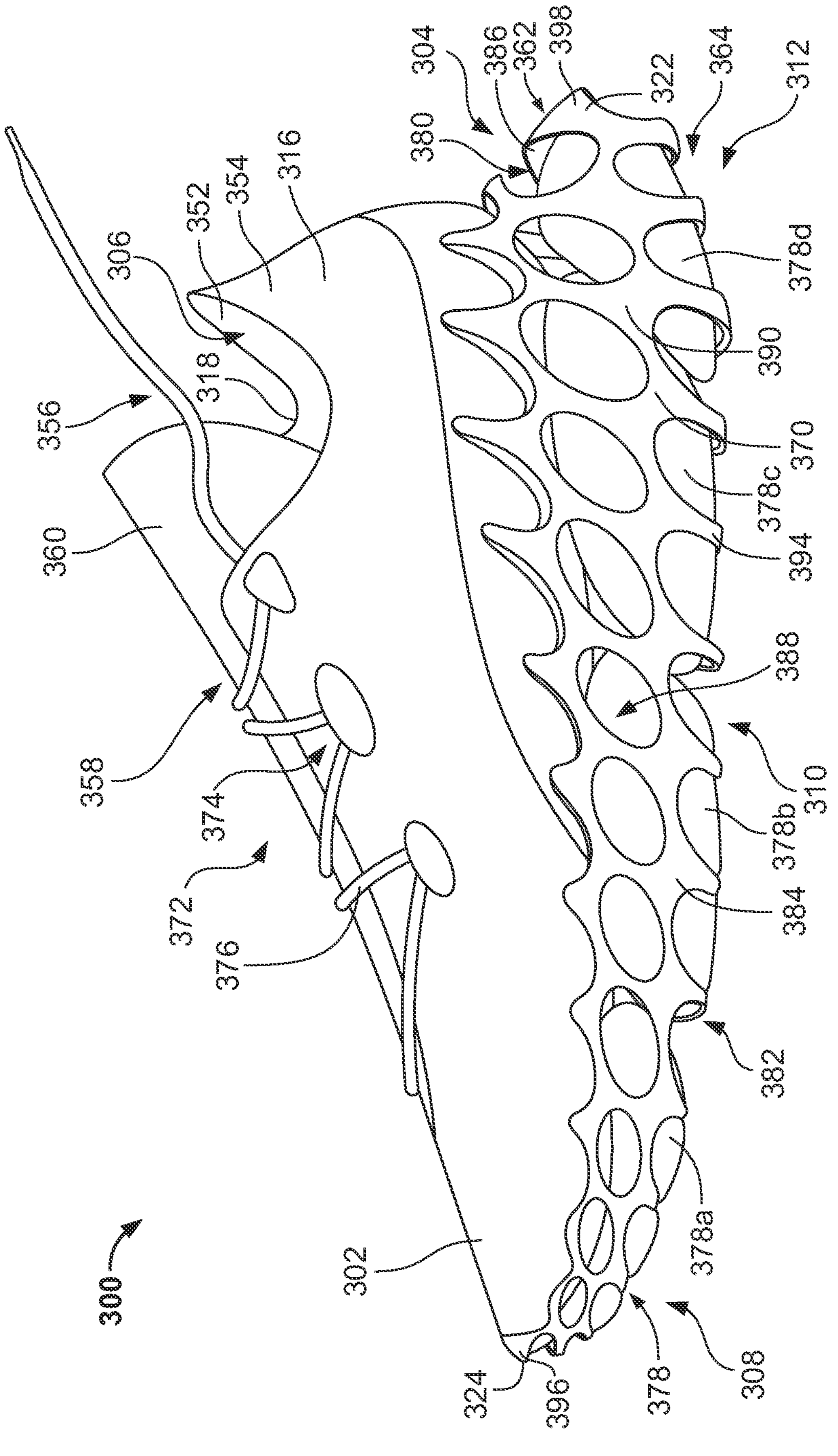
FIG. 27 is a lateral side view of another example of an article of footwear that is similar to the article of footwear of FIG. 1.

Referring now to FIG. 27, another exemplary embodiment of an article of footwear 300 is depicted, which includes an upper 302, a sole structure 304, and a frame 370. The article of footwear 300 is similar to previous embodiments, with like elements being indicated by similar reference numerals under the "3xx" series of reference numerals. In the article of footwear 300, the fastening mechanism 372 includes a first fastening member or plurality of lace retainers 374 disposed along the lateral and medial sides 316, 318 of the upper 302 adjacent to the tongue 360 and within the midfoot region 310 of the article of footwear 300. A second fastening member or lace 376 extends through the plurality of lace retainers 374 in a crisscrossing manner across the tongue 360. In some embodiments, the plurality of lace retainers 374 can extend adjacent to the tongue 360 within the forefoot and midfoot regions 308, 310 of the article of footwear 300.

With continued reference to FIG. 27, in the illustrated embodiment, the midsole region 362 of the sole structure 304 is formed of a plurality of midsole members 378 disposed within the frame 370. In particular, the plurality of midsole members 378 includes a first midsole member 378*a* disposed closest to the distal end 324, a second midsole member 378*b* disposed adjacent to the first midsole member 378*b*, a third midsole member 378*c* disposed adjacent to the second midsole member 378*c*, and a fourth midsole member 378*d* disposed closest to the proximal end 322 and adjacent to the third midsole member 378*c*. Moreover, the first midsole member 378*a* is disposed within the forefoot region 308, the second midsole member 378*b* is disposed at least partially within the forefoot and midfoot regions 308, 310, the third midsole member 378*c* is disposed at least partially within the midfoot and heel regions 310, 312, and the fourth midsole member 378*d* is disposed entirely within the heel region 312. Further, in the illustrated embodiment, the first, second, and third midsole members 378*a*, 378*b*, 378*c* contact or are attached to the upper 302 while at least the fourth midsole member 378*d* is not attached to the upper 302. Instead, the fourth midsole member 378*d* is held in place adjacent to the upper 302 by the frame 370.

Thus, in such embodiments, the fourth midsole member 378*d* may be configured to provide support to a user only when the user's heel strikes a ground surface, such as, e.g., by causing at least a portion of the frame 370 to compress or move relative to the upper 302. In some embodiments, two or more of the midsole members 378*a*, 378*b*, 378*c*, 378*d* may be not attached to the upper 302 and held adjacent to the upper 302 by the frame 370. For example, in such an embodiment, the third and fourth midsole members 378*c*, 378*d* may not be attached to the upper 302. In some embodiments, the fourth midsole member 378*d* may be attached to the frame 370. In some embodiments, two or more midsole members 378*a*, 378*b*, 378*c*, 378*d* may be attached to the frame 370 while two or more midsole members 378*a*, 378*b*, 378*c*, 378*d* may be attached to the upper 302. In some embodiments, the midsole 362 of the sole structure 304 can be formed of five or more midsole members that are disconnected to each other, the frame 370, and/or the upper 302.

Figure 28:
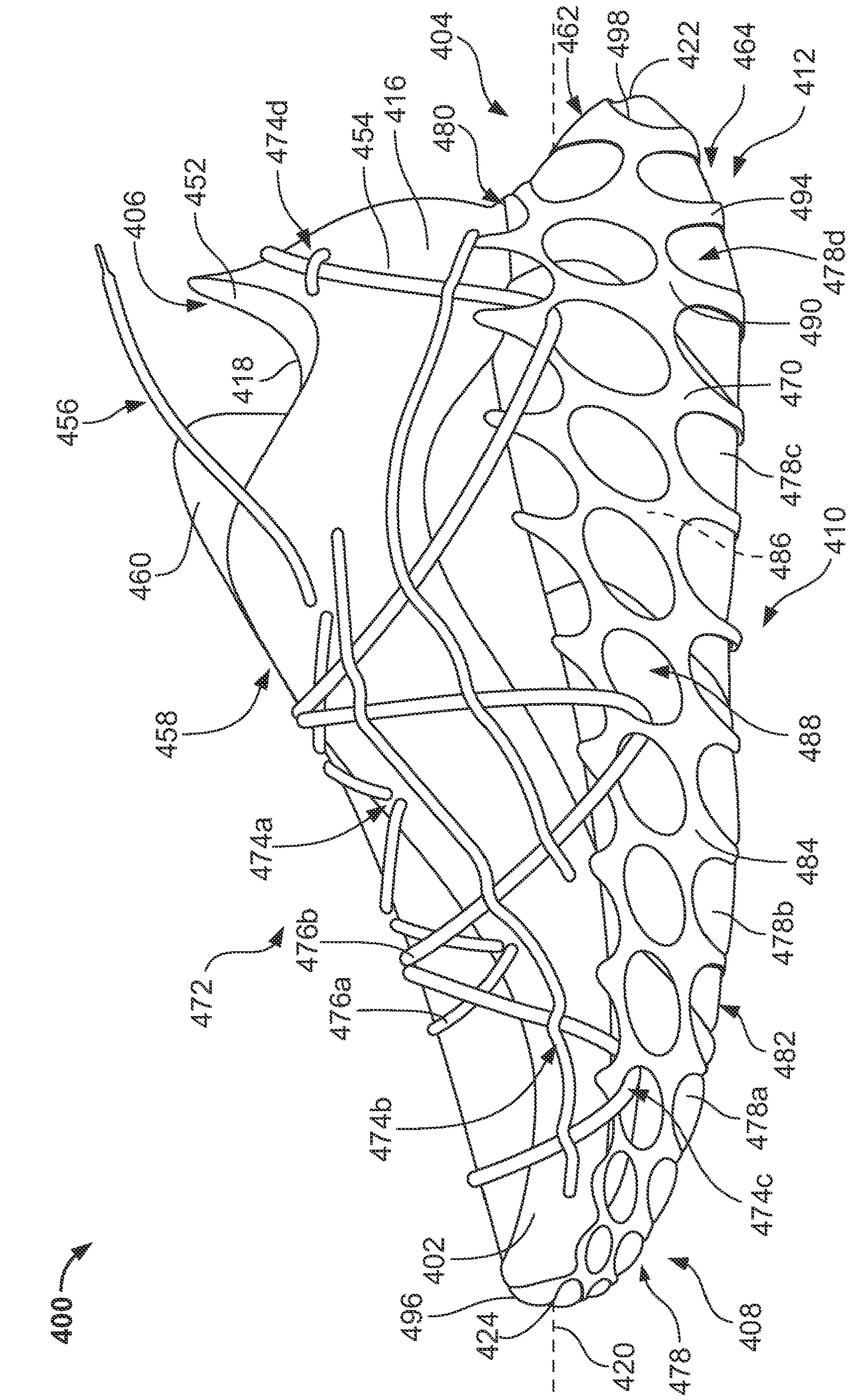
FIG. 28 is a lateral side view of yet another example of an article of footwear that is similar to the article of footwear of FIG. 1.
Figure 29:
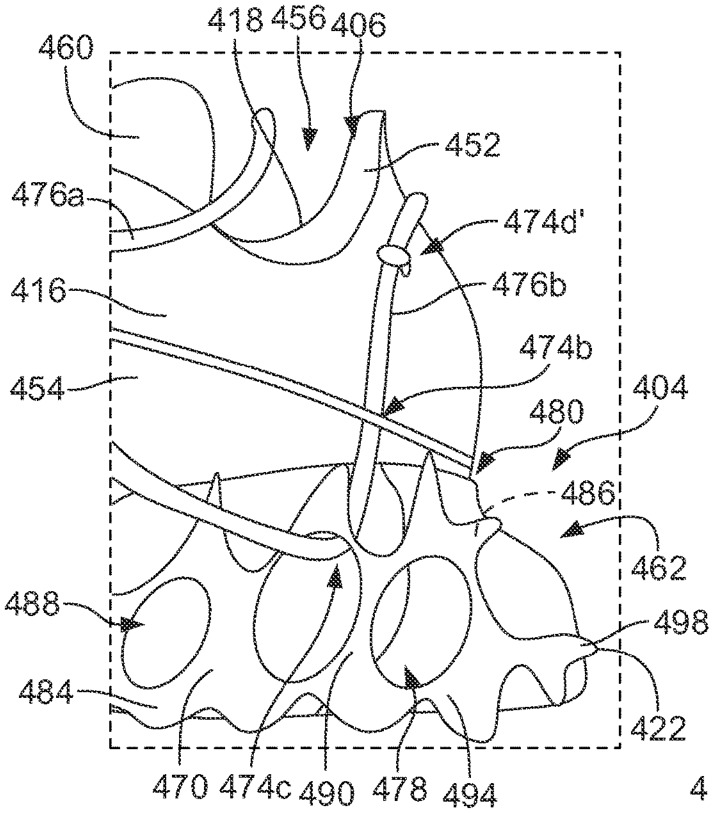
FIG. 29 is a lateral side detail view of another example of a fastening mechanism of the article of footwear of FIG. 28, with a second lace in a tightened configuration.
Figure 30:
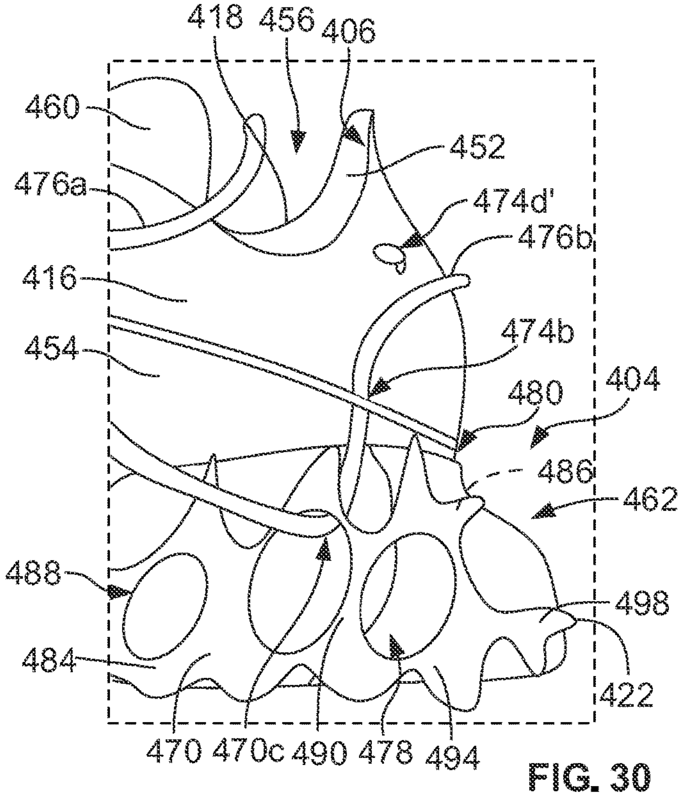
FIG. 30 is a lateral side detail view of the article of footwear of FIG. 29, with the second lace in a loosened configuration.

Referring now to FIGS. 28-30, yet another exemplary embodiment of an article of footwear 400 is depicted, which includes an upper 402, a sole structure 404, and a frame 470. The article of footwear 400 is similar to previous embodiments, with like elements being indicated by similar reference numerals under the "4xx" series of reference numerals. For example, in the article of footwear 400, the midsole region 462 of the sole structure 404 is formed of a plurality of midsole members 478 disposed within the frame 470, similar in some ways to the article of footwear 300 (see FIG. 27). More specifically, the plurality of midsole members 478 includes a first midsole member 478*a*, a second midsole member 478*b*, a third midsole member 478*c*, and a fourth midsole member 478*d*. In the illustrated embodiment, the second midsole member 478*b* is attached to the first and third midsole members 478*a*, 478*c*, the third midsole member 478*c* is attached to the second and fourth midsole members 478*b*, 478*d*, and each of the midsole members 478*a*, 478*b*, 478*c*, 478*d* are attached to the upper 402. Further, the fastening mechanism 472 includes a first fastening member or first plurality of lace retainers 474*a*, a second fastening member or second plurality of lace retainers 474*b*, a third fastening member or third plurality of lace retainers 474*c*, a fourth fastening member or fourth plurality of lace retainers 474*d*, a fifth fastening member or first lace 476*a*, and a fifth fastening member or second lace 476*b*.

Referring specifically to FIG. 28, in the illustrated embodiment, the first plurality of lace retainers 474*a* are pairs of apertures extending through the lateral side 416 and the medial side 418 of the upper 402 adjacent to the tongue 460. The first lace 476*a* extends through the first plurality of lace retainers 474*a* in a crisscrossing manner across the tongue 460. Free ends of the first lace 476*a* extend from the first plurality of lace retainers 474*a* adjacent to the opening 456 of the upper 402 such that a user can tighten and tie together the free ends of the first lace 476*a* along the tongue 460. The second plurality of lace retainers 474*b* are disposed on the exterior surface 454 of the upper 402 on the lateral and medial sides 416, 418 between the first plurality of lace retainers 474*a* and the sole structure 404. In some embodiments, the second plurality of lace retainers 474*b* can be formed by one or more strips of material adhered to the exterior surface 454 of the upper 402 with one or more unconnected portions that form loops to receive the second lace 476*b*.

Referring still to FIG. 28, in the illustrated embodiment, the third plurality of lace retainers 474*c* are part of the lattice-work structure of the frame 470 that is formed by the plurality of apertures 488. More specifically, one or more apertures 488 disposed on the lateral side 490 and the medial side (not shown) of the frame 470 and aligned with the second plurality of lace retainers 474*b* are configured to receive a portion of the second lace 476*b* extending along the exterior surface 484 to the interior surface 486 of the frame 470, or vice versa. In the illustrated embodiment, the third plurality of lace retainers 474*c* includes three lace retainers on each of the lateral and medial sides 416, 418 of the article of footwear 400. In some embodiments, the third plurality of lace retainers 474*c* can include four or more lace retainers. In the illustrated embodiment, the fourth plurality of lace retainers 474*d* are one or more loops formed on the exterior surface 454 of the upper 402 adjacent to the proximal end 422 and the opening 456 of the upper 402 and on each of the lateral and medial sides 416, 418 of the article of footwear 400.

With continued reference to FIG. 28, the second lace 476*b* extends through the second plurality of lace retainers 474*b* and the third plurality of lace retainers 474*c* in a crisscrossing manner across the tongue 460 and through the fourth plurality of lace retainers 474*d* disposed near the proximal end 422 of the upper 402. Free ends of the second lace 476*b* extend from the second, third, and fourth pluralities of lace retainers 474*b*, 474*c*, 474*d* along the lateral and medial sides 416, 418 of the upper 402 adjacent to the proximal end 422 and the opening 456 of the upper 402 such that a user can tighten and tie together the free ends of the second lace 476*b* along the proximal end 422 of the upper 402 adjacent to the opening 456. In some embodiments, the third plurality of lace retainers 474*c* can include four or more apertures 488 that can be disposed on the lateral side 490 and the medial side (not shown) of the frame 470.

Still referring to FIG. 28, in the illustrated embodiment, the second and third pluralities of lace retainers 474*b*, 474*c* are disposed in each of the forefoot region 408, the midfoot region 410, and the heel region 412 of the article of footwear 400, and the fourth plurality of lace retainers 474*d* are disposed along the upper 402 entirely in the heel region 412. With the second lace 476*b* in a tightened configuration (as shown in FIG. 28), the second lace 476*b* pulls the lateral and medial sides 416, 418 of the upper 402 inward toward the tongue 460 and the tongue 460 downward toward the sole structure 404 via the second plurality of lace retainers 474*b*. Further, with the second lace 476*b* in the tightened configuration, the second lace 476*b* also pulls the frame 470 upwards toward the upper 402 via the third plurality of lace retainers 474*c*. Thus, tightening of the second lace 476*b* may provide additional support to the lateral and medial sides 416, 418 of the upper 402 and also provide tensioning force to further secure the frame 470 to the sole structure 404 of the article of footwear 400.

In some embodiments, the free ends of the second lace 476*b* can extend around the proximal end 422 of the upper 402 such that a user can tighten and tie together the free ends of the second lace 476*b* along the tongue 460 adjacent to the opening 456. In some embodiments, the second lace 476*b* can comprise two laces each having a fixed end disposed toward the distal end 424 of the upper 402 and free ends that extend toward the proximal end 422 of the upper 402 through the second and third pluralities of lace retainers 474*b*, 474*c*. In some embodiments, the free ends of the second lace 476*b* can extend from the second plurality of lace retainers 474*b* adjacent to the distal end 424 of the upper 402 such that a user can tighten and tie together the free ends along the tongue 460 proximal to the distal end 424. In some embodiments, the second lace 476*b* can be a closed loop lace. In such embodiments, the fastening mechanism 472 can further include a lacing mechanism (not shown) that can be disposed along the proximal end 422 of the upper 402 and that can be configured to manually and/or automatically tighten or loosen the second lace 476*b*.

Referring specifically to FIGS. 29 and 30, another exemplary embodiment fourth plurality of lace retainers 474*d*' of the fastening mechanism 472 of the article of footwear 400 is depicted. The fourth plurality of lace retainers 474*d*' of the fastening mechanism 472 of FIGS. 29 and 30 is similar to the previous embodiment of FIG. 28, however, in the illustrated embodiment, the fourth plurality of lace retainers 474*d*' includes one or more hooks and the second lace 476*b* is a closed loop lace. More specifically, the one or more hooks of the fourth plurality of lace retainers 474*d*' have an open end that is configured to removably receive the closed loop second lace 476*b*. Referring to FIG. 29, the closed loop second lace 476*b* of the fastening mechanism 472 is shown in a tightened configuration. In the tightened configuration, a portion of the second lace 476*b* extending from an aperture 488 of the frame 470 to a lateral-proximal lace retainer of the second plurality of lace retainers 474*b* disposed near the proximal end 422 of the upper 402, around the proximal end 422 of the upper 402, and to the medial side 418 of the upper 402 (i.e., the "proximal portion of the second lace 476*b*") is received within the hooks of the fourth plurality of lace retainers 474*d*'. Further, in the tightened configuration (as shown in FIGS. 28 and 29), the second lace 476*b* extends around the proximal end 422 of the upper 402 adjacent to the opening 456 of the upper 402.

Referring to FIG. 30, the closed loop second lace 476*b* of the fastening mechanism 472 is shown in a loosened configuration. In the loosened configuration, the proximal portion of the second lace 476*b* extending around the proximal end 422 of the upper 402 is not disposed within the hooks of the fourth plurality of lace retainers 474*d*. Thus, in the loosened configuration, the proximal portion of the second lace 476*b* is free to move downward along the proximal end 422 and away from the opening 456 of the upper 402. As the proximal portion of the second lace 476*b* moves downward toward the lateral-proximal lace retainer of the second plurality of lace retainers 474*b*, other portions of the second lace 476*b* are permitted to increase in length and thus, loosen around the corresponding portions of the upper 402.

Referring still to FIGS. 29 and 30, in some embodiments, the fourth plurality of lace retainers 474*d*' can comprise a single hook disposed on the proximal end 422 of the upper 402 near a central or longitudinal axis 420 (see FIG. 28) of the article of footwear 400. In some embodiments, a plurality of hooks of the fourth plurality of lace retainers 474*d*' can be disposed on the proximal end 422 of the upper 402 near the central axis 420 (see FIG. 28) and arranged in series between the opening 456 of the upper 402 and the sole structure 404 such that the level of tightness of the closed loop second lace 476*b* can be adjusted based on which of the plurality of hooks of the fourth plurality of lace retainers 474*d*' is utilized to secure the second lace 476*b*. For example, a first hook can be disposed adjacent to the opening 456 that is configured to provide a first tightness to the second lace 476*b* and a second hook can be disposed below the first hook toward the sole structure 404 that is configured to provide a second tightness to the second lace 476*b* that is less tight than the first tightness. In some embodiments, the fourth plurality of lace retainers 474*d*' can include three or more hooks that can be disposed near the proximal end 422 of the upper 402. For example, the lateral-proximal lace retainer (shown in FIGS. 29 and 30) and the medial-proximal lace retainer (not shown) of the second plurality of lace retainers 474*b* can each be replaced with a hook of the fourth plurality of lace retainers 474*d*'. In some embodiments, the closed loop second lace 476*b* can be comprised of an elastic material.

Figure 31:
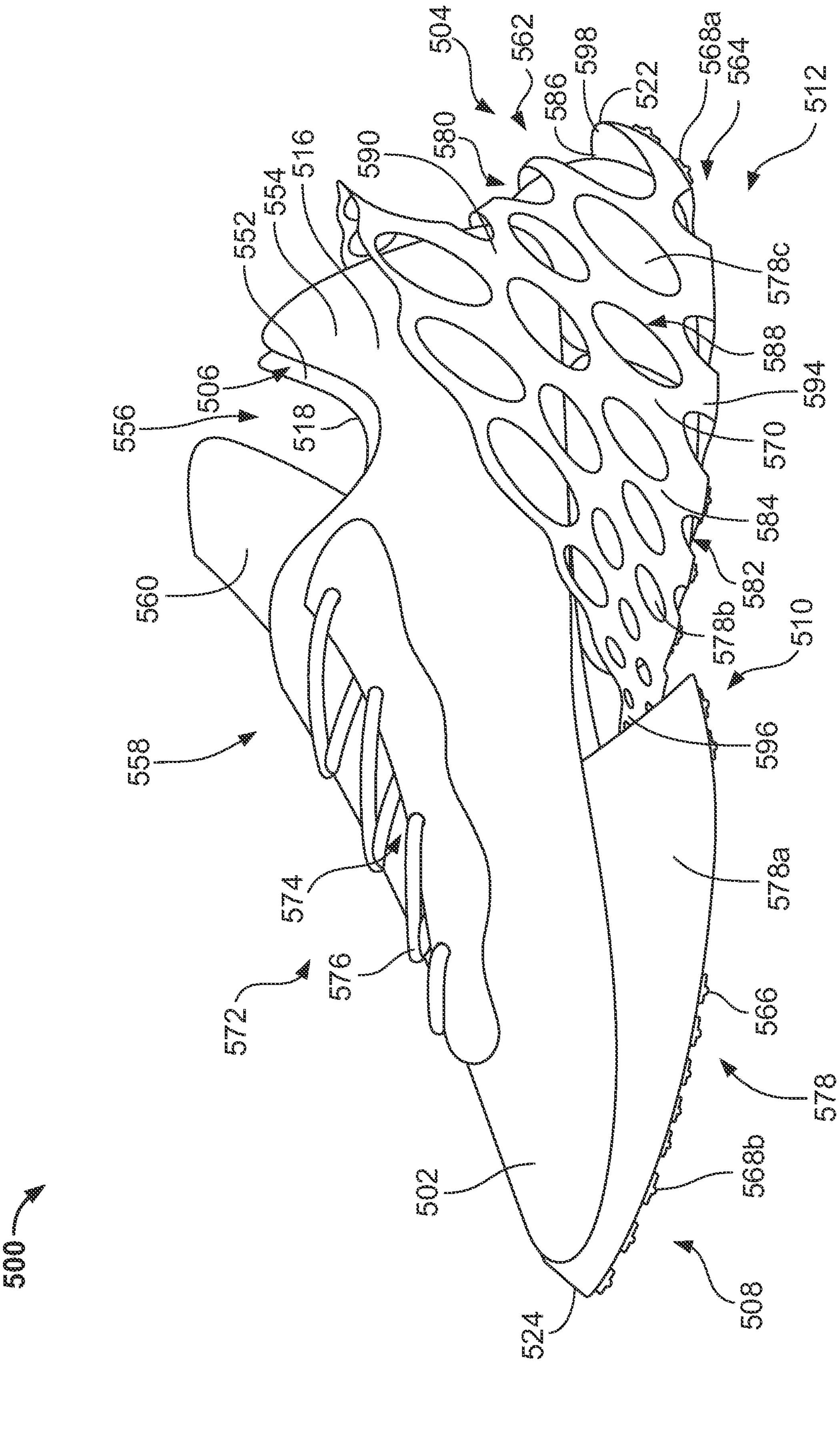
FIG. 31 is a lateral side view of another example of an article of footwear that is similar to the article of footwear of FIG. 1.
Figure 32:
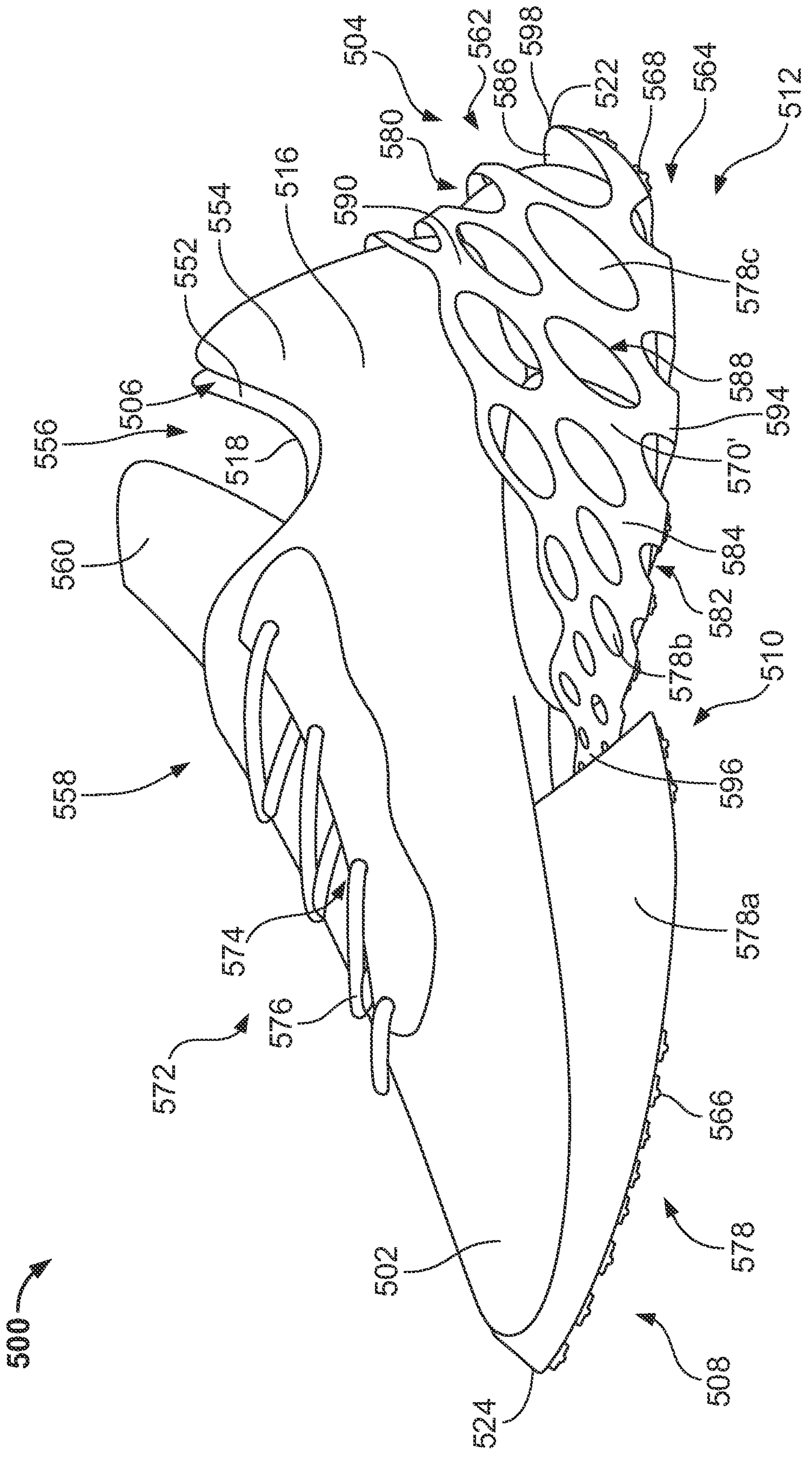
FIG. 32 is a lateral side view of another example frame of the article of footwear of FIG. 31.

Referring now to FIGS. 31 and 32, yet another exemplary embodiment of an article of footwear 500 is depicted, which includes an upper 502, a sole structure 504, and a frame 570. The article of footwear 500 is similar to previous embodiments, with like elements being indicated by similar reference numerals under the "5xx" series of reference numerals. In the article of footwear 500, the plurality of midsole members 578 of the sole structure 504 includes a first midsole member 578*a* disposed closest to the distal end 524, within the forefoot region 508, and at least partially within the midfoot region 510 of the sole structure 504, a second midsole member 578*b* disposed adjacent to the first midsole member 578*a* and at least partially within the midfoot and heel regions 510, 512, and a third midsole member 578*c* disposed closest to the proximal end 522 and entirely within the heel region 512.

Referring specifically to FIG. 31, the frame 570 extends over the second and third midsole members 578*b*, 578*c* and along the lateral side 516, the medial side 518, and the proximal end 522 of the sole structure 504 and the upper 502. In the illustrated embodiment, the frame 570 extends increasingly higher along portions of the upper 502 from the midfoot region 510 to the heel region 512 such that the frame 570 extends along a larger portion of the proximal end 522 of the upper 502 than the lateral and medial sides 516, 518 of the upper 502. A plurality of apertures 588 is disposed along the frame 570 that form a lattice-work structure of the frame 570, which permits the second and third midsole members 578*b*, 578*c* and the covered portions of the upper 502 to be visible from an outside of the article of footwear 500 through the apertures 588 of the frame 570.

With continued reference to FIG. 31, a first outsole member 568*a* is disposed on the bottom side 594 of the frame 570 and a second outsole member 568*b* is disposed on a bottom side of the first midsole member 578*a*. Similar to the first outsole member 268*a* of the article of footwear 200 of FIGS. 10-13, the first outsole member 568*a* can be disposed between the interior surface 586 of the bottom side 594 of the frame 570 and one or both of the second and third midsole members 578*b*, 578*c* or can be disposed on the exterior surface 584 of the bottom side 594 of the frame 570. In some embodiments, the second outsole member 568*b* can be removably attached or fixedly attached to the bottom of the first midsole member 578*a*. In the illustrated embodiment, the first and second outsole members 568*a*, 568*b* together form the bottom surface 566 of the outsole 564 of the sole structure 504. In some embodiments, the first midsole member 578*a* can comprise a plurality of midsole members disposed at least partially within the forefoot region 508. In some embodiments, the frame 570*a* can comprise a first frame that extends over the first midsole member 578*a* and a second frame that extends over the second and third midsole members 578*b*, 578*c*.

Referring specifically to FIG. 32, another exemplary embodiment frame 570' of the article of footwear 500 is depicted. The frame 570' of FIG. 32 is similar to the frame 570 of FIG. 31, however, the frame 570' covers a smaller portion of the proximal end 522 of the upper 502 than the frame 570 of FIG. 31. Thus, the frame 570' also covers a smaller portion of the lateral and medial sides 516, 518 of the upper 502 than the frame 570 of FIG. 31. In some embodiments, and as discussed above with reference to other embodiments, the article of footwear 500 may be configured such that the frames 570, 570' of FIGS. 31 and 32 are removably attachable to the sole structure 504. Thus, in such embodiments, a user can interchangeably secure either of the frames 570, 570' to the sole structure 504 of the article of footwear 500. In some embodiments, the frames 570, 570' can provide differing structural properties of the sole structure 504 to a user of the article of footwear 500. For example, in such embodiments, at least a portion of the frame 570 can be formed of a first material while a similar portion of the frame 570' can be formed of a second material that is different than the first material. In some embodiments, when either of the frames 570, 570 are removed from the sole structure 504, a user can replace one or both of the second and third midsole members 578*b*, 578*c* with one or more midsole members that may have different properties than one or both of the midsole members 578*b*, 578*c*.

Figure 33:
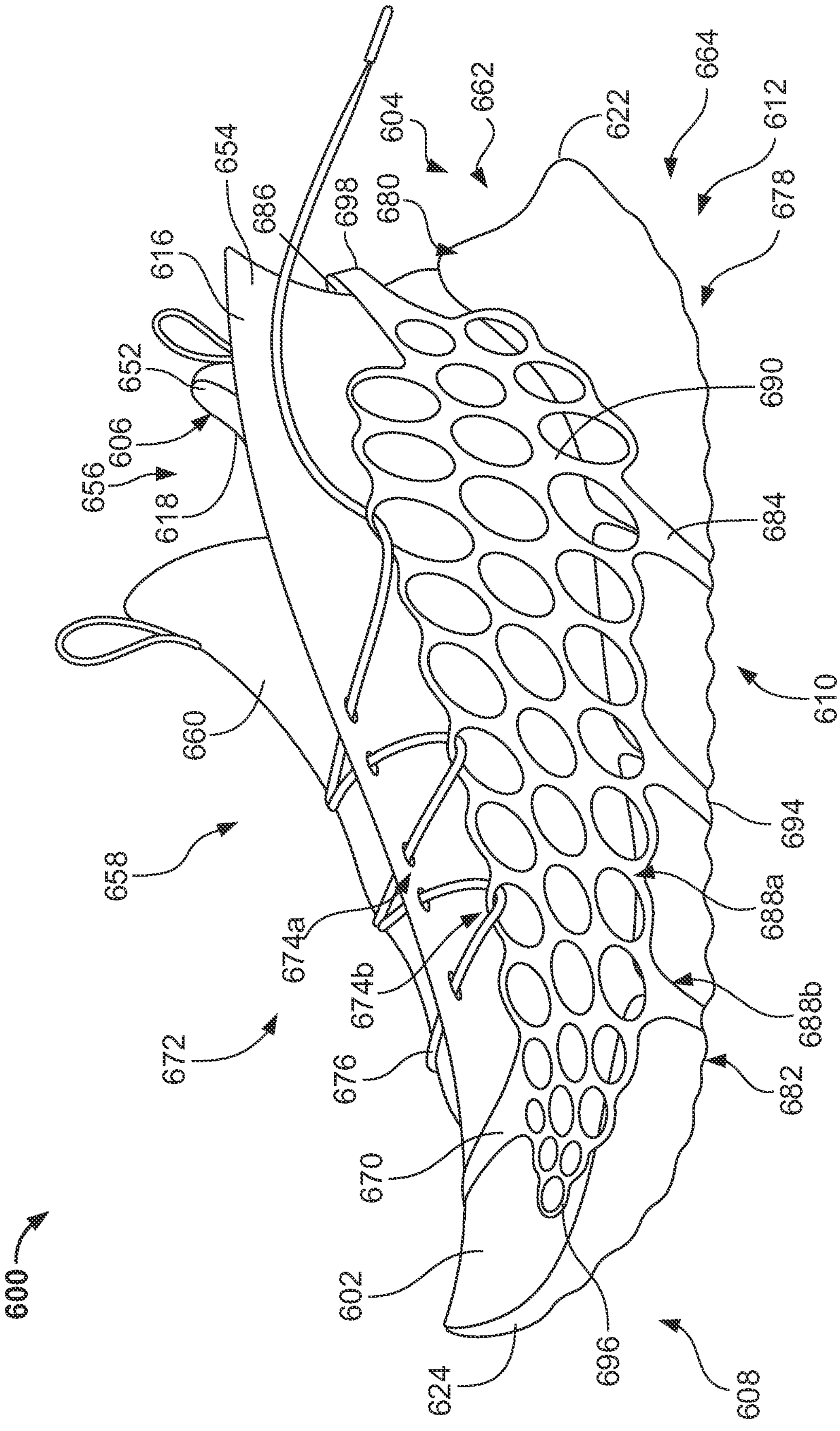
FIG. 33 is a lateral side view of another example of an article of footwear that is similar to the article of footwear of FIG. 1.

Referring now to FIG. 33, yet another exemplary embodiment of an article of footwear 600 is depicted, which includes an upper 602, a sole structure 604 with a midsole 662 formed of a plurality of midsole members 678, and a frame 670. The article of footwear 600 is similar to previous embodiments, with like elements being indicated by similar reference numerals under the "6xx" series of reference numerals. In the illustrated embodiment, the frame 670 of the article of footwear 600 has a lattice-work structure formed by a plurality of apertures that includes a first plurality of apertures 688*a*, which are disposed substantially on the lateral side 690 and the medial side (not shown) of the frame 670, and a second plurality of apertures 688*b*, which are disposed substantially on the bottom side 694 of the frame 670. Further, the frame 670 is configured such that it covers more of the lateral and medial sides 616, 618 of the upper 602 than the lateral and medial sides 616, 618 of the sole structure 604.

Referring still to FIG. 33, a bottom side 694 of the frame 670 extends over the bottom portions 682 of the plurality of midsole members 678 while the lateral side 690 and the medial side (not shown) of the frame 670 extend over the upper portions 680 of the plurality of midsole members 678 and portions of the lateral and medial sides 616, 618 of the upper 602. The distal side 696 of the frame 670 extends over the upper 602 between the distal end 624 of the article of footwear 600 and the tongue 660 while the proximal side 698 of the frame 670 extends around the proximal end 622 of the upper 602. The bottom side 694 of the frame 670 includes the second plurality of apertures 688*b*, which, in this embodiment, includes only two large apertures such that the lattice-work structure along the bottom side 694 of the frame 670 extends between gaps between each of the midsole members of the plurality of midsole members 678.

Still referring to FIG. 33, the fastening mechanism 672 of the article of footwear 600 includes a first fastening member or first plurality of lace retainers 674*a* and a second fastening member or second plurality of lace retainers 674*b*. In the illustrated embodiment, the first plurality of lace retainers 674*a* are eyelets disposed on the lateral and medial sides 616, 618 of the upper 602 adjacent to the tongue 660, and the second plurality of lace retainers 674*b* are one or more of the first plurality of apertures 688*a* of the frame 670 disposed between the first plurality of lace retainers 674*a* and the sole structure 604. A third fastening member or lace 676 extends through the first plurality of lace retainers 674*a* in a criss-crossing manner across the tongue 660 and through the first and second pluralities of lace retainers 674*a*, 674*b* in parallel, i.e., through one of the first plurality of lace retainers 674*a* to one of the second plurality of lace retainers 674*b*, and back through another one of the first plurality of lace retainers 674*a*.

With continued reference to FIG. 33, free ends of the lace 676 extend through the second plurality of lace retainers 674*b* adjacent to the opening 656 of the upper 602 such that a user can tighten and tie together the free ends of the lace 676 along the tongue 660 adjacent to the opening 656 of the upper 602. In the illustrated embodiment, a user can tighten and tie together the free ends of the lace 676 to provide tension force on the frame 670, which can further secure the frame 670 to the sole structure 604 and provide further support along the lateral and medial sides 616, 618 of the upper 602 of the article of footwear 600 while pulling the tongue 660 downward toward the sole structure 604.

Figure 34:
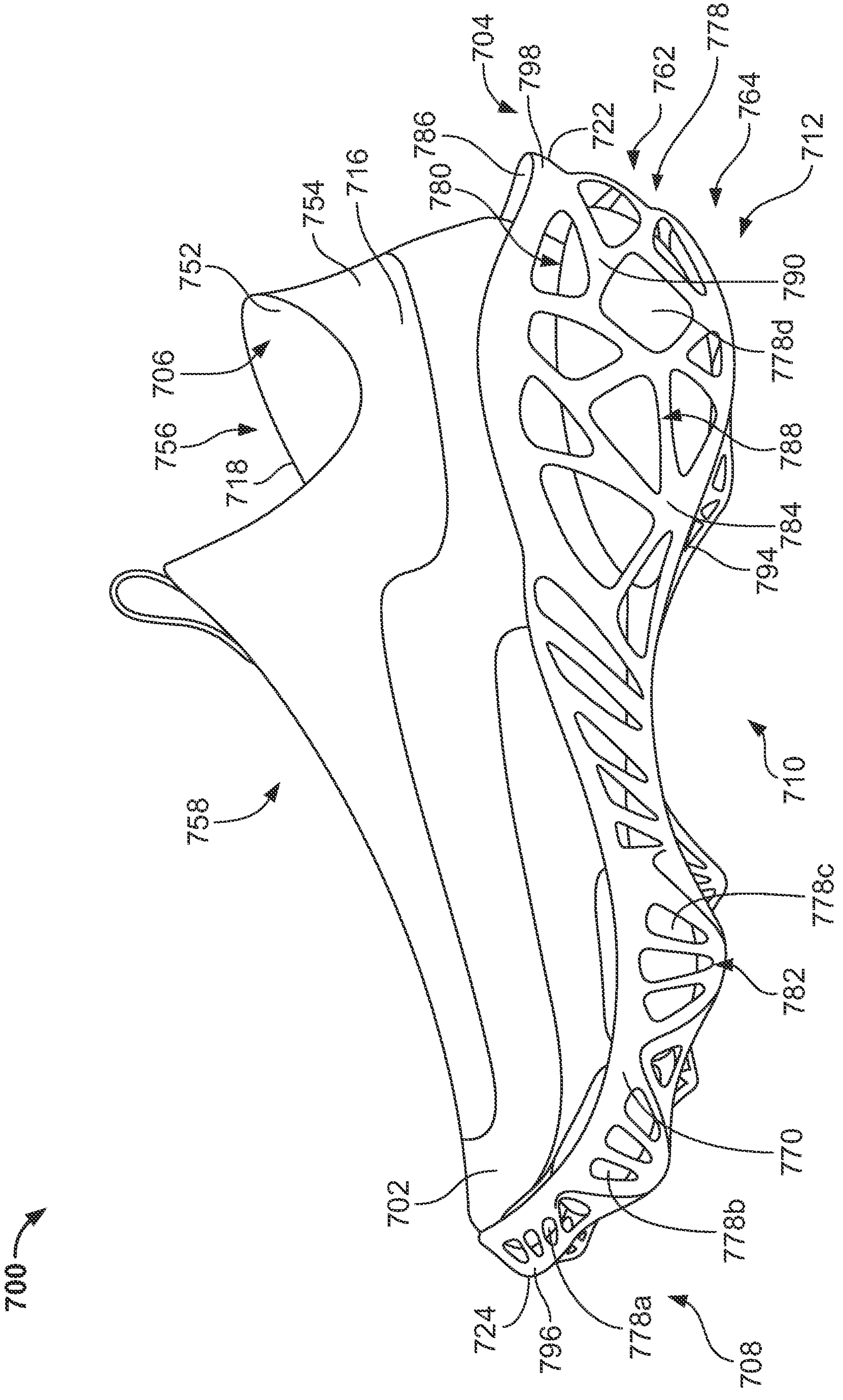
FIG. 34 is a lateral side view of yet another example of an article of footwear that is similar to the article of footwear of FIG. 1.

Referring now to FIG. 34, another exemplary embodiment of an article of footwear 700 is depicted, which includes an upper 702, a sole structure 704 with a midsole 762 formed of a plurality of midsole members 778, and a frame 770. The article of footwear 700 is similar to previous embodiments, with like elements being indicated by similar reference numerals under the "7xx" series of reference numerals. In contrast to previous embodiments, in the article of footwear 700, neither a tongue nor a fastening mechanism is included along the instep region 758 of the upper 702.

Further, as shown in FIG. 34, the plurality of midsole members 778 are disposed only in the forefoot region 708 and the heel region 712 of the sole structure 704. More specifically, first, second, and third midsole members 778*a*, 778*b*, 778*c* are disposed entirely within the forefoot region 708 and a fourth midsole member 778*d* is disposed entirely within the heel region 712 such that a gap is formed in the midfoot region 710 between the third and fourth midsole members 778*c*, 778*d*. In some embodiments, a portion of the frame 770 within the midfoot region 710 and adjacent to the gap formed between the third and fourth midsole members 778*c*, 778*d* may be attached to the upper 702. In some embodiments, each of the midsole members 778*a*, 778*b*, 778*c*, 778*d* can include a lateral member disposed along the lateral side 716 of the upper 702 and a medial member disposed along the medial side 718 of the upper 702. In some such embodiments, the lateral member of one or more of the midsole members 778*a*, 778*b*, 778*b*, 778*d* may not be connected to the respective medial member. For example, in some such embodiments, the fourth midsole member 778*d* may include a lateral member attached to the lateral side 716 of the upper 702 and a medial member attached to the medial side 718 of the upper 702 with a gap formed in the heel region 712 between the lateral and medial members.

With continued reference to FIG. 34, the frame 770 extends along the lateral side 716, the medial side 718, the proximal end 722, and the distal end 724 of the sole structure 704 and along the lateral and medial sides 716, 718 of a lower portion of the upper 702 in the heel region 712 of the article of footwear 700. In the illustrated embodiment, the bottom side 794 of the frame 770 is shaped such that portions of the frame 770 are proximate to or contact a bottom side of the upper 702 while enlarged cavity sections are provided adjacent each of the midsole members 778*a*, 778*b*, 778*c*, 778*d*. Further, the frame 770 includes a plurality of apertures 788 having varying shapes and sizes. For example, the apertures 788 disposed in the heel region 712 have shapes with larger widths in comparison to the apertures 788 disposed in the forefoot and midfoot regions 708, 710. In some embodiments, the apertures 788 disposed in the midfoot region 710 can have shapes with larger widths in comparison to the apertures 788 disposed in the forefoot and heel regions 708, 712.

Figure 35:
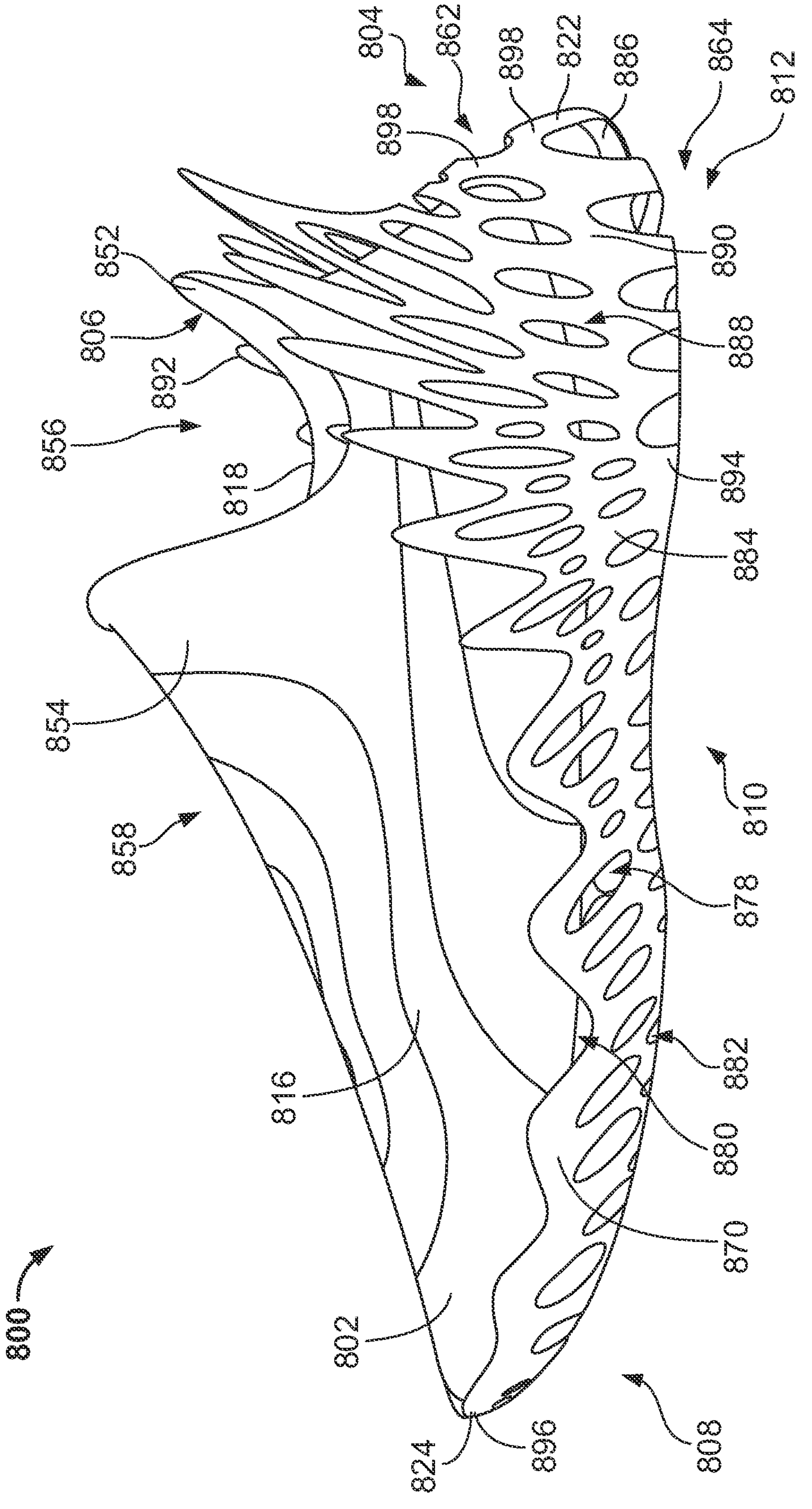
FIG. 35 is a lateral side view of another example of an article of footwear that is similar to the article of footwear of FIG. 1.

Referring now to FIG. 35, yet another exemplary embodiment of an article of footwear 800 is depicted, which includes an upper 802, a sole structure 804 with a midsole 862 formed of a plurality of midsole members 878, and a frame 870. The article of footwear 800 is similar to previous embodiments, with like elements being indicated by similar reference numerals under the "8xx" series of reference numerals. In contrast to previous embodiments, in the article of footwear 800, the frame 870 extends along the entire proximal end 822 of the upper 802 adjacent to the opening 856 of the upper 802 such that a substantial portion of the article of footwear 800, including the upper 802 and the sole structure 804, in the heel region 812 is covered by the frame 870.

As shown in FIG. 35, the lateral and medial sides 890, 892 of the frame 870 include the plurality of apertures 888 that increase in length in a direction extending from the distal side 896 to the proximal side 898. As a result, upper portions of the frame 870 along the lateral, medial, and proximal sides 890, 892, 898 of the frame 870 increasingly cover larger portions of the upper 802 in the direction extending from the distal end 824 to the proximal end 822 such that a heel portion of the upper 802 within the heel region 812 is entirely covered by the proximal side 898 of the frame 870. In some embodiments, the lateral and medial sides 816, 818 of portions of the upper 802 within the forefoot region 808 and/or the midfoot region 810 can be entirely covered by the lateral and medial sides 890, 892, respectively, of the frame 870.

Figure 36:
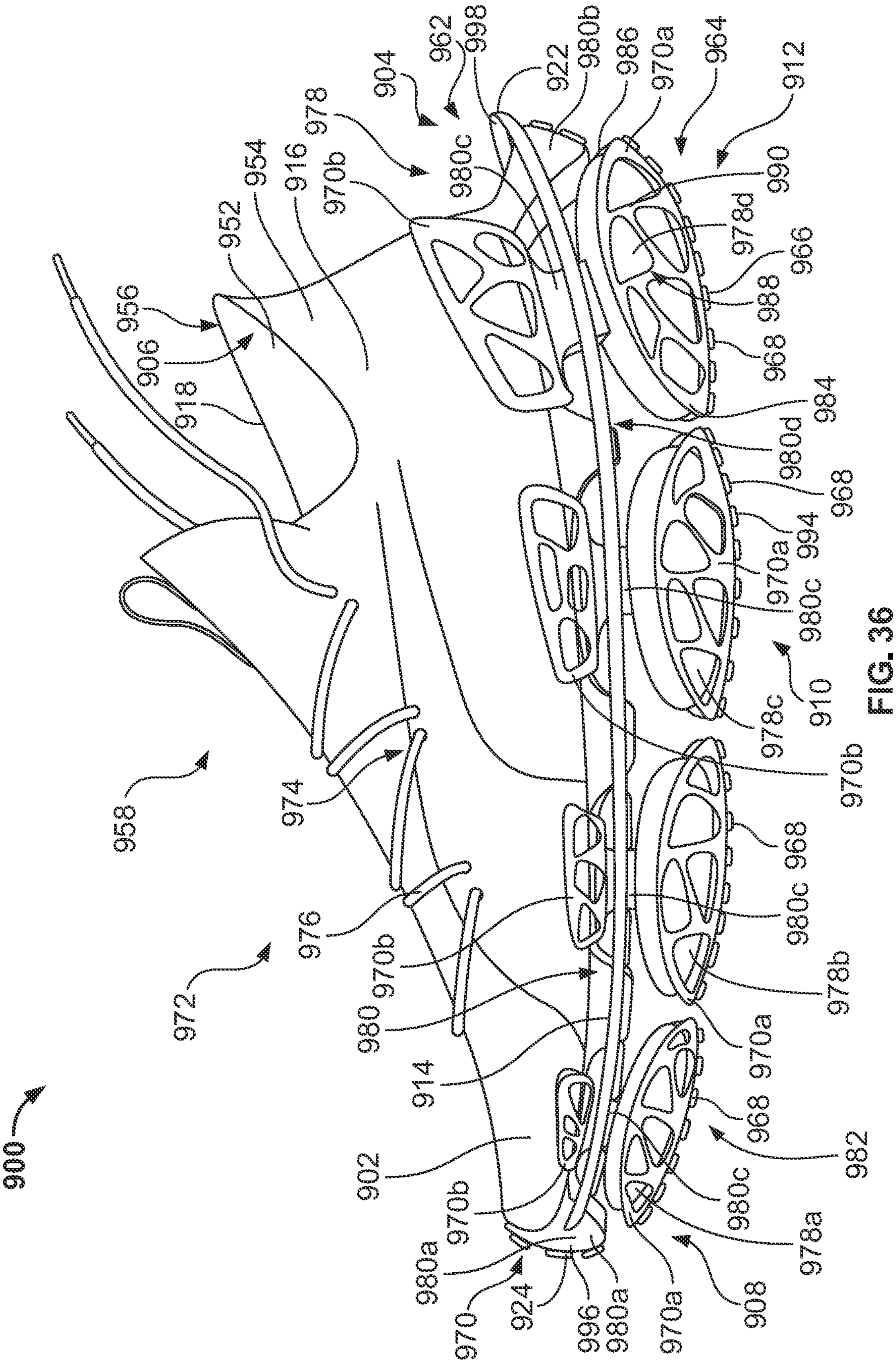
FIG. 36 is a lateral side view of yet another example of an article of footwear that is similar to the article of footwear of FIG. 1.

Referring now to FIG. 36, another exemplary embodiment of an article of footwear 900 is depicted, which includes an upper 902, a sole structure 904 with a midsole 962 formed of a plurality of midsole members 978, and a frame 970. The article of footwear 900 is similar to previous embodiments, with like elements being indicated by similar reference numerals under the "9xx" series of reference numerals. In contrast to previous embodiments, in the article of footwear 900, the plurality of midsole members 978 comprise first, second, third, and fourth midsole members 978*a*, 978*b*, 978*c*, 978*d* each with an interconnected upper portion 980 and one of a plurality of bottom portions 982 independently connected to respective parts of the interconnected upper portion 980 in one or more of the forefoot, midfoot, or heel regions 908, 910, 912. Further, the frame 970 includes a plurality of first or bottom frames 970*a* attached to a respective one of the plurality of bottom portions 982 of the midsole members 978 and a plurality of upper frames 970*b* attached to the interconnected upper portion 980 of the midsole members 978.

Referring still to FIG. 36, the interconnected upper portion 980 of the plurality of midsole members 978 extends along a bottom side of the upper 902 from the distal end 924 to the proximal end 922 and from the lateral side 916 to the medial side 918 of the upper 902. A first or distal protruding member 980*a* protrudes from the distal end 924 of the sole structure 904, and a second or proximal protruding member 980*b* protrudes from the proximal end 922 of the sole structure 904. In addition, a plurality of connecting protrusions 980*c* extend downwardly from a corresponding one of a plurality of recesses 980*d* disposed along the interconnected upper portion 980 between the first and second protruding members 980*a*, 980*b* that connect the plurality of bottom portions 982 to the interconnected upper portion 980.

In the illustrated embodiment, the plurality of bottom portions 982 includes a first or distal bottom portion 982*a* of the first midsole member 978*a*, a second or distal-midfoot bottom portion 982*b* of the second midsole member 978*b*, a third or proximal-midfoot bottom portion 982*c* of the third midsole member 978*c*, and a fourth or proximal bottom portion 982*d* of the fourth midsole member 978*d*. Each of the bottom portions 982*a*, 982*b*, 982*c*, 982*d* of the plurality of midsole members 978 are connected to the interconnected upper portion 980 via a respective one of the plurality of connecting protrusions 980*c* extending downwardly from the upper portion 980. In some embodiments, two or more of the bottom portions 982*a*, 982*b*, 982*c*, 982*d* may be connected to the interconnected upper portion 980 by a single connecting protrusion 980*c*. In some embodiments, two or more of the bottom portions 982*a*, 982*b*, 982*c*, 982*d* can be interconnected. For example, in some such embodiments, the first and second bottom portions 982*a*, 982*b* may be interconnected, the third and fourth bottom portions 982*c*, 982*d* may be interconnected, and a gap may be formed between the second and third bottom portions 982*b*, 982*c*. In some embodiments, the plurality of bottom portions 982 can include three or fewer or five or more bottom portions.

With continued reference to FIG. 36, the plurality of bottom frames 970*a* wrap around a respective one of the bottom portions 982*a*, 982*b*, 982*c*, 982*d* of the plurality of midsole members 978. In the illustrated embodiment, each of the frames of the plurality of bottom frames 970*a* and each of the protruding members 980*a*, 980*b* of the upper portion 980 include an outsole member 968 such that the plurality of bottom frames 970*a* and the protruding members 980*a*, 980*b* collectively define the bottom surface 966 of the outsole 964 of the sole structure 904. Similar to previous embodiments described herein, in some embodiments of the article of footwear 900, the outsole members 968 may be removably attached or fixedly attached to the plurality of bottom frames 970*a* and/or the protruding members 980*a*, 980*b*.

Still referring to FIG. 36, the plurality of upper frames 970*b* extend within the recesses 980*d* and at least partially around the upper portion 980 and the connecting protrusions 980*c* of the midsole members 978, and around lower portions of the upper 902. A frame ring 914 extends along the lateral and medial sides 916, 918 and the proximal and distal ends 922, 924 of the sole structure 904 between the pluralities of bottom and upper frames 970*a*, 970*b*. In addition to providing aesthetic appeal, the frame ring 914 can be configured to provide structural support to the upper portion 980 of the midsole members 978 by structurally connecting the first and second protruding members 980*a*, 980*b*. In some embodiments, the frame ring 914 can extend through an aperture (not shown) that can be defined in the first protruding member 980*a* and/or the second protruding member 980*b*. In some embodiments, the frame ring 914 can be integrally formed with the first protruding member 980*a* and/or the second protruding member 980*b*. In some embodiments, the frame ring 914 is fixedly attached to the upper portion 980 of the midsole members 978. In some embodiments, the frame ring 914 can be connected to each of the plurality of connecting protrusions 980*c* of the midsole members 978 in addition to the first and second protruding members 980*a*, 980*b*. In some embodiments, the frame ring 914 can be removably attached to the sole structure 904.

Referring still to FIG. 36, the fastening mechanism 972 of the article of footwear 900 includes a first fastening member or plurality of lace retainers 974 and a second fastening member or lace 976. In the illustrated embodiment, the plurality of lace retainers 974 are pairs of eyelets disposed on the lateral and medial sides 916, 918 of the upper 902 adjacent to the instep region 958 between the distal end 924 and the opening 956 of the upper 902. The lace 976 extends through the plurality of lace retainers 974 in a crisscrossing manner across the instep region 958. Free ends of the lace 976 extend from the plurality of lace retainers 974 adjacent to the opening 956 of the upper 902 that can be tightened and tied together by a user. In some embodiments, a tongue (not shown) can be included on the upper 902 within the instep region 958, and the plurality of lace retainers 974 can be arranged on the lateral and medial sides 916, 918 of the upper 902 adjacent to sides of the tongue. In some embodiments, the fastening mechanism 972 can further include a third fastening member that can be defined by one or more of: the lattice-work structure formed by one or more apertures 988 of one or more of the plurality of lower frames 970*a*; the plurality of upper frames 970*b*; or the frame ring 914.

Figure 37:
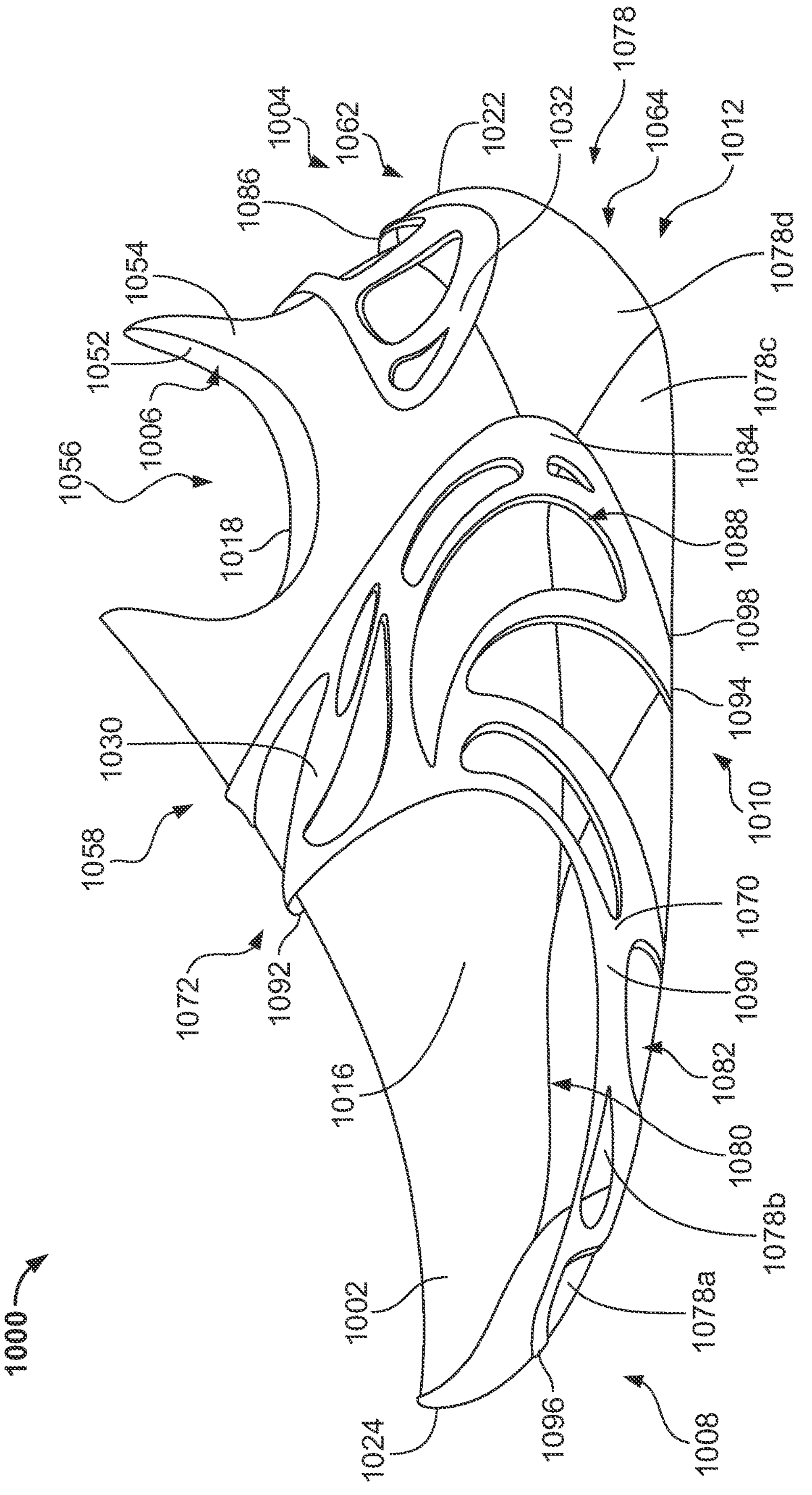
FIG. 37 is a lateral side view of another example of an article of footwear that is similar to the article of footwear of FIG. 1.

Referring now to FIG. 37, yet another exemplary embodiment of an article of footwear 1000 is depicted, which includes an upper 1002, a sole structure 1004 with a midsole 962 formed of a plurality of midsole members 978, and a frame 1070. The article of footwear 1000 is similar to previous embodiments, with like elements being indicated by similar reference numerals under the "10xx" series of reference numerals. In contrast to previous embodiments, in the article of footwear 1000, a flap 1030 of the frame 1070 extends partially over the sole structure 1004 and over the instep region 1058 from the lateral side 1016 to the medial side 1018 of the upper 1002, and then around the proximal end 1022 of the upper 1002.

As shown in FIG. 37, the bottom side 1094 of the frame 1070 extends along bottom portions 1082 of at least first, second, and third midsole members 1078*a*, 1078*b*, 1078*c* of the plurality of midsole members 1078 that are disposed in the forefoot and midfoot regions 1008, 1010 of the sole structure 1004. In the illustrated embodiment, the distal end 1096 of the frame 1070 does not extend to the distal end 1024 of the sole structure 1004, and the proximal end 1098 of the frame 1070 extends through the midfoot region 1010 of the sole structure 1004. The lateral and medial sides 1090, 1092 of the frame 1070 extend over the upper portions 1080 of the second midsole member 1078*b*, the third midsole member 1078*c*, and a fourth midsole member 1078*d* of the plurality of midsole members 1078 that are disposed within the midfoot and heel regions 1010, 1012. The flap 1030 of the frame 1070 extends from the lateral side 1090 of the frame 1070 and over the instep region 1058 to the medial side 1018 of the upper 1002. The flap 1030 of the frame 1070 then extends along the medial side 1018 of the upper to a lower portion of the proximal end 1022 of the upper 1002 and along at least the upper portions 1080 of at least the third and fourth midsole members 1078*c*, 1078*d* disposed toward the proximal end 1022 of the sole structure 1004. The flap 1030 of the frame 170 continues to extend around the proximal end 1022 of the upper 1002 and back to the lateral side 1016 of the upper 1002 where the flap 1030 terminates at a flap end 1032.

With continued reference to FIG. 37, in some embodiments, the frame 1070 can be comprised of two or more materials, for example, at least a portion of the flap 1030 of the frame 1070 can be comprised of a first material, e.g., that is flexible, and the remainder of the frame 1070 can be comprised of a second material, e.g., that this is more rigid than the first material. In such embodiments, the flap 1030 of the frame 1070 can be configured to releasably attach to the upper 1002 and/or the sole structure 1004 such that the flap 1030 can be flexed away from the instep region 1058 by a user. In such embodiments, the flap 1030 of the frame 1070 can function as a fastening mechanism 1072 of the footwear 1000 by releasably securing the flap end 1032 of the flap 1030 to the upper 1002 and/or the sole structure 1004. In such embodiments, the flap end 1032 can include a recess or a protrusion and the upper 1002 and/or the sole structure 1004 can include a corresponding recess or protrusion configured to receive the recess or protrusion of the flap end 1032. In some embodiments, the flap 1030 extends from the medial side 1092 of the frame 1070 and then over the instep region 1058 to the lateral side 1016 of the upper 1002. In some embodiments, the frame 1070 includes a first flap that extends from the lateral side 1090 of the frame 1070 over a first portion of the instep region 1058 and a second flap that extends from the medial side 1092 of the frame 1070 over a second portion of the instep region 1058 that is different than the first portion. In such embodiments, the fastening mechanism 1072 of the article of footwear 1000 can comprise both the first flap on the lateral side 1090 and the second flap on the medial side 1092 of the frame 1070.

Figure 38:
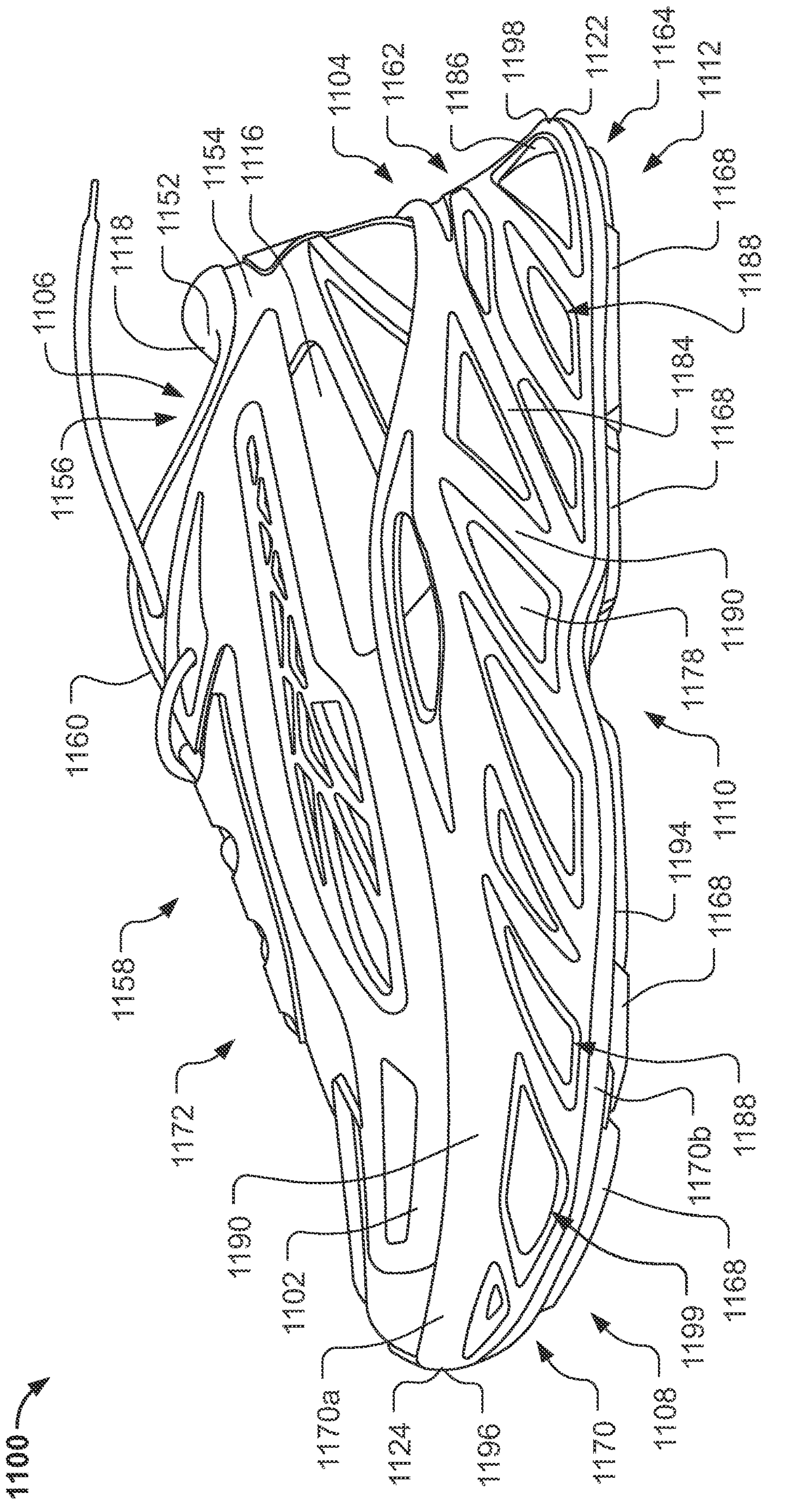
FIG. 38 is a lateral side view of yet another example of an article of footwear, according to an embodiment of the disclosure, that is similar in some ways to the article of footwear of FIG. 1.

Referring now to FIG. 38, yet another exemplary embodiment of an article of footwear 1100 is depicted, which includes an upper 1102, a sole structure 1104, and a frame 1170. The article of footwear 1100 is similar to previous embodiments, with like elements being indicated by similar reference numerals under the "11xx" series of reference numerals. However, in contrast to previous embodiments, the frame 1170 of the article of footwear 1100 includes a first or upper frame member 1170*a* and a second or lower frame member 1170*b* coupled to the upper frame member 1170*a*. Further, a midsole or midsole region 1162 of the sole structure 1104 is formed of only a single midsole member 1178 received within a frame interior cavity 1199 that is collectively formed by the upper and lower frame members 1170*a*, 1170*b* and that extends from a lateral side 1190 to a medial side (not shown) of the frame 1170 and from a distal end 1196 to a proximal end 1198 of the frame 1170. In other words, the single midsole member 1178 extends within each of the forefoot, midfoot, and heel regions 1108, 1110, 1112 and between the lateral and medial sides 1116, 1118 of the article of footwear 1100.

With continued reference to FIG. 38, in the illustrated embodiment, the upper frame member 1170*a* defines a lateral side 1190, a medial side (not shown), a distal side 1196, and a proximal side 1198 of the frame 1170 while the lower frame member 1170*b* forms an entire bottom side 1194 of the frame 1170. The lateral side 1190 and the medial side (not shown) of the frame 1170 are adjacent to the lateral and medial sides 1116, 1118, respectively, of the upper 1102, and the distal and proximal ends 1196, 1198 of the frame 1170 are adjacent to the distal and proximal ends 1122, 1124, respectively, of the upper 1102.

Figure 39:
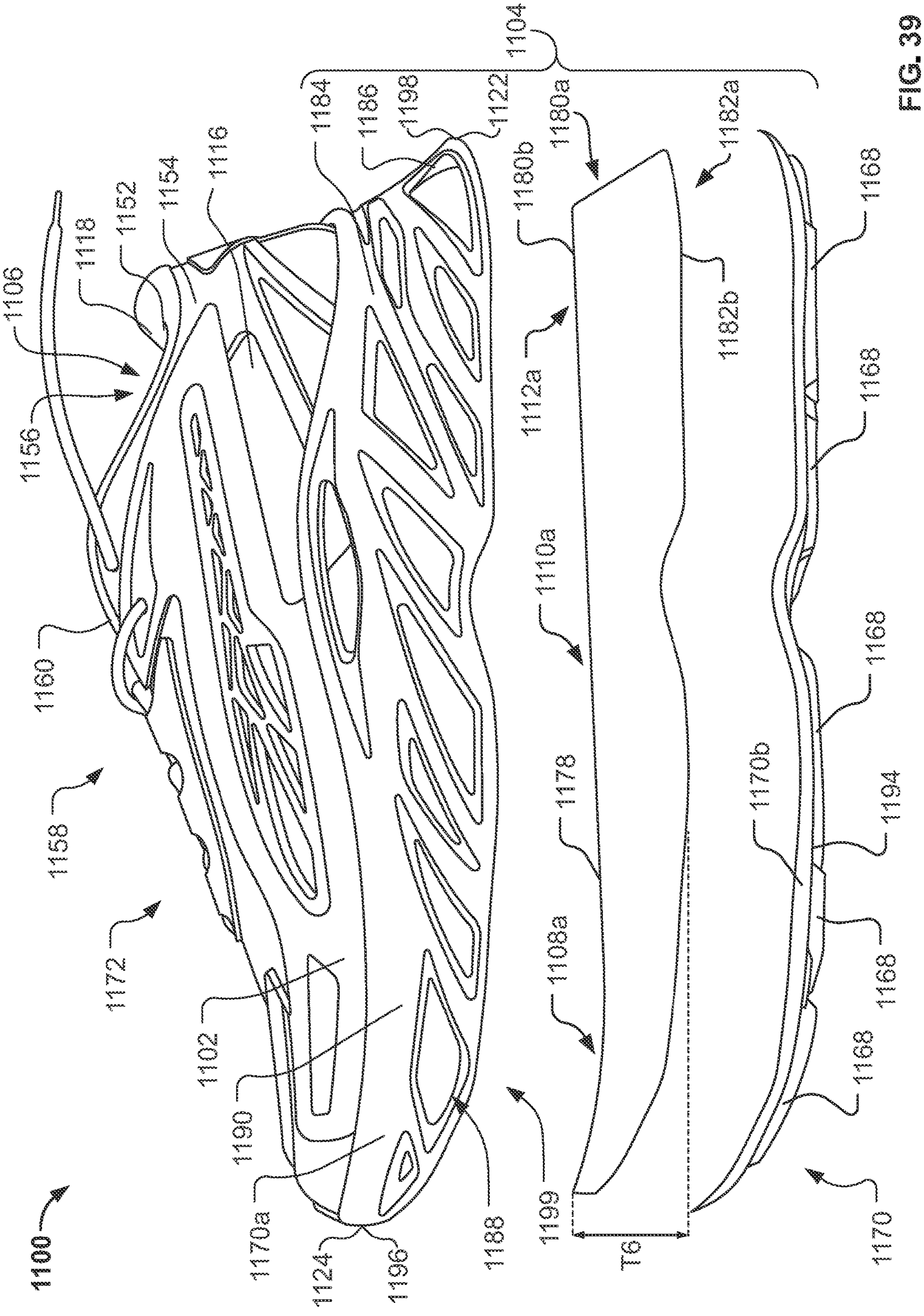
FIG. 39 is an exploded view of the sole structure of the article of footwear of FIG. 38.

As shown in FIG. 39, in the illustrated embodiment, the upper frame member 1170*a* is fixedly attached to the upper 1102 and the lower frame member 1170*b* is removably attached to the upper frame member 1170*a*. As such, the midsole member 1178 may be removed and replaced from the sole structure 1104, i.e., the frame interior cavity 1199, when the lower frame member 1170*b* is removed from the upper frame member 1170*a*. In some embodiments, the upper frame member 1170*a* is removably attached to the upper 1102 and the lower frame member 1170*b* is removably attached to the upper frame member 1170*a*. In some embodiments, the lower frame member 1170*b* can comprise a plurality of lower frame members that each are fixedly or removably attached to different portions of the upper frame member 1170*a*. For example, in some embodiments, the lower frame member 1170*b* can include a first or distal lower frame member attached to a first or distal portion of the upper frame member 1170*a* in at least the forefoot region 1108 and a second or proximal lower frame member attached to a second or proximal portion of the upper frame member 1170*a* in at least the heel region 1112. In such embodiments, at least one of the distal and proximal lower frame members of the lower frame member 1170*b* may be removably attached to the upper frame member 1170*a* such that the midsole member 1178 may be removed and replaced from the frame interior cavity 1199 when the at least one of the distal and proximal lower frame members are removed from the upper frame member 1170*a*.

Referring again to FIG. 38, the lower frame member 1170*b* of the frame 1170 includes a plurality of outsole members 1168 that extend downwardly from the bottom side 1194 of the frame 1170. In the illustrated embodiment, the plurality of outsole members 1168 are integrally formed with the lower frame member 1170*b* such that the plurality of outsole members 1168 can be replaced by a user by removing and replacing the lower frame member 1170*b* with a different lower frame member. In some embodiments, the plurality of outsole members 1168 can be removably attached to the lower frame member 1170*b* and thus can be replaced by a user by removing and replacing only the plurality of outsole members 1168. For example, in some embodiments, one or more of the plurality of outsole members 1168 can removably attach to an exterior surface 1184 of the frame 1170 along the bottom side 1194, similar to the outsole member 268 and the frame 270 shown in FIGS. 15 and 16. In other embodiments, one or more of the plurality of outsole members 1168 can be disposed between the midsole member 1178 and an interior surface 1186 of the frame 1170 along the bottom side 1194 and extend through the plurality of apertures along the bottom side 1194 of the frame 1170, similar to the outsole member 268 and the frame 270 shown in FIGS. 12 and 13. In such embodiments, the one or more of the plurality of outsole members 1168 can be replaced by a user when the lower frame member 1170*b* is removed from the upper frame member 1170*a*. In some embodiments, the plurality of outsole members 1168 may be formed of the same material, but have a different density, as at least the lower frame member 1170*b*. For example, in some embodiments, the plurality of outsole members 1168 may be integrally formed with the lower frame member 1170*b* in a single mold and the plurality of outsole members 1168 may be formed with a greater density via an increased temperature along a corresponding surface of the mold compared to other surfaces of the mold.

Referring again to FIG. 39, in the illustrated embodiment, the midsole member 1178 is not attached to the upper 1102 or the frame 1170 such that the midsole member 1178 is held in place adjacent to the upper 1102 by the frame 1170. Thus, the midsole member 1178 may be removed from the sole structure 1104, i.e., the frame interior cavity 1199, by a user when the lower frame member 1170*b* is removed from the upper frame member 1170*b*. In some embodiments, the midsole member 1178 may be attached to at least one of the upper 1102 and/or the frame 1170. In some embodiments, the midsole member 1178 may be attached to only at least one of the upper frame member 1170*a* and/or the lower frame member 1170*b*. In some embodiments, an upper side or surface 1180*b* of the midsole member 1178 may directly contact a sole of a user's foot while wearing the article of footwear 1100. In some embodiments, the sole structure 1104 can further include an insole (not shown) disposed between the upper surface 1180*b* of the midsole member 1178 and a sole of the user's foot while wearing the article of footwear 1100. In such embodiments, the insole can be formed of textile material, a foam pad, or a plastic film disposed within an interior cavity 1106 of the upper 1102. In other embodiments, the upper surface 1180*b* of the midsole member 1178 may at least partially define and function as an insole of the sole structure 1104.

Still referring to FIG. 39, the midsole member 1178 has a thickness $T_6$ measured between the upper surface 1180*b* and a lower side or surface 1182*b*, opposite the upper surface 1180*b*, of the midsole member 1178. In the illustrated embodiment, the thickness $T_6$ of the midsole member 1178 is substantially uniform when the midsole member 1178 is removed from the frame 1170, i.e., a final size or thickness of the midsole member 1178. In some embodiments, the midsole member 1178 may be configured such that at least some portions the midsole member 1178 can expand through one or more of the plurality of apertures 1188 disposed on the lateral, medial, and proximal sides 1190, 1192, 1198 of the frame 1170 when the sole structure 1104 is compressed by a user's foot, similar to the midsole members 278*c*, 278*d* of the article of footwear 200 shown in FIGS. 8 and 9. For example, in some such embodiments, the midsole member 1178 may comprise a compressible material such that the midsole member 1178 may compress in one or more regions or portions between the lower frame member 1170*b* and the upper 1102 and expand outwardly from the frame internal cavity 1199 and through at least some of the plurality of apertures 1188 of the frame 1170 in response to a force exerted on the midsole member 1178 by a user's foot. In some embodiments, the thickness $T_6$ of the midsole member 1178 may vary in one or more portions of the midsole member 1178. For example, in some embodiments, a midfoot portion of the midsole member 1178, i.e., a portion disposed at least partially in the midfoot region 1110 of the sole structure 1104, may have a thickness that is less than that of a forefoot portion or a heel portion of the midsole member 1178, i.e., portions disposed at least partially in the forefoot region 1108 or the heel region 1112 of the sole structure 1104, respectively. In some embodiments, each of the forefoot, midfoot, and heel portions of the midsole member 1178 may have a thickness that is different than that of the other portions of the midsole member 1178.

It should be appreciated that a midsole member of an article of footwear having a frame may be comprised of a variety of one or more materials and may be formed by a variety of one or more manufacturing processes, such as, e.g., via one or more of processes 1200, 1300, 1400, 1500 shown in FIGS. 44-48, respectively. For example, one or more of the midsole member(s) 178, 278, 378, 478, 578, 678, 778, 878, 978, 1078, 1178 of the articles of footwear 100, 200, 300, 400, 500, 600, 700, 800, 900, 1000, 1100, respectively, may be configured and arranged to primarily provide cushioning to the respective sole structures 104, 204, 304, 404, 504, 604, 704, 804, 904, 1004, 1104. Accordingly, the midsole member 1178, as well as any of the midsole members 178, 278, 378, 478, 578, 678, 778, 878, 978, 1078, may be comprised of ethylene-vinyl acetate (EVA), copolymers thereof, or a similar type of material. For example, in some embodiments, the midsole member 1178 may be comprised of an EVA-Solid-Sponge ("ESS") material, an EVA foam (e.g., PUMA® ProFoam Lite™, IGNITE Foam), polyurethane, polyether, an olefin block copolymer, a thermoplastic material (e.g., a thermoplastic polyurethane, a thermoplastic elastomer, a thermoplastic polyolefin, etc.), or a supercritical foam. The midsole member 1178 may be comprised of a single polymeric material or may be a blend of materials, such as an EVA copolymer, a thermoplastic polyurethane, a polyether block amide (PEBA) copolymer, and/or an olefin block copolymer.

As one particular example, in some embodiments, the midsole member 1178, or any of the midsole members 178, 278, 378, 478, 578, 678, 778, 878, 978, 1078, may be formed of a foam material that may be formed by a supercritical foaming process, such that the foam material forms a supercritical foam. The supercritical foam may comprise micropore foams or particle foams, such as, e.g., a TPU, EVA, PEBAX®, or mixtures thereof, manufactured using one or more steps or processes that are performed within an autoclave, an injection molding apparatus, or any sufficiently heated/pressurized container that can process the mixing of a supercritical fluid, such as, e.g., $CO_2$, $N_2$, or mixtures thereof, with a material, such as, e.g., TPU, EVA, polyolefin elastomer, or mixtures thereof, that is preferably molten. During an exemplary process, a solution of supercritical fluid and molten material is pumped into a pressurized container, after which the pressure within the container is released, such that the molecules of the supercritical fluid rapidly convert to gas to form small pockets or gaps within the material and cause the material to expand into a foam, which may be used as the midsole member 1178.

In some embodiments, such as in cases in which a supercritical gas is utilized as a foaming agent, the foaming agent forms hollow cells within the material. In some embodiments, the material may be formed as an "open foam," i.e., the foaming agent is removed substantially entirely from such hollow cells such that a final or production ready midsole member does not comprise such supercritical gas, or a "closed foam," i.e., the foaming agent remains within such hollow cells such that a final or production ready midsole member comprises such supercritical gas. In such closed foam embodiment, it is preferable to utilize a non-toxic supercritical gas as the foaming agent, such as, e.g., nitrogen. In further embodiments, the midsole member 1178 may be further formed using additional alternative methods known in the art, including the use of an expansion press, an injection machine, a pellet expansion process, a cold foaming process, a compression molding technique, die cutting, or any combination thereof, to further form the supercritical foam midsole member 1178. For example, the midsole member 1178 may be formed using a process that involves an initial or first step in which an initial midsole member is formed, an intermediate or second foaming step in which supercritical gas is used to form an intermediate midsole member from the initial midsole member, and then a final or third step in which the intermediate midsole member is compression molded or die cut to a particular shape to form a final midsole member, that may be used as the midsole member 1178 in the footwear 1100.

In some embodiments, the midsole member 1178 may consist of only a single foam material. However, in other embodiments, the midsole member 1178 may comprise a combination of two or more foam materials. For example, in some such embodiments, the midsole member 1178 may include a first portion formed of a first foam material and a second portion that is connected or attached to the first portion and is formed of a second foam material that has one or more properties that differ from the first foam material.

In some embodiments, a foam material that forms the midsole member 1178, as well as any of the midsole members 178, 278, 378, 478, 578, 678, 778, 878, 978, 1078, may have a density within a range of between about 0.05 grams per cubic centimeter ($g/cm^3$) and about 0.30 $g/cm^3$, in a range of between about 0.07 $g/cm^3$ and about 0.25 $g/cm^3$, or in a range of between about 0.10 $g/cm^3$ and about 0.20 $g/cm^3$. In further embodiments, the midsole member 1178 may have a hardness in a range of between about five (5) Shore A to about forty (40) Shore A, in a range of between about ten (10) Shore A to about thirty-five (35) Shore A, or in a range of between about (5) Shore A to about twenty (20) Shore A.

It should be appreciated that a midsole member of a sole structure may be configured to provide a particular performance benefit to a user, such as by forming different portions or regions of the midsole member with different materials or by varying one or more properties of one or more of the portions or regions, such as, e.g., by varying one or more manufacturing processes used to form the midsole member. As such, a midsole member of a sole structure may provide one or more target properties or characteristics, such as, e.g., varied density, hardness, and/or elasticity between respective portions or regions, that may provide to a user improved comfort, cushioning, and/or shock absorption. Moreover, a midsole member may be customized to provide one or more performance characteristics that are particularly beneficial to a specific activity of the user. For example, a first midsole member can have a first configuration that provides improved comfort to a user for walking activities, a second midsole member can have a second configuration that provides improved cushioning for running activities, and a third midsole member can have a third configuration that provides improved shock absorption for cross-training activities. Further, in embodiments in which the midsole member can be removed and replaced within a frame of the sole structure, such as, e.g., via the lower frame member **1170*b* being removably attached to the upper frame member 1170*a* of sole structure 1104 of the article of footwear 1100 (see FIGS. 38 and 39**), the user may be able to customize the article of footwear for a particular activity by interchangeably removing and replacing one of a plurality of interchangeable midsole members from the frame and replacing it with a different one of the plurality of interchangeable midsole members.

Accordingly, the midsole member 1178 of the article of footwear 1100 may be configured such that one or more portions or regions of the midsole member 1178 have one or more properties that differ from that of one or more other portions or regions of the midsole member 1178, such as, e.g., by utilizing different materials in the different portions or regions or by forming the different portions or regions utilizing different manufacturing processes. By varying one or more properties, such as, e.g., a density, a hardness, among others, of two or more different portions or regions of the midsole member 1178, the sole structure 1104 may provide targeted performance characteristics to a user. More specifically, a first portion or region of the midsole member 1178 that has a first density that is less than a second density of a second portion or region will compress more compared to the second portion or region when a load or weight is applied thereto. Thus, the less dense first portion or region of the midsole member 1178 may be particularly useful in a load bearing arrangement to provide support to the sole structure 1104, while the denser second portion or region may be particularly useful in an impact force absorbing arrangement to provide cushioning to the sole structure 1104.

As one particular example, in some embodiments, an upper region or portion 1180*a* of the midsole member 1178, i.e., a portion or region located vertically above the lower surface 1182*b* and that may include the upper surface 1180*b*, may have one or more first or upper properties, such as, e.g., a density, a hardness, and/or an elasticity, that differs from one or more corresponding second or lower properties of a lower portion or region 1182*a* of the midsole member 1178, i.e., a portion or region located vertically below the upper portion 1180*a* and that may include the lower surface 1182*b*. In such embodiments, the upper and lower portions 1180*a*, 1182*a* of the midsole member 1178 may be integrally formed or may be formed separately and later joined together, such as, e.g., via an overmolding process, an ultrasonic welding process, or the like. As yet another example, in some embodiments, a forefoot portion or region 1108*a* of the midsole member 1178, i.e., a portion or region that is located at least partially within the forefoot region 1108 of the sole structure 1104, may have one or more first or forefoot properties, such as, e.g., a density, a hardness, and/or an elasticity, that differs from a corresponding one or more third or heel properties of a heel portion or region 1112*a* of the midsole member 1178, i.e., a portion or region that is located at least partially within the heel region 1112 of the sole structure 1104.

Further, a midfoot portion or region 1110*a* of the midsole member 1178, i.e., a portion or region that is located at least partially within the midfoot region 1110 of the sole structure 1104, may have one or more second or midfoot properties, such as, e.g., a density, a hardness, and/or an elasticity, that differ from one or more corresponding forefoot and/or heel properties of the forefoot and/or heel portions 1108*a*, 1112*a*, respectively. In some embodiments, at least two of the forefoot, midfoot, and heel portions 1108*a*, 1110*a*, 1112*a* of the midsole member 1178 may be integrally formed or may be formed separately and later joined together, such as, e.g., via an overmolding process, an ultrasonic welding process, or the like. In some embodiments, the midsole member 1178 may have a substantially uniform density with each of the forefoot, midfoot, and heel regions 1108*a*, 1110*a*, 1112*a*.

In some embodiments, the midsole member 1178 can be formed of a first material and the midsole member 1178 can further include an optional coating formed of a second material that is applied around an exterior surface of the midsole member 1178. The optional coating may be a skin layer disposed around the outside of the midsole member 1178. Alternatively, the coating may be added to the outside of the midsole member 1178 by spraying, extrusion coating, painting, dipping, or any other suitable method. The coating may be comprised of any materials suitable for a particular application. For example, the coating may include a foam material as described herein, which can be a foam material that is different than the foam material of the midsole member 1178. The coating may alter or improve a target property of the midsole member 1178. For example, the coating may provide the midsole member 1178 with any or all of: a harder outer surface, an improved resistance to ingress of water, an improved resistance to stains, a higher melting temperature, a higher flashpoint, improved bonding properties, and/or a preferable appearance. As one specific example benefit, the optional coating of the midsole member 1178 may provide the midsole member 1178 with improved resistance to ingress of water or to stains, which may be particularly advantageous in improving the durability of the midsole member 1178 that has portions thereof exposed through the plurality of apertures 1188 of the frame 1170.

Figure 40:
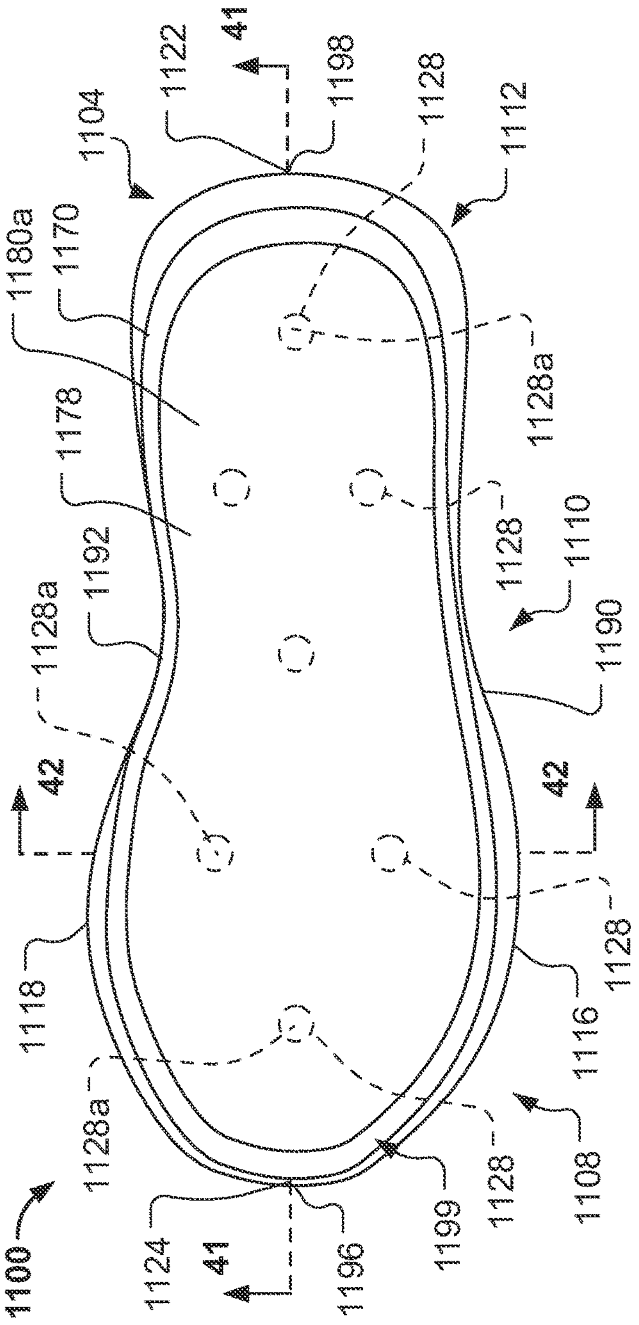
FIG. 40 is a top plan view of the article of footwear of FIG. 38, with an upper removed.
Figure 41:
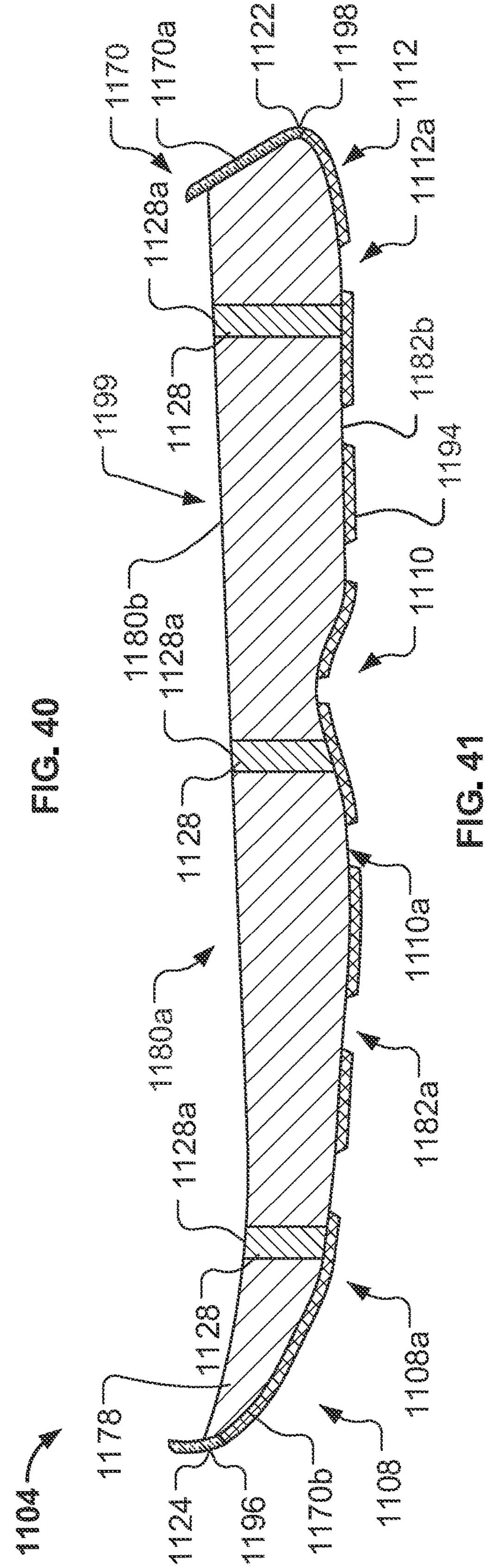
FIG. 41 is a cross-sectional view taken along line 41-41 of FIG. 40.
Figure 42:
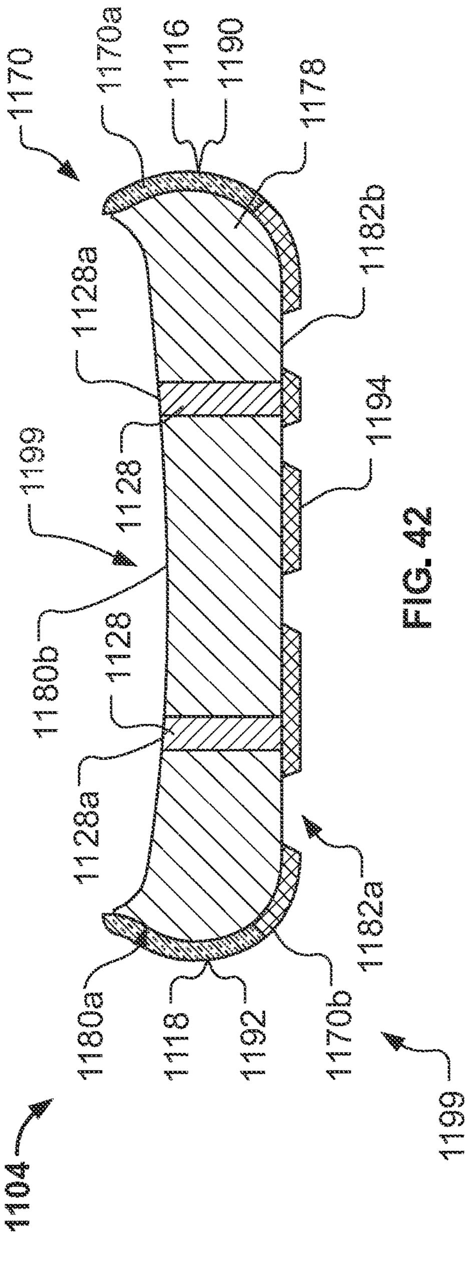
FIG. 42 is a cross-sectional view taken along line 42-42 of FIG. 40.

It should be appreciated the sole structure 1104 of the article of footwear 1100 can be configured to further secure the midsole member 1178 within the frame interior cavity 1199 of the frame 1170 and, relatedly, to provide additional support to a user's foot. For example, FIGS. 40-42 illustrate another embodiment of the sole structure 1104 of the article of footwear 1100. As shown in FIGS. 41 and 42 in particular, a plurality of columns 1128 extend from the interior surface 1186 of the frame 1170 along the bottom side 1194 and into the lower surface 1182*b* (see FIG. 39) of the midsole member 1178. In some embodiments, at least some of upper ends 1128*a* of the plurality of columns 1128 can be disposed at a distance from the upper surface 1180*b* of the midsole member 1178. In some embodiments, at least some of the upper ends 1128*a* of the plurality of columns 1128 can extend through the upper surface 1180*b* of the midsole member 1178. In such embodiments, the at least some of the upper ends 1128*a* of the plurality of columns 1128 can be fixedly or removably attached to the upper 1102 or, in addition or alternatively, an insole (not shown) of the sole structure 1104. As shown in FIG. 40 in particular, one or more columns of the plurality of columns 1128 is disposed in each of the forefoot, midfoot, and heel regions 1108, 1110, 1112 of the sole structure 1104. In some embodiments, the plurality of columns 1128 are disposed in only one or two of the forefoot, midfoot, and heel regions 1108, 1110, 1112. In some embodiments, the plurality of columns 1128 can include six or less or eight or more columns.

With continued reference to FIG. 40, in some embodiments, the plurality of columns 1128 can be attached only to the midsole member 1178 such that each of the midsole member 1178 and the plurality of columns 1128 is not attached to the upper 1102 or the frame 1170. Put another way, the plurality of columns 1128 may be included in the midsole member 1178 itself. In some such embodiments, the midsole member 1178 may be overmolded with the plurality of columns by one or more manufacturing processes. For example, in some such embodiments, the plurality of columns 1128 may be formed and/or arranged within a mold cavity and one or more portions of the midsole member 1178 may be formed about the plurality of columns within the same mold cavity, such as, e.g., via a multi-step injection molding process. In some embodiments, the plurality of columns 1128 may be configured to compress axially with the midsole member 1178 between the lower frame member 1170*b* and the upper 1102, e.g., in response to dynamic forces exerted on the midsole member 1178 in one or more vectors by a user's foot. In some embodiments, the midsole member 1178 can be formed of a first material and the plurality of columns 1128 can be formed of a second material that is different than the first material. For example, in such embodiments, the midsole member 1178 may be formed of a first material having a first compressibility and the plurality of columns may be formed of a second material having a second compressibility.

Figure 43:
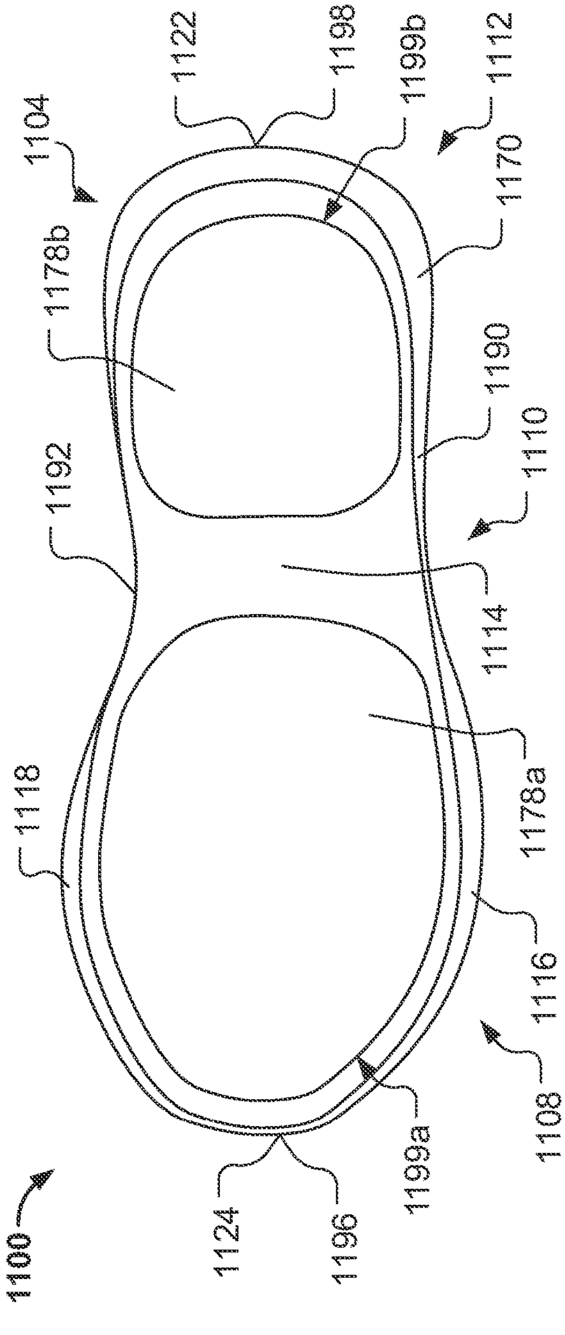
FIG. 43 is another example sole structure and midsole member of the article of footwear of FIG. 38, according to another embodiment of the disclosure.

It should also be appreciated that the midsole 1162 of the sole structure 1104 of the article of footwear 1100 may be defined by a plurality of midsole members and, in some embodiments, the frame 1170 may define a plurality of interior cavities that each receive one of the plurality of midsole members. For example, FIG. 43 illustrates yet another embodiment of the sole structure 1104 of the article of footwear 1100 that includes a first or distal midsole member 1178*a* arranged within a first or distal frame interior cavity 1199*a* of the frame 1170 and a second or proximal midsole member 1178*b* arranged within a second or proximal frame interior cavity 1199*b* of the frame 1170. In the illustrated embodiment, the first frame interior cavity 1199*a* is separated from the second frame interior cavity 1199*b* by a bridge portion 1114 extending between the lateral and medial sides 1190, 1192 of the frame 1170 such that the first midsole member 1178*a* does not contact the second midsole member 1178*b*. In some embodiments, the bridge portion 1114 can be integrally formed with at least the lower frame member 1170*b* and can extend upward from the interior surface 1186 of the frame 1170 along the bottom side 1194 to the upper 1102. In some embodiments, the bridge portion 1114 can comprise a material that is different than one or both of the upper and lower frame members 1170*a*, 1170*b*. For example, in some embodiments, the bridge portion 1114 can be formed of a first material and the lower frame member 1170*a* can be formed of a second material that is more rigid than the first material. In some such embodiments, the upper frame member 1170*a* can be formed of a third material and the second material can be more rigid than the first and third materials. Further, in some embodiments, the first distal midsole member 1178*a* may be formed of a material, or have one or more properties, that differs from that of the second midsole member 1178*b*, which can provide one or more targeted performance characteristics of the sole structure 1104, as previously discussed herein, in addition to a particular material or property of the bridge portion 1114.

With continued reference to FIG. 43, in the illustrated embodiment, the first midsole member 1178*a* is disposed entirely within the forefoot region 1108 and the second midsole member 1178*b* is disposed entirely within the heel region 1112. In some embodiments, the second midsole member 1178*b* can be disposed at least partially within the midfoot and heel regions 1110, 1112. In some embodiments, the midsole 1162 of the sole structure 1104 can be formed by three or more midsole members and the frame 1170 can define three or more interior cavities that are separated by two or more bridge portions 1114. For example, in some embodiments, the first midsole member 1178*a* can include a first lateral midsole member disposed within a first lateral frame interior cavity adjacent to the lateral side 1190 of the frame 1170 and a first medial midsole member disposed within a first medial frame interior cavity adjacent to the medial side 1192 of the frame 1170 and separated from the first lateral frame interior cavity by a second bridge portion extending from the second frame interior cavity to the distal end 1196 of the frame 1170.

As mentioned above, in some embodiments, a midsole member of an article of footwear having a frame may be formed from a process or method that includes a supercritical foaming process. Further, it should be appreciated that methods or processes may be utilized to manufacture a midsole member of a sole structure of an article of footwear having a frame—such as, e.g., any one or more of the midsole member(s) 178, 278, 378, 478, 578, 678, 778, 878, 978, 1078, 1178 of the articles of footwear 100, 200, 300, 400, 500, 600, 700, 800, 900, 1000, 1100 having the frames 170, 270, 370, 470, 570, 670, 770, 870, 970, 1070, 1170 in FIGS. 1-43—that differ from known supercritical foaming processes used to form conventional midsoles of conventional sole structures of articles of footwear, i.e., that is disposed between an upper and an outsole of the footwear and solely defines a midsole region of the sole structure. For example, such conventional midsoles commonly require a minimum density or hardness in order to provide both lateral and compressive support to the sole structure. In comparison to such conventional sole structures, a frame of an article of footwear secures and supports one or more midsole members disposed within a frame internal cavity thereof—such as, e.g., midsole member 1178 disposed within the frame internal cavity 1199 of the frame 1170 of the article of footwear 1100 in FIGS. 38-43—and thus may permit a midsole member to be formed with one or more properties, e.g., density, hardness, among others, that differ from that of a conventional midsole formed by some known processes. As such, one or more midsole members, which, with a frame, collectively define a midsole or midsole region of a sole structure, may be formed to provide additional benefits to a user, such as, e.g., enhanced comfort, cushioning, and/or shock absorption, as compared to conventional sole structures.

Figure 44:
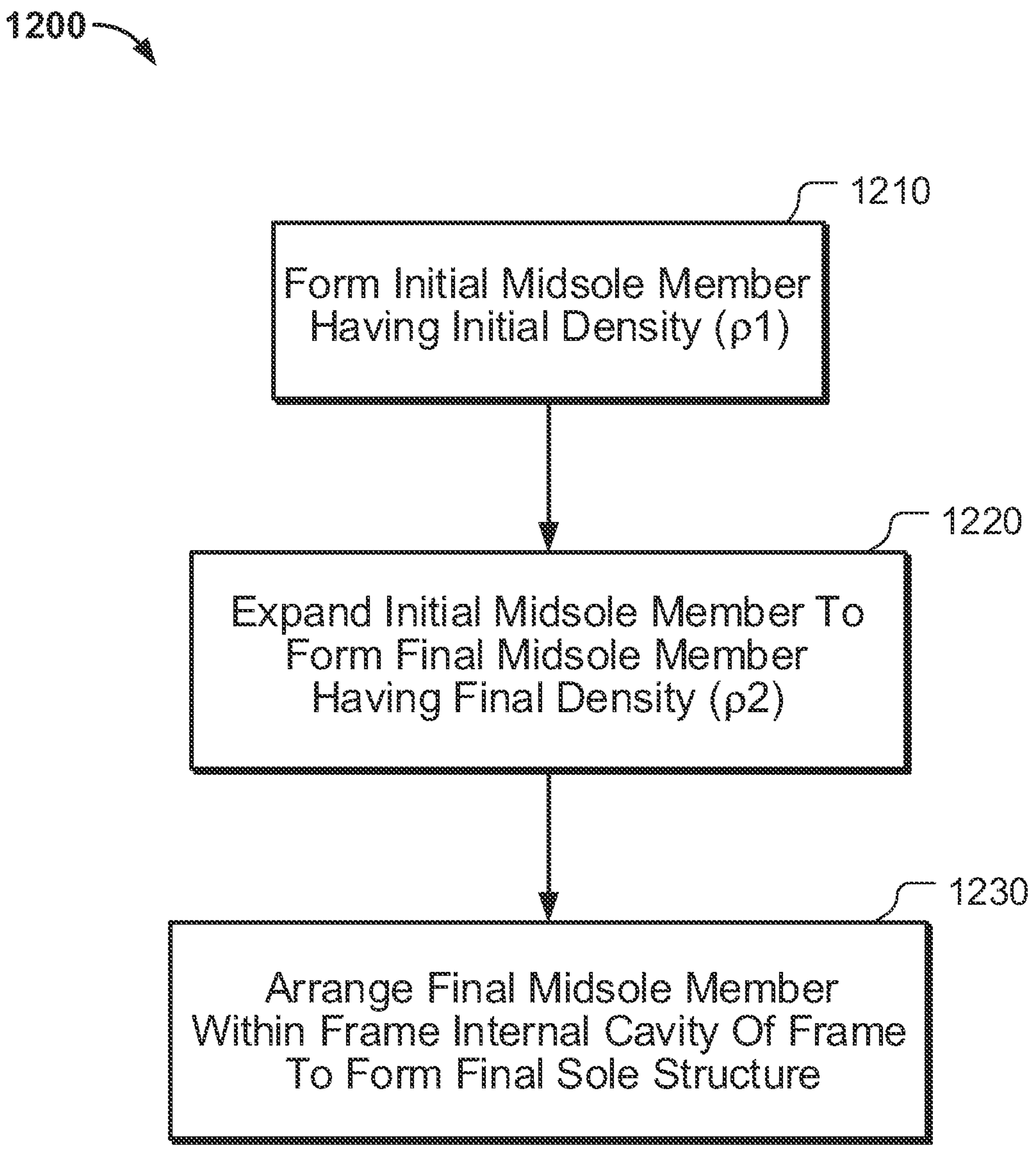
FIG. 44 is a flowchart representative of an example method of manufacturing a midsole member of an article of footwear, according to an embodiment of the disclosure.

In this regard, FIG. 44 shows an exemplary process 1200 of manufacturing a midsole member of an article of footwear, such as, e.g., any one or more of the midsole member(s) 178, 278, 378, 478, 578, 678, 778, 878, 978, 1078, 1178 of the articles of footwear 100, 200, 300, 400, 500, 600, 700, 800, 900, 1000, 1100, respectively, according to an embodiment of this disclosure.

In the illustrated example of FIG. 44, step 1210 of process 1200 may include forming an initial midsole member having an initial density ("ρ1"). The initial midsole member may be formed, as in step 1210, via conventional thermoplastic molding techniques widely known in the art. For example, in one particular embodiment, the initial midsole member may be formed via an injection molding process in which thermoplastic pellets are melted to a predetermined temperature into a pressurized cavity of a mold. In some embodiments, the initial midsole member may be formed via an extrusion process, among others. In some embodiments, the initial midsole member, as formed in step 1210, may be comprised of a thermoplastic, such as, e.g., TPU, EVA, polyolefin elastomer, or mixtures thereof. In some embodiments, the initial density ρ1 of the initial midsole member, as formed in step 1210, can be in a range between about 0.10 g/cm$^3$ and about 1.50 g/cm$^3$, in a range between about 0.20 g/cm$^3$ and about 1.25 g/cm$^3$, or in a range between about 0.25 g/cm$^3$ and about 1.00 g/cm$^3$. In some embodiments, an initial hardness of the initial midsole member, as formed in step 1210, can be in a range between about 40 Shore C and about 60 Shore C, in a range between about 42 Shore C and about 58 Shore C, or in a range between about 45 Shore C and about 55 Shore C.

With continued reference to FIG. 44, step 1220 of process 1200 can include expanding the initial midsole member having the initial density ρ1, as formed in step 1210, to form a final midsole member having a final density ("ρ2") that is less than the initial density ρ1. Likewise, the final midsole member, as formed in step 1220, will also have a final hardness that is less than the initial hardness of the initial midsole, as formed in step 1210. In some embodiments, the initial midsole member having the initial density ρ1, as formed in step 1210, can be exposed to a supercritical fluid that causes expansion of the initial midsole member, and correspondingly a reduction from the initial density ρ1, and results in the formation of the final midsole member having the final density ρ2, as formed in step 1220. For example, in one particular embodiment, the final midsole member is formed, as in step 1220, by inlaying the initial midsole member, as formed in step 1210, within an autoclave and saturating the initial midsole member with a supercritical fluid, such as, e.g., $CO_2$, $N_2$, or mixtures thereof, via a first or saturation pressure, and then, after a predetermined amount of time, the saturation pressure within the autoclave is rapidly reduced to a second or foaming pressure to remove the supercritical fluid. This relatively rapid removal of supercritical fluid from the initial midsole member, via the reduction from the saturation pressure to the foaming pressure, triggers the "foaming" process of the initial midsole member that causes expansion of cells or gaps within the initial midsole member and results in the formation of the final midsole member having the final density ρ2.

In some embodiments, expanding the initial midsole member, as formed in step 1210, to form the final midsole member, as in step 1220, may include introducing a foaming agent into a pressurized mold in which the initial midsole member is formed such that the foaming agent causes the molten thermoplastic to "foam" and create bubbles of gas within the molten thermoplastic. In some embodiments, an initial midsole member, as formed in step 1210, may be a molten mixture of two or more components within a mold that is expanded to form a final midsole member, as in step 1220, by causing a predetermined condition within the mold, e.g., an increase or decrease in a pressure or a temperature within the mold, that causes the two or more components of the molten mixture to react and form gas bubbles therein. In other such embodiments, an initial midsole member may be expanded to form a final midsole member by introducing an additional component, i.e., a second foaming agent, that interacts with the foaming agent to create the gas bubbles.

In some embodiments, the final density ρ2 of the final midsole member, as formed in steps 1210, 1220, can be in a range between about 0.05 g/cm$^3$ and about 0.20 g/cm$^3$, in a range between about 0.07 g/cm$^3$ and about 0.18 g/cm$^3$, or in a range between about 0.10 g/cm$^3$ and about 0.17 g/cm$^3$. In some embodiments, a final hardness of the final midsole member, as formed in steps 1210, 1220, can be in a range between about 5 Shore C and about 35 Shore C, in a range between about 8 Shore C and about 30 Shore C, or in a range between about 10 Shore C to about 22 Shore C. In some embodiments, the final density ρ2 and/or the final hardness of the final midsole member, as formed in steps 1210, 1220, can be substantially uniform throughout the final midsole member. In some embodiments, an expansion ratio, e.g., a ratio of an initial volume of the initial midsole member, as formed in step 1210, to a final volume of the final midsole member, as formed in step 1220, may be between about 1.1 and about 2.1, between about 1.3 and about 1.5, between about 1.5 and about 1.7, between about 1.7 and about 1.9, between about 1.9 and about 2.1, greater than about 2.1, or any range therebetween. In some embodiments, the final midsole member, as formed in step 1220, may have cells or gaps therein that can have an approximately uniform size and distribution throughout the final midsole member.

Referring still to FIG. 44, step 1230 of process 1200 can include arranging the final midsole member having the final density ρ2, as formed in step 1220, within a frame internal cavity of a frame of the footwear to form a final sole structure of the footwear. For example, with reference to the article of footwear 1100 shown in FIGS. 38-43, the midsole member 1178 may be a final or production ready midsole member, e.g., formed via steps 1210, 1220 of process 1200 and includes the final density ρ2, and is arranged within the frame internal cavity 1199 of the frame 1170 of the sole structure 1104 of the footwear 1100, e.g., as in step 1230 of process 1200. In other words, the final midsole member, as formed in steps 1210, 1220, is a production ready midsole member that does not undergo any additional or secondary process that materially affects the final density ρ2 of the final midsole member prior to arranging the final midsole member within the frame internal cavity to form the final sole structure of the article of footwear, as in step 1230.

Moreover, as briefly mentioned above, any subsequent compression steps to reduce a size or increase the final density or hardness of the final midsole member, as formed in step 1220, are not required due to the support provided to the final midsole member by the frame of the article of footwear. Specifically, in other known supercritical foaming methods of conventional midsoles, an initial midsole component having an initial density is typically expanded or foamed to form an intermediate midsole component having an intermediate density that is less than the initial density, and then placed into a compression mold where the intermediate midsole component is compressed to form a final midsole component having a final density that is less than the initial density but greater than the intermediate density. The period of time for which the midsole component is held under compression varies with temperature, but may generally range between 500 and 550 seconds, leading to increased complexity, cost, and cycle times. Further, such compression may result in varying local densities throughout different portions of the final midsole component, e.g., up to about 60% of an average density of the final midsole component. Thus, the final midsole member formed in steps 1210, 1220 may have a more uniform density as compared to conventional midsoles formed by known foaming processes.

It should be appreciated that, in some embodiments, the final midsole member, as formed in steps 1210, 1220, may be subjected to one or more processes subsequent to step 1220 and prior to step 1230 that do not materially change the final density ρ2 or the final hardness of the final midsole member resulting from step 1220 and that is later arranged within the frame internal cavity, as in step 1230. For example, in one particular embodiment, the final midsole member having the final density ρ2, as formed in steps 1210, 1220, may undergo a coating process in which a protective exterior coating is applied to an exterior surface of the final midsole member to prevent ingress of liquid or other foreign materials into the hollow cells of the final midsole member. In such an embodiment, the exterior coating does not materially change or alter the final density ρ2 of the final midsole member that is assembled with the frame, as in step 1230. On the other hand, other additional or secondary processes or steps done to the final midsole member, as formed in steps 1210, 1220, that may materially change the final density ρ2 can include, for example, compression molding, heat treatment, among others.

Figure 45:
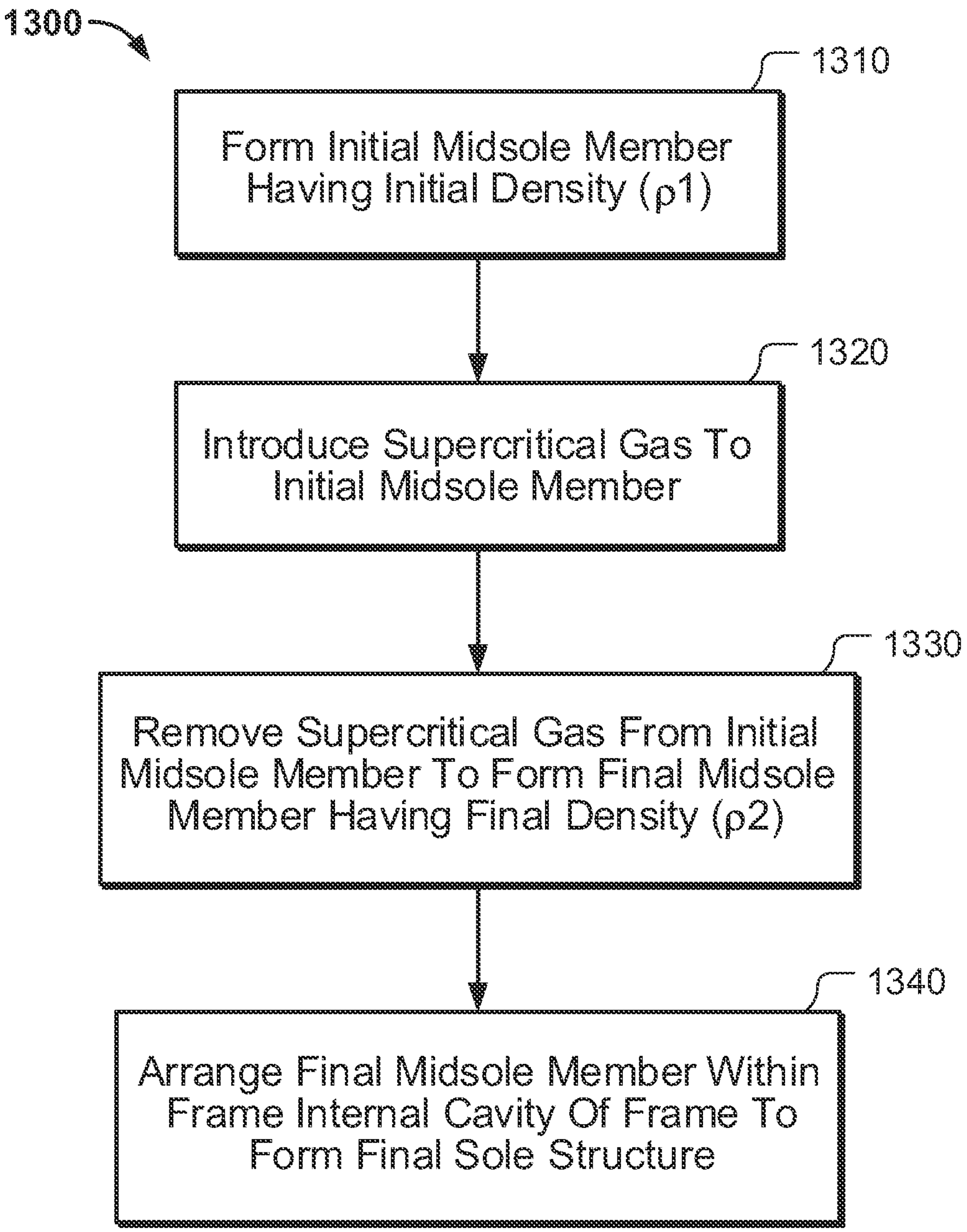
FIG. 45 is a flowchart representative of another example method of manufacturing a midsole member of an article of footwear, according to another embodiment of the disclosure.

As mentioned above, in some embodiments, a midsole member of an article of footwear having a frame may be formed via a supercritical foaming process in which a foaming agent, e.g., a supercritical fluid, is introduced to the midsole member. In this regard, FIG. 45 shows another exemplary process 1300 of manufacturing a midsole member of an article of footwear, e.g., any one or more of the midsole member(s) 178, 278, 378, 478, 578, 678, 778, 878, 978, 1078, 1178 of the articles of footwear 100, 200, 300, 400, 500, 600, 700, 800, 900, 1000, 1100, respectively, according to another embodiment of this disclosure. In the illustrated example of FIG. 45, step 1310 of process 1300 may include forming an initial midsole member having the initial density ρ1, similar to step 1210 of process 1200 shown in FIG. 44. In one particular example, the initial midsole member may be formed, as in step 1310, via an injection molding process or an extrusion process. Step 1320 of process 1300 can include introducing supercritical gas, e.g., $CO_2$, $N_2$, or mixtures thereof, to the initial midsole member having the initial density ρ1, as formed in step 1310, and then removing the supercritical gas from the initial midsole member to form a final midsole member having a final density ρ2 that is less than the initial density ρ1, as in step 1330.

For example, in some embodiments, supercritical gas can be removed from the initial midsole member, as in step 1330, by rapidly evacuating a pressure of an autoclave in which the initial midsole member is first saturated with the supercritical gas, as in step 1320. In some embodiments, at least a substantial portion of the supercritical gas introduced to the midsole member, as in step 1320, can be removed from the final midsole member, as in step 1330, such that the final midsole member does not comprise the supercritical gas. In other embodiments, only a portion of the supercritical gas introduced to the midsole member, as in step 1320, can be removed from the final midsole member, as in step 1330, such that the final midsole member comprises the supercritical gas, e.g., that remains trapped within cells or gaps within the final midsole member having the final density ρ2. In embodiments in which the final midsole member comprises the supercritical gas, it is preferable to utilize a non-toxic supercritical gas, such as, e.g., nitrogen, in step 1320.

With continued reference to FIG. 45, step 1340 of process 1300 can include arranging the final midsole member having the final density ρ2, as formed in steps 1310, 1320, 1330, within a frame internal cavity of a frame of the footwear to form a final sole structure of the footwear, similar to step 1230 of process 1200 shown in FIG. 44.

Figure 46:
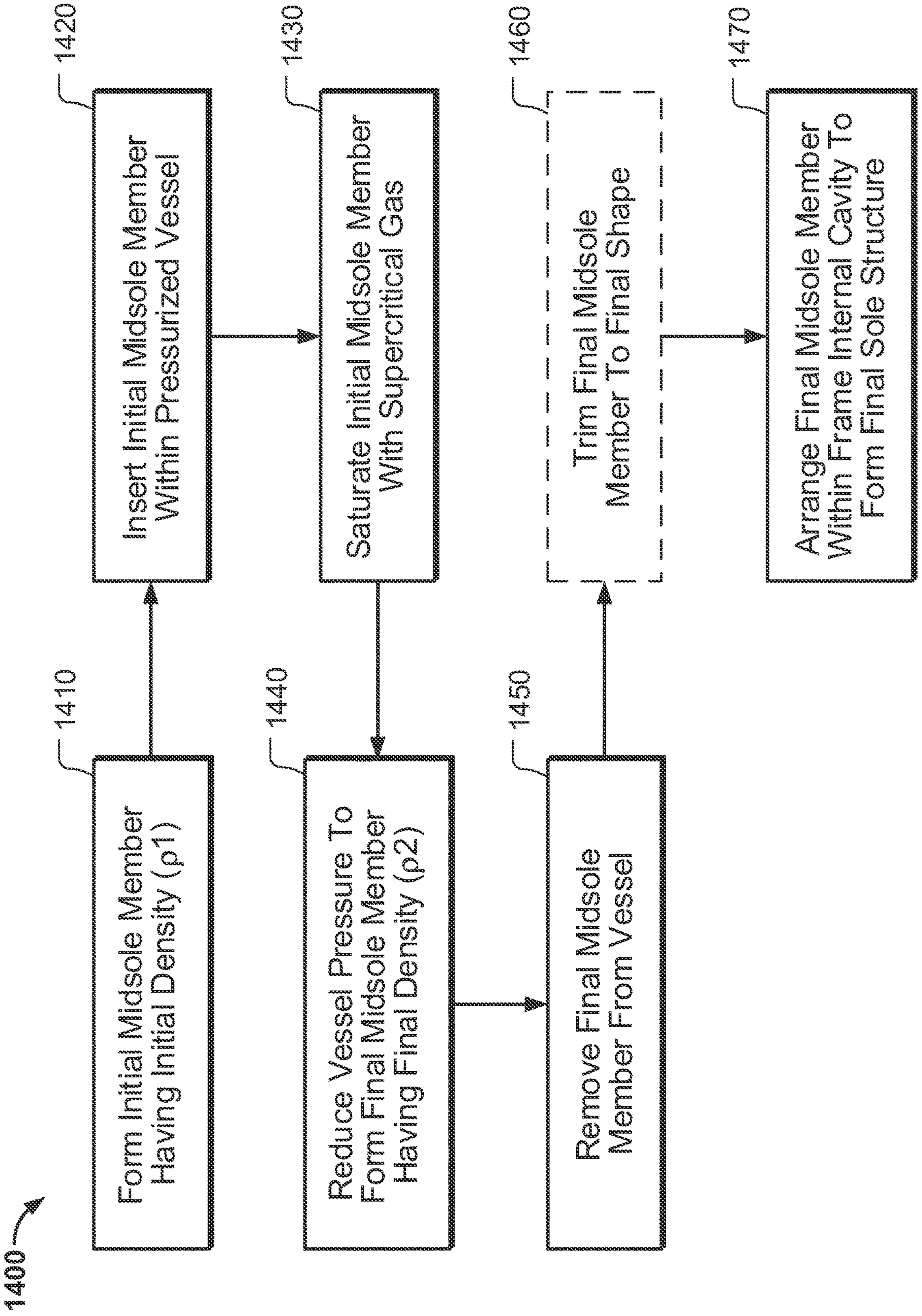
FIG. 46 is a flowchart representative of yet another example method of manufacturing a midsole member of an article of footwear, according to yet another embodiment of the disclosure.

FIG. 46 shows yet another exemplary process 1400 of manufacturing a midsole member of an article of footwear, e.g., any one or more of the midsole member(s) 178, 278, 378, 478, 578, 678, 778, 878, 978, 1078, 1178 of the articles of footwear 100, 200, 300, 400, 500, 600, 700, 800, 900, 1000, 1100, respectively, according to yet another embodiment of this disclosure. In the illustrated example of FIG. 46, step 1410 of process 1400 may include forming an initial midsole member having the initial density ρ1, similar to steps 1210, 1310 of processes 1200, 1300 shown in FIGS. 44 and 45, respectively. In one particular example, the initial midsole member may be formed, as in step 1410, via an injection molding process or an extrusion process.

Once the initial midsole member having the initial density ρ1 is formed, as in step 1410, step 1420 of process 1400 can include inserting the initial midsole member within a pressurized vessel, and then saturating the initial midsole member with a supercritical fluid, as in step 1430. For example, in some embodiments, the initial midsole member may be inlayed within the pressurized vessel at a first or atmospheric pressure, as in step 1420, and then a supercritical fluid, i.e., a blowing agent, can be injected into the pressurized vessel at a first or saturation vessel pressure, as in step 1430. In some embodiments, the saturation vessel pressure in step 1430 can be between about 5 megapascals (MPa) and about 45 MPa above the atmospheric pressure in step 1420. The supercritical fluid can be injected into the pressurized vessel as a gas that then transitions to the supercritical fluid, or a supercritical fluid can be injected directly into the pressurized vessel. In some embodiments, step 1430 can further include increasing a vessel temperature of the pressurized vessel.

In some embodiments, the supercritical fluid is held within the pressurized vessel for a predetermined period of time, i.e., a soak or dwell time, to allow the supercritical fluid to be absorbed by the initial midsole member such that the initial midsole member becomes (fully) saturated with the supercritical fluid. The specific dwell time required to allow the supercritical fluid to penetrate and saturate the initial midsole member may vary depending on any of the saturation vessel pressure, a temperature within the pressurized vessel, a size or volume of the initial midsole member, and the material of the initial midsole member. For example, the predetermined dwell time in some embodiments can range between about 60 minutes and about 300 minutes, between about 90 minutes and about 240 minutes, between about 120 minutes and about 180 minutes, or less than about 60 minutes, or more than about 300 minutes. In some embodiments, the dwell time can be selected to achieve partial saturation or full saturation of the initial midsole member. In some embodiments, the pressurized vessel can be an autoclave or any other vessel suitable for such applications.

With continued reference to FIG. 46, once the initial midsole member is sufficiently saturated with the supercritical gas, as in steps 1410, 1420, 1430, step 1440 of process 1400 may include reducing a vessel pressure to form a final midsole member having a final density ρ2 that is less than the initial density ρ1. Such a reduction in vessel pressure can cause the supercritical fluid saturated within the initial midsole member to nucleate and expand, thereby foaming the initial midsole member to form the final midsole member. In some embodiments, nucleation of the supercritical fluid forms (closed) supercritical fluid-filled cells within the initial midsole member, which expand as the pressure drops and thereby increase the volume, and correspondingly decrease the density, of the initial midsole member. In some such embodiments, the cells can have a substantially uniform size and distribution throughout the final midsole member.

For example, in some embodiments, the saturation vessel pressure of the pressurized vessel, as implemented in step 1430, can be reduced, as in step 1440, to a second or foaming vessel pressure that is less than the saturation vessel pressure such that the supercritical gas is removed entirely from the final midsole member, as formed in step 1440, similar to step 1330 of process 1300 shown in FIG. 45. In such embodiments, the second vessel pressure can be a percentage of the saturation vessel pressure that can be in a range of about 0% to about 70%, in a range of about 2% to about 50%, or in a range of about 5% to about 30%. In other embodiments, the saturation vessel pressure of the pressurized vessel, as implemented in step 1430, can be reduced, as in step 1440, to a third vessel pressure, e.g., that is less than the saturation vessel pressure and greater than the second vessel pressure, such that at least a portion of the supercritical gas, as saturated within the initial midsole member in step 1430, remains trapped within the final midsole member having the final density ρ2, as formed in step 1440. In some embodiments, step 1440 can further include reducing a vessel temperature of the pressurized vessel.

Once the final midsole member having the final density ρ2 is formed, as in steps 1410, 1420, 1430, 1440, step 1450 of process 1400 can include removing the final midsole member from the pressurized vessel, and then arranging the final midsole member within a frame internal cavity of a frame of the footwear to form a final sole structure of the footwear, as in step 1460 and similar to steps 1230, 1330 of processes 1200, 1300 shown in FIGS. 44 and 45, respectively.

In some embodiments, process 1400 may further include one or more additional steps after step 1410 and prior to step 1450. For example, in some embodiments, process 1400 may include, before or after step 1420, heating the pressurized vessel, such as, e.g., to cause the initial midsole member to be in an at least partially molten state or to reduce the required dwell time in step 1430. Depending on the material of the initial midsole member, in some such embodiments, the pressurized vessel, or the initial midsole member therein, can be heated to a predetermined temperature, e.g., between about 115 Celsius (C) and about 180° C. Moreover, in some embodiments, process 1400 may include, before or after step 1440, cooling the pressurized vessel, such as, e.g., to permit the initial midsole member to solidify before or after the pressure is reduced in step 1440.

Referring still to FIG. 46, and as mentioned above, in some embodiments, a final midsole member having a final density may undergo an additional process that does not affect the final density prior to being arranged within a frame cavity. Accordingly, in some embodiments, process 1400 may further include step 1460 (indicated as a dashed box in FIG. 46), which can include trimming the final midsole member, as formed in steps 1410, 1420, 1430, 1440, 1450, to a final shape prior to arranging the final midsole member within the frame internal cavity, as in step 1470. For example, in some such embodiments, an exterior surface of the final midsole member may be milled or otherwise trimmed to a predetermined shape corresponding to the frame internal cavity.

Figure 47:
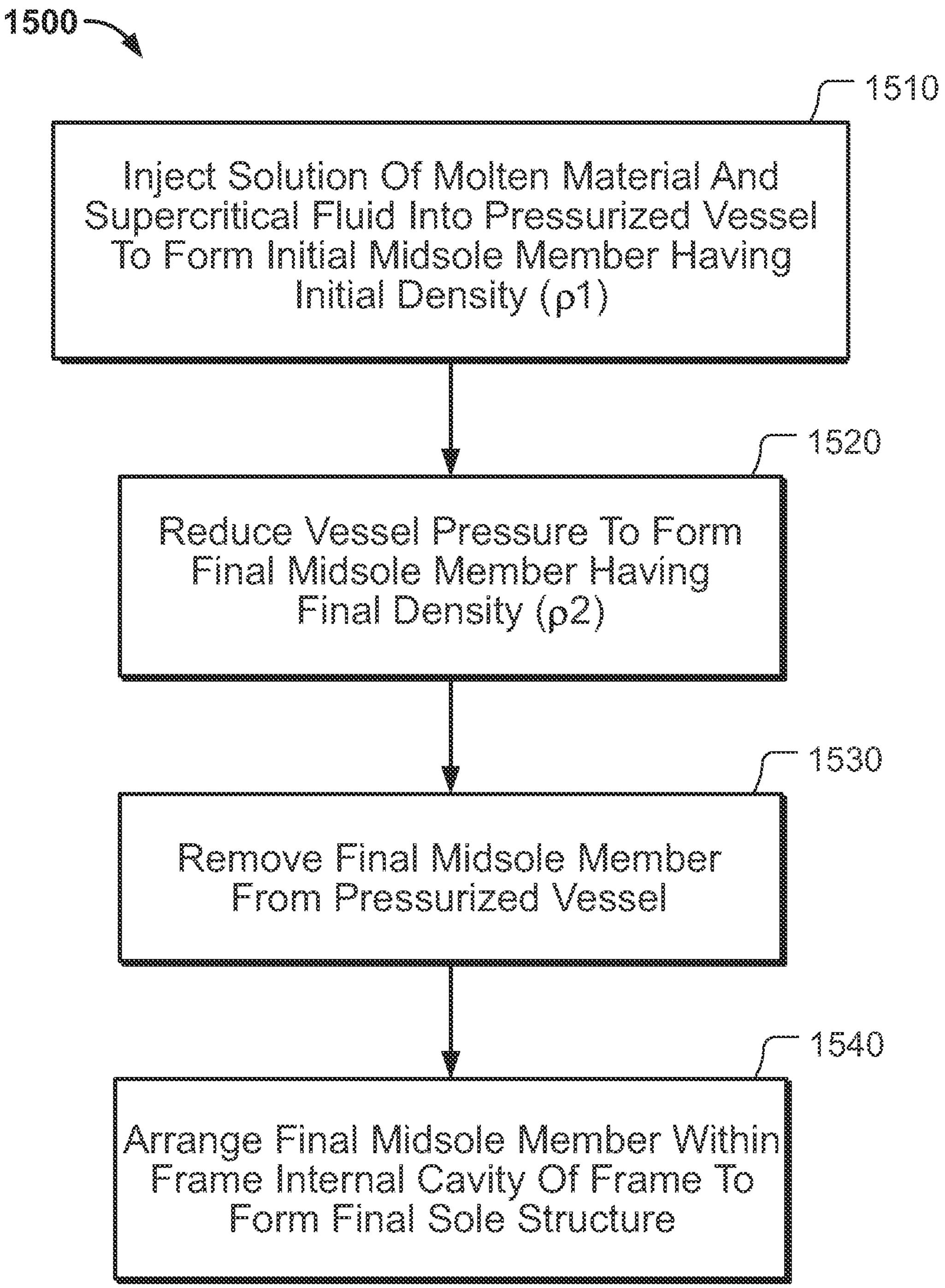
FIG. 47 is a flowchart representative of another example method of manufacturing a midsole member of an article of footwear, according to another embodiment of the disclosure.

FIG. 47 shows yet another exemplary process 1500 of manufacturing a midsole member of an article of footwear, e.g., any one or more of the midsole member(s) 178, 278, 378, 478, 578, 678, 778, 878, 978, 1078, 1178 of the articles of footwear 100, 200, 300, 400, 500, 600, 700, 800, 900, 1000, 1100, respectively, according to another embodiment of this disclosure. In the illustrated example of FIG. 47, step 1510 of process 1500 may include injecting a solution of molten material and supercritical fluid into a pressurized vessel to form an initial midsole member having an initial density ρ1, and then reducing a vessel pressure of the pressurized vessel to form a final midsole member having a final density ρ2, as in step 1520. Such a reduction in the vessel pressure of the pressurized vessel, as in step 1520, can cause the supercritical fluid to nucleate and form bubbles within the molten material, which, as the molten material solidifies, forms cells within the final midsole member. In some such embodiments, the cells can have a substantially uniform size and distribution throughout the final midsole member.

In some embodiments, a solution utilized in step 1510 can comprise one or more molten thermoplastic materials, e.g., TPU, EVA, polyolefin elastomer, or mixtures thereof, and one or more supercritical gases, e.g., $CO_2$, $N_2$, or mixtures thereof. In some embodiments, step 1510 may further include increasing a vessel temperature of the pressurized vessel, e.g., to prevent the molten material of the solution from solidifying within the pressurized vessel prior to reduction of the vessel pressure, and step 1520 may further include reducing the vessel temperature, e.g., to permit the molten material with bubbles of supercritical fluid to solidify within the pressurized vessel before the final midsole member is removed therefrom. For example, in some embodiments, step 1510 can include increasing a vessel temperature of the pressurized vessel from a first vessel temperature, e.g., an atmospheric temperature, to a second vessel temperature that is greater than the first vessel temperature, and step 1520 can further include reducing the vessel temperature from the second vessel temperature to a third vessel temperature that is less than at least the second vessel temperature.

Once the final midsole member having the final density ρ2 is formed, as in steps 1510, 1520, step 1530 of process 1500 can include removing the final midsole member from the pressurized vessel, and then arranging the final midsole member within a frame internal cavity of a frame of the footwear to form a final sole structure of the footwear, as in step 1540 and similar to steps 1230, 1340, 1470 of processes 1200, 1300, 1400 shown in FIGS. 44-46, respectively. In some embodiments, process 1500 may further include trimming the final midsole member, as formed in steps 1510, 1520, to a final shape prior to arranging the final midsole member within the frame internal cavity, similar to optional step 1460 of process 1400 shown in FIG. 46.

Referring again to FIGS. 27-43, in some cases, one or more various components of the example articles of footwear 300, 400, 500, 600, 700, 800, 900, 1000, 1100 may be formed through additive manufacturing techniques, such as by one or more of the various 3D printing techniques mentioned above. For example, with reference to the article of footwear 900, the interconnected upper portion 980 of the midsole members 978 of the article of footwear 900 may be 3D printed as a single unitary piece. Further, the plurality of lower frames 970*a*, the plurality of upper frames 970*b*, and/or the frame ring 914 of the article of footwear 900 may be 3D printed. As another example, and with reference to the article of footwear 1100, the upper frame member 1170*a* can be 3D printed separately from the lower frame member 1170*b* and the frame 1170 can be later formed by joining the upper frame member 1170*a* to the upper 1102 and coupling the lower frame member 1170*b* to the upper frame member 1170*a*. In such examples, the upper frame member 1170*a* can be 3D printed with a first material and the lower frame member 1170*b* can be 3D printed with a second material having one or more properties that differ from that of the first material, e.g., elasticity, translucency, color, among others.

In other embodiments, other configurations are possible. For example, certain features and combinations of features that are presented with respect to particular embodiments in the discussion above can be utilized in other embodiments and in other combinations, as appropriate. Further, any of the embodiments described herein may be modified to include any of the structures or methodologies disclosed in connection with other embodiments. Additionally, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. An article of footwear, comprising:
an upper;
a sole structure attached to the upper, the sole structure including:
a frame attached to the upper, the frame having a frame exterior surface and a frame interior surface, opposite the frame exterior surface, that defines a frame internal cavity;
a unitary midsole member that is not attached to the upper and is disposed within the frame internal cavity along each of a forefoot region, a midfoot region, and a heel region of the sole structure; and
an outsole that is removably attached to the frame,
wherein the frame interior surface is adjacent portions of the upper and the midsole member,
wherein the frame has a lattice-work structure formed by a plurality of apertures extending through the frame exterior surface and the frame interior surface such that at least some of the portions of the upper and the midsole member adjacent the frame interior surface are exposed through the plurality of apertures, and
wherein the midsole member is formed via a supercritical foaming process.

2. The article of footwear of claim 1, wherein the midsole member is not compressed after the supercritical foaming process.

3. The article of footwear of claim 1, wherein the midsole member is disposed at least partially within each of a forefoot region, a midfoot region, and a heel region of the article of footwear.

4. The article of footwear of claim 3, wherein the midsole member extends between a distal end and a proximal end of the article of footwear and between a lateral side and a medial side of the article of footwear.

5. The article of footwear of claim 1, wherein the frame extends along at least a medial side and a lateral side of the article of footwear, and
wherein the lattice-work structure of the frame extends along at least the lateral side of the article of footwear.

6. The article of footwear of claim 1, wherein, when force is applied to the sole structure by a user's foot, at least portions of the midsole member are compressed and at least some of the portions of the midsole member exposed through the plurality of apertures of the frame expand outwardly from the frame internal cavity at least partially through the plurality of apertures.

7. The article of footwear of claim 1, wherein the frame includes an outsole member that at least partially defines the outsole of the sole structure.

8. The article of footwear of claim 1, wherein the frame includes an upper frame member attached to the upper and a lower frame member attached to the upper frame member, opposite the upper, and
wherein the lower frame member at least partially defines the outsole of the sole structure.

9. The article of footwear of claim 8, wherein the lower frame member is removably attached to the upper frame member, and
wherein, when the lower frame member is removed from the upper frame member, the midsole member is configured to be removeable from or insertable into the frame internal cavity.

10. The article of footwear of claim 1, wherein at least the lattice-work structure of the frame comprises an elastomeric material such that at least the lattice-work structure is configured to elastically deform under force exerted on the sole structure by a user's foot.

11. The article of footwear of claim 1, wherein the sole structure further includes an insole, and
wherein the insole is disposed adjacent an upper surface of the midsole member.

12. A method of manufacturing an article of footwear having an upper and a sole structure with an outsole, the method comprising:
forming an initial midsole member having an initial density;
expanding the initial midsole member, via a supercritical foaming process, to form a final midsole member of the sole structure having a final density that is less than the initial density; and
assembling the final midsole member having the final density within a frame internal cavity of a frame attached to the upper and the sole structure,
wherein the outsole is removably attached to the frame,
wherein the frame has a lattice-work structure formed by a plurality of apertures extending through a frame exterior surface and a frame interior surface such that at least some portions of the upper and the midsole member within the frame internal cavity and adjacent the frame interior surface are exposed through the plurality of apertures, and
wherein the midsole member is a unitary midsole member that is not attached to the upper and is disposed within the frame internal cavity along each of a forefoot region, a midfoot region, and a heel region of the sole structure.

13. The method of claim 12, wherein assembling the final midsole member with the frame internal cavity includes:
milling the final midsole member to a final shape; and
inserting the final midsole member having the final shape into the frame internal cavity.

14. The method of claim 12, wherein the supercritical foaming process includes:
inlaying the initial midsole member having the initial density into a vessel;
introducing a supercritical gas to the initial midsole member;
removing the supercritical gas from the initial midsole member to form the final midsole member having the final density; and
removing the final midsole member from the vessel.

15. The method of claim 12, wherein the supercritical foaming process includes:
pumping a solution of molten material and supercritical fluid into a vessel having a pressure to form the initial midsole member having the initial density;
releasing the pressure from the vessel to form the final midsole member having the final density; and
removing the final midsole member from the vessel.

16. An article of footwear, comprising:
an upper;
a sole structure attached to the upper, the sole structure including:

a frame having a frame exterior surface and a frame interior surface, opposite the frame exterior surface, that defines a frame internal cavity, the frame including:

an upper frame member attached to the upper; and a lower frame member removably attached to the upper frame member, opposite the upper; and one or more midsole members disposed within the frame internal cavity and configured to be disengaged with the upper when the lower frame member is removed from the upper frame member, wherein when the lower frame member is removed from the upper frame member, the one or more midsole members are configured to be removeable from or insertable into the frame internal cavity, wherein the lower frame member at least partially defines an outsole of the sole structure, and the one or more midsole members at least partially define a midsole of the sole structure, wherein the frame interior surface is adjacent portions of the upper and the one or more midsole members, wherein the frame has a lattice-work structure formed by a plurality of apertures extending through the frame exterior surface and the frame interior surface such that at least some of the portions of the upper and the midsole member adjacent the frame interior surface are exposed through the plurality of apertures, and wherein the one or more midsole members are formed via a supercritical foaming process.

17. The article of footwear of claim 16, wherein the one or more midsole members are not attached to the upper or the frame.

18. The article of footwear of claim 16, wherein the one or more midsole members define a substantial entirety of the midsole, and the lower frame member defines a substantial entirety of the outsole.

19. The article of footwear of claim 16, wherein the one or more midsole members include at least a first midsole member and a second midsole member, and wherein the first midsole member is arranged at least partially within a forefoot region of the article of footwear, and the second midsole member is arranged at least partially within a heel region of the article of footwear.

20. The article of footwear of claim 19, wherein the first and second midsole members are not attached to the upper and the frame, and wherein the first and second midsole members are not attached to one another.

* * * * *